United States Patent
Takahashi et al.

[19]

[11] Patent Number: 6,081,663
[45] Date of Patent: *Jun. 27, 2000

[54] INFORMATION PROCESSING METHOD AND APPARATUS HAVING A POWER-SAVING CONTROL FEATURE

[76] Inventors: Tsutomu Takahashi; Naohisa Suzuki; Koji Fukunaga; Jiro Tateyama; Jun Oida, all c/o Canon Kabushiki Kaisha, 30-2, 3-chome, Shimomaruko, Ohta-ku, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/506,339

[22] Filed: Jul. 24, 1995

Related U.S. Application Data

[62] Division of application No. 07/994,923, Dec. 22, 1992.

[30] Foreign Application Priority Data

Dec. 25, 1991 [JP] Japan ................................. 3-343288
Dec. 25, 1991 [JP] Japan ................................. 3-343292

[51] Int. Cl.[7] ...................................................... G06F 3/00
[52] U.S. Cl. ...................... 395/500.41; 347/5; 358/1.13; 358/1.14; 395/500.47
[58] Field of Search ................................... 395/500, 600, 395/700, 800, 112, 113, 115; 347/5, 17, 99, 80, 74, 78, 89, 900; 358/1.14, 1.1

[56] References Cited

U.S. PATENT DOCUMENTS

| | | | |
|---|---|---|---|
| 4,698,755 | 10/1987 | Okazaki et al. | 364/519 |
| 4,860,034 | 8/1989 | Watanabe et al. | 346/140 R |
| 4,910,528 | 3/1990 | Firl et al. | 346/1.1 |
| 4,947,187 | 8/1990 | Iwagami | 346/1.1 |
| 5,293,463 | 3/1994 | Masuda | 395/113 |
| 5,420,667 | 5/1995 | Kaneko et al. | 395/113 |
| 5,422,985 | 6/1995 | Tanaka | 395/113 |
| 5,568,594 | 10/1996 | Suzuki | 395/112 |
| 5,581,668 | 12/1996 | Oida et al. | 395/113 |

FOREIGN PATENT DOCUMENTS 2138190  10/1984  United Kingdom .

OTHER PUBLICATIONS

Patent Abstracts of Japan, vol. 13, No. 320, JP 01 108052, Apr. 1989.

Patent Abstracts of Japan, vol. 9, No. 235, JP 60 089379, May 1985.

Patent Abstracts of Japan, vol. 12, No. 045, JP 62 198468, Sep. 1987.

*Primary Examiner*—Jacques H. Louis-Jacques

[57] ABSTRACT

An information processing apparatus comprises: a memory to store emulation information which is designated from a host computer that is connected to a printer via a general parallel interface; a judging circuit to judge a delimiter of print data; and a control unit to switch the emulation on the basis of the emulation information stored in the memory and the result of the judgment by the judging circuit. When each section of the apparatus is in the inoperative state, they are set into the power saving mode and are sequentially controlled. Thus, the power saving of the whole apparatus can be realized.

36 Claims, 56 Drawing Sheets

PFM/IO REGISTER

PBJ/IO REGISTER

FIG. 17

| ADDRESS | DEVICE |
|---|---|
| 0000H-001FH | DMA CONTROLLER 1 |
| 0020H-0021H | INTR CONTROLLER 1 |
| 0040H-0043H | SYSTEM TIMER |
| 0060H-0064H | KEYBOARD |
| 0070H-0071H | REALTIME CLOCK, NMI MASK |
| 0080H-008FH | DMA BANK REGISTER |
| 00A0H-00A1H | RESERVED |
| 00C0H-00DFH | RESERVED |
| 00F0H-00FFH | FPU |
| 01F0H-01FFH | HARD DISC CONTROLLER |
| 0200H-0207H | RESERVED |
| 0278H-027FH | PARALLEL PORT (PRINTER PORT 3) |
| 02F8H-02FFH | SERIAL PORT 2 |
| 0300H-031FH | RESERVED |
| 0360H-036FH | RESERVED |
| 0370H-0377H | RESERVED |
| 0378H-037FH | PARALLEL PORT (PRINTER PORT 2) |
| 0380H-03AFH | RESERVED |
| 03B0H-03BBH | VIDEO CONTROLLER |
| 03BCH-03BFH | PARALLEL PORT (PRINTER PORT 1) |
| 03C0H-03DFH | VIDEO CONTROLLER |
| 03E0H-03EFH | RESERVED |
| 03F0H-03F7H | FLOPPY DISC CONTROLLER |
| 03F8H-03FFH | SERIAL PORT 1 |

FIG. 18

| INTR NO. | PURPOSE | |
|---|---|---|
| 00H | DIVISION ERROR | |
| 01H | SINGLE STEP | |
| 02H | NMI | |
| 03H | BREAK POINT | |
| 04H | OVERFLOW | |
| 05H | PRINT SCREEN (HARD COPY) | |
| 06H | RESERVED | |
| 07H | RESERVED | |
| 08H | IRQ0 TIMER INTR | (MASTER) |
| 09H | IRQ1 KEYBOARD HARDWARE INTR | (MASTER) |
| 0AH | IRQ2 CASCADE CONNECTION OF INTR CONTROLLER 2 | (MASTER) |
| 0BH | IRQ3 SERIAL PORT 2 INTR | (MASTER) |
| 0CH | IRQ4 SERIAL PORT 1 INTR | (MASTER) |
| 0DH | IRQ5 PARALLEL PORT 3 INTR | (MASTER) |
| 0EH | IRQ6 DISC CONTROLLER INTR | (MASTER) |
| 0FH | IRQ7 PARALLEL PORTS 1 & 2 INTR | (MASTER) |
| 10H | VIDEO BIOS CALL | |
| 11H | REFERENCE TO SYSTEM STRUCTURE | |
| 12H | REFERENCE TO MEM SIZE | |
| 13H | DISC BIOS CALL | |
| 14H | RS-232C BIOS CALL | |
| 15H | OTHER SYSTEM SERVICE | |
| 16H | KEYBOARD BIOS CALL | |
| 17H | PRINTER BIOS CALL | |
| 18H | RESERVED | |
| 19H | BOOTSTRAP | |
| 1AH | TIMER SERVICE | |
| 1BH | KEYBOARD BREAK | |
| 1CH | USER TIMER INTR | |
| 1DH | VIDEO PARAMETER | |
| 1EH | FLOPPY DISC PARAMETER | |
| 1FH | GRAPHICS CHARACTER | |

FIG. 19

| INTR NO. | PURPOSE | |
| --- | --- | --- |
| 20H~32H | OS FUNCTION CALL | |
| 33H | MOUSE DRIVER | |
| 34H~3FH | OS RESERVATION | |
| 40H~5FH | RESERVED FOR BIOS | |
| 60H~66H | USER PROGRAM INTR | |
| 67H | EMS DRIVER | |
| 68H~6FH | RESERVED | |
| 70H | IRQ8 REALTIME CLOCK INTR | (SLAVE) |
| 71H | IRQ9 DIRECT TO INT 0AH | (SLAVE) |
| 72H | IRQ10 RESERVED | (SLAVE) |
| 73H | IRQ11 RESERVED | (SLAVE) |
| 74H | IRQ12 RESERVED | (SLAVE) |
| 75H | IRQ13 FPU INTR | (SLAVE) |
| 76H | IRQ14 HARD DISC INTR | (SLAVE) |
| 77H | IRQ15 RESERVED | (SLAVE) |
| 78H~F0H | RESERVED | |
| F1H~FFH | RESERVED | |

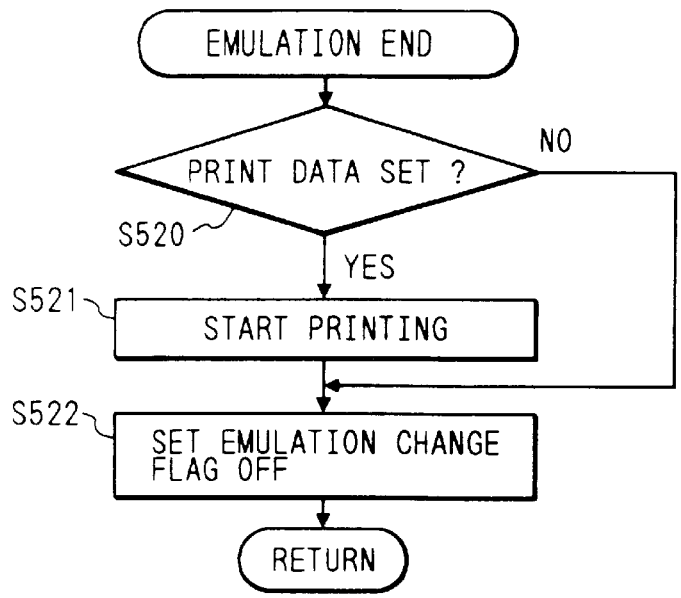
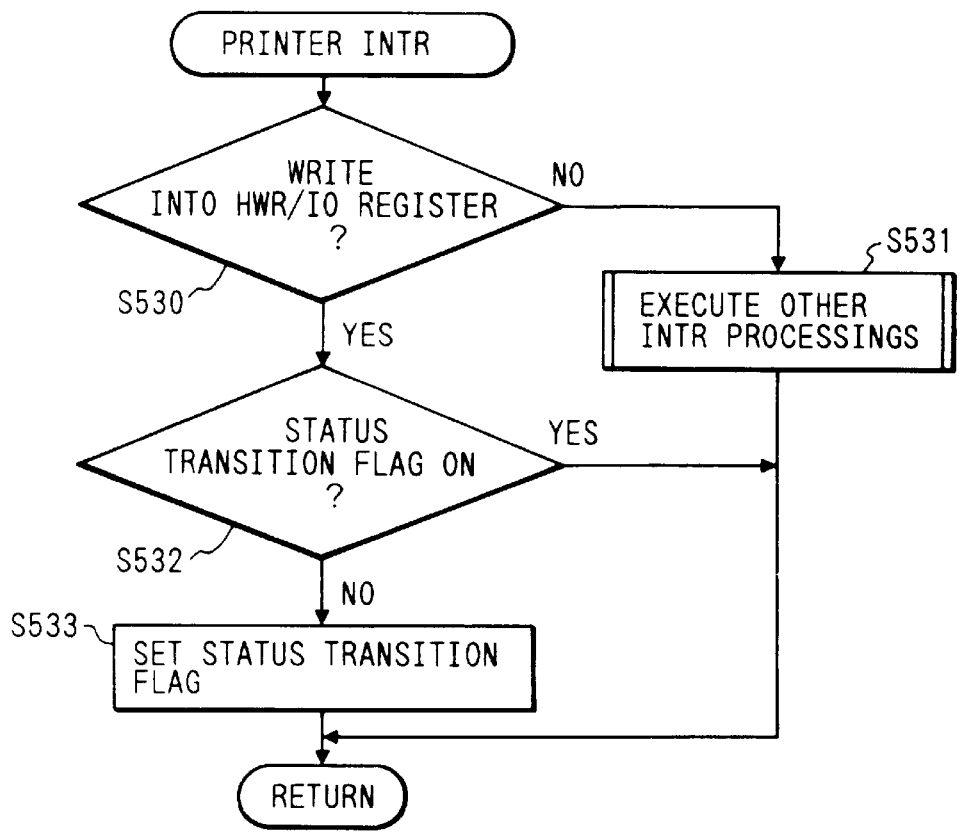

INFORMATION PROCESSING METHOD AND APPARATUS HAVING A POWER-SAVING CONTROL FEATURE

This application is a division of application Ser. No. 07/994,923 filed Dec. 22 1992 pending.

BACKGROUND OF THE INVENTION

1. Field of the Invention

The invention relates to information processing method and apparatus in which an emulation can be changed or by setting each section of the apparatus into a power saving state in an inoperative mode and by sequentially controlling them, an electric power consumption of the whole apparatus can be saved.

2. Related Background Art

Hitherto, in an information processing apparatus, for instance, in a printer, the emulation is changed by a switch provided for the printer or by transmitting a command for controlling the printing to the printer. On the other hand, it is necessary to synchronously execute the change of the emulation and the transmission of print data without an error.

In the conventional apparatus, however, the emulation on the printer side cannot be changed from the host computer side or there is no means for knowing the selection state of the emulation on the printer side from the host computer side, so that the host computer side changes the emulation while ignoring the status of the printer side. Consequently, there is also a case where preset information, data, or the like is lost due to the unnecessary emulation change.

On the other hand, unless the change of the emulation and the transfer of the print data are correctly executed, another emulation is executed on the way of the print data, so that a state such that a desired print is not obtained occurs.

Hitherto, in case of considering a saving of an electric power consumption of a printing section of a system which comprises an information processing section as a main control section and a print control section and respectively independently controls them, transition statuses such as stop status, waiting status, and the like are provided and are managed by the main control section.

In the conventional apparatus, however, there is an inconvenience such that a busy status due to a status of the printing section exists at many locations and the main control section is set into the waiting status for such a period of time. On the other hand, when data such as print data or the like is transferred to the printing section, the data can be received only when the printing section side is also in the waiting status, so that both of the time and the electric power are consumed in vain.

SUMMARY OF THE INVENTION

In consideration of the above problems, it is an object of the invention to provide information processing method and apparatus, in which an emulation on the printer side can be changed from the host computer side and a selecting state of the emulation on the printer side can be known from the host computer side. More specifically speaking, an object of the invention is to provide information processing method and apparatus, in which even when the change of the emulation and the transfer of print data are not synchronized, a delimiter of the print data is judged and the print data can be printed by the correct emulation.

In consideration of the above problems, another object of the invention is to provide information processing method and apparatus comprising: memory means for storing emulation information which is designated from a host computer; emulation changing means for changing the emulation on the basis of the emulation information stored in the memory means; and judging means for judging a delimiter of print data.

In consideration of the above problems, still another object of the invention is to provide information processing method and apparatus, in which emulation information which is designated from a host computer is stored and the emulation is changed on the basis of the stored emulation information and a delimiter of print data.

In consideration of the above problems, further another object of the invention is to provide information processing method and apparatus, in which a power saving control section is provided for both of a main control section and a print control section, the transition of a power saving status is managed and controlled, and a transition can be performed due to a paper presence detection or the like from various kinds of input means such as a paper insert sensor in addition to an instruction from the main control section, so that the power saving control and the instruction data transfer are independently executed to the print control section without managing a printing section by the main control section, and further, a restart from the stop status as one status of the power saving control and a selection of a processing can be easily executed.

In consideration of the above problems, further another object of the invention is to provide information processing method and apparatus comprising: information processing means for performing main control; control means for performing control regarding the printing including a power saving control; and a switch to instruct the control means to stop or restart a printer control section for controlling, particularly, the print control, wherein when the printer control section is halted by an instruction of the switch, the control means resets and starts the printer control section on the basis of the information transferred from the information processing means, thereby enabling the information from the information processing means to be processed.

In consideration of the above problems, further another object of the invention is to provide information processing method and apparatus comprising: information processing means for performing main control; control means for performing control regarding the printing including power saving control; and a plurality of instructing means for instructing the control means to reset a printer control section for performing, particularly, a print control, wherein the control means has reset means for resetting the printer control section and a special register for specifying the instructing means to activate the reset means from among the plurality of instructing means, and a processing after completion of the resetting by the reset means can be selected on the basis of an output of the special register.

BRIEF DESCRIPTION OF THE DRAWINGS

FIG. 17 shows an address map of each IO;

FIG. 18 is a diagram showing the contents of interruption vectors;

FIG. 19 is a diagram showing the contents of interruption vectors;

FIG. 20 is a diagram showing a flowchart when a power supply is turned on;

FIG. 49 is a flowchart showing the details of an emulation end processing;

FIG. 50 is a flowchart showing the details of a printer interruption processing;

DETAILED DESCRIPTION OF THE PREFERRED EMBODIMENTS

[Embodiment Regarding Emulation Change]

Preferred embodiments of the present invention will be described in detail hereinbelow with reference to the drawings. "Country designation" used in the present invention denotes that a desired group is designated from a plurality of groups which are specified by a certain condition regarding a document processing such as kind of language, kind of district, or the like. As for "group", there is a case where, for example, the designation of England includes a plurality of countries such as England, U.S.A., and the like. There is also a case where one country is designated by designating a country of Japan. The designated country almost corresponds to the language which is used in such a country.

Figure 1:
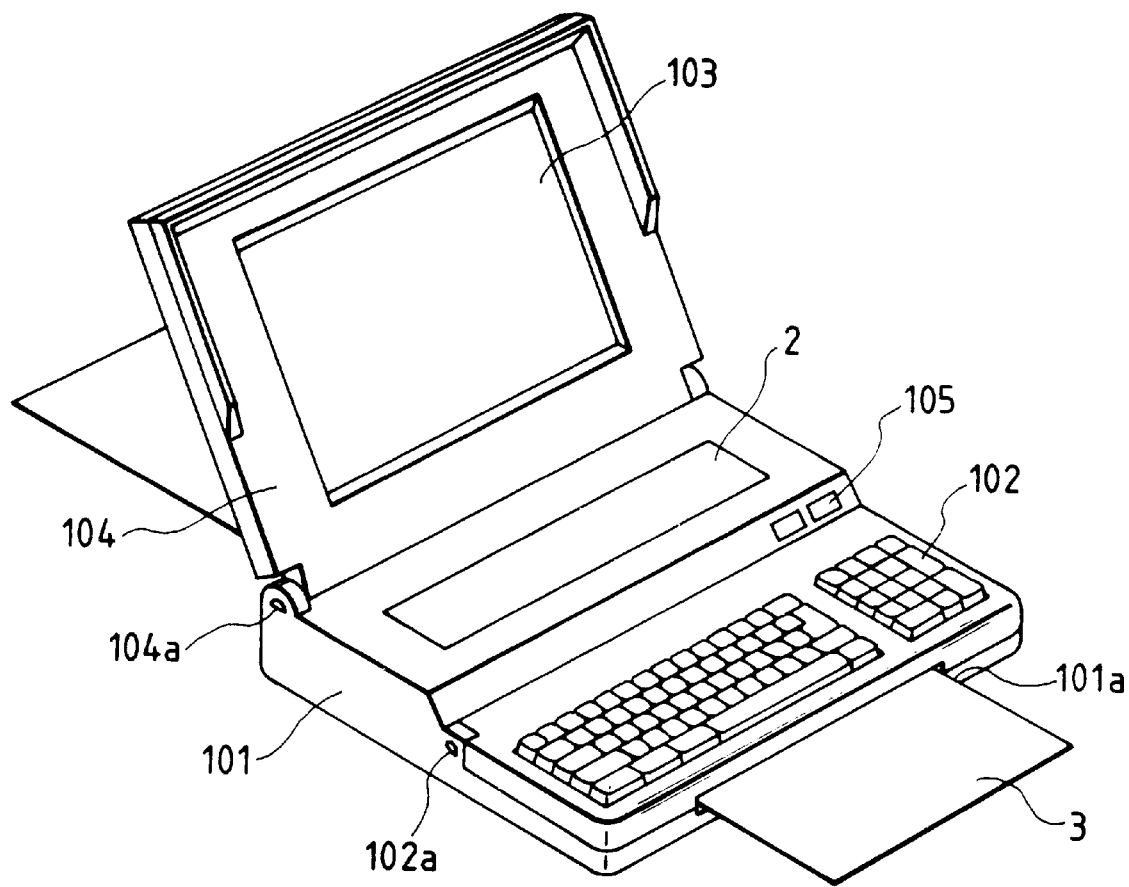
FIG. 1 is a perspective view showing a personal computer embodying the present invention.

FIG. 1 is a perspective view showing a personal computer as an information processing apparatus according to an embodiment of the present invention. A personal computer 1 is constructed by: an apparatus main body 101; a keyboard 102; an upper cover 104 having a display section 103; a printer unit 2; and the like. The upper cover 104 is rotatably attached to the apparatus main body 101 through hinges 104a attached to both edges of the rear edge of the apparatus main body. When the apparatus is used, therefore, the upper cover 104 is opened to a position such that the display contents on the display section 103 can be easily seen due to the rotation of the upper cover. When the apparatus is not used, the upper cover 104 is closed and can function as a cover. As a display element of the display section 103, a liquid crystal display element is used because the display section can be thinly constructed. A ferroelectric liquid crystal display element or the like can be also used.

[Schematic Block Diagram of Host-Printer]

Figure 2:
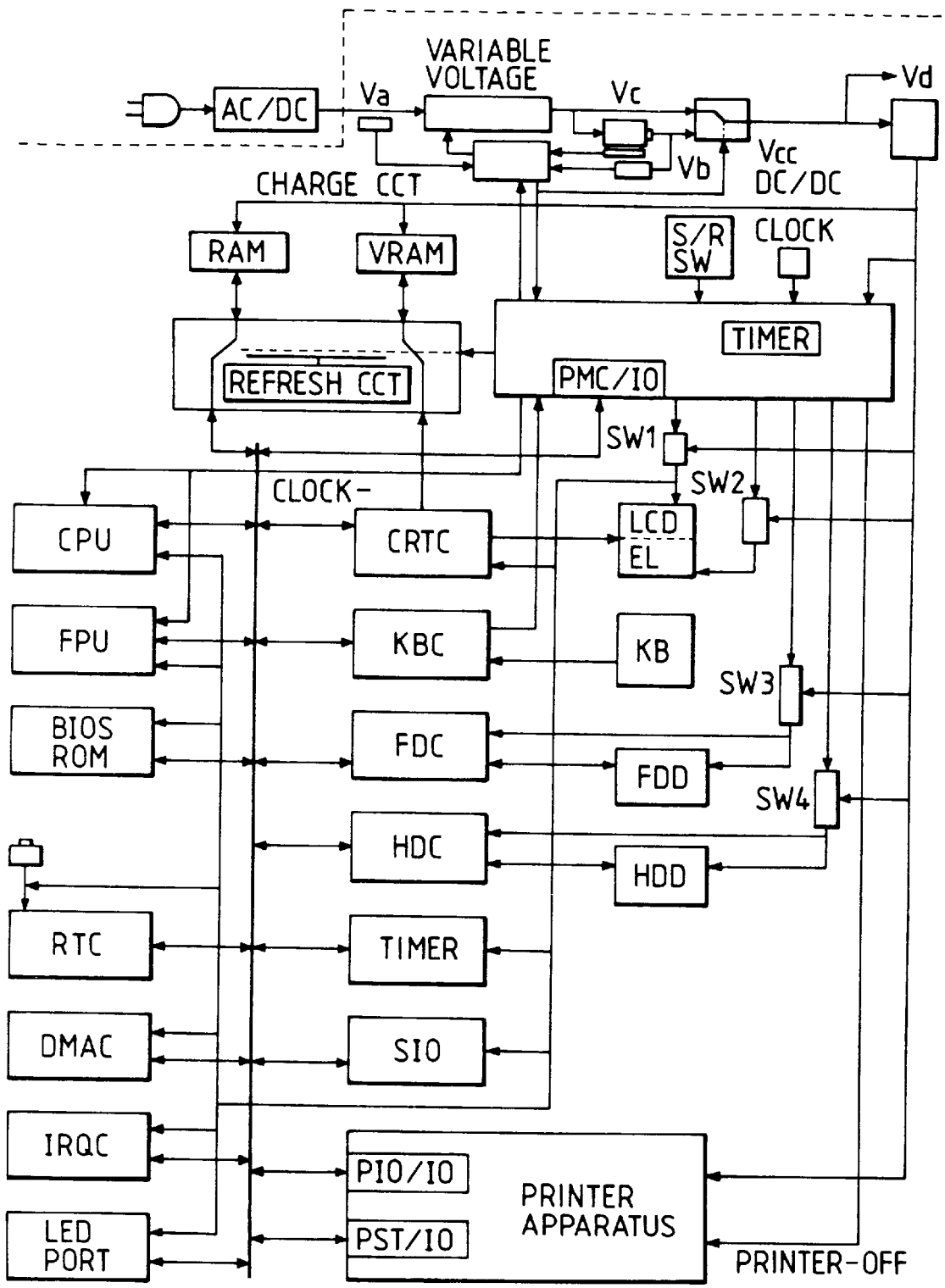
FIG. 2 is a schematic block diagram between a host computer and a printer.

FIG. 2 shows a schematic block diagram of a host comptuer and a printer.

First, in the host computer, a central processing unit (CPU) executes a main control. A BIOS ROM (Basic Input Output System ROM) instructs a fundamental control. An application program is read out from a floppy disc (FDD) or a hard disc (HDD) through a floppy disc controller (FDC) or a hard disc controller (HDC) and the program is executed by using a system memory (RAM). In this instance, as a display method of the screen, characters or the like are displayed to a liquid crystal display (LCD) by using an LCD controller (LCDC) and a key input from a keyboard (KB) is performed via a keyboard controller (KBC). A numerical value arithmetic operating processor (FPU) supports arithmetic operating processes for the CPU. A realtime clock (RTC) indicates the elapsed time at the present time point. Even when a power supply of the whole system is shut off, the operation of the realtime clock is executed by a dedicated battery. A DMA controller (DMAC) performs a data transfer without using the CPU in order to transfer data at a high speed between memories, between the memory and an I/O, and between an I/O and another I/O. An interruption controller (IRQC) accepts an interruption from each I/O and executes processings in accordance with the priorities. A timer (TIMER) has free running timers of a few channels and performs various kinds of time managements. In addition to the above component elements, there are a serial interface (SIO), an extension port (PORT), and an LED to inform an operating state to the user, and they are connected to the outside.

In addition to each of the above controls which the general personal computer has, in a notebook type personal computer, it is necessary to cope with at least two power sources such as AC adapter and a battery. Particularly, it is necessary to save an electric power consumption when the battery is used. Therefore, the above personal computer has the following construction. That is, the personal computer comprises a host power management section (host PM section), a refresh controller, and a charge controller. The host PM section controls each of the times which are required for turning on/inf an inverter circuit of an EL, supplying a power source to the FDD, supplying a power source to the HDD, turning off the printer, and supplying power sources to the RAM, VRAM, and other devices, controls clocks of the CPU and the like, and controls a power source control procedure in the suspending/resume mode and the like. The refresh controller switches the RAM and the VRAM by an instruction signal from the host PM section in accordance with the suspending mode and the CPU-clock operating mode, thereby refreshing. The charge controller can also drive the host computer side while charging a secondary battery.

The printer is coupled to the host computer by a general parallel interface and executes transmission and reception of data at the register level of the I/O port. A connection image is similar to that in case of performing the data transmission and reception with an external printer.

[Block Diagram of Printer]

Figure 3:
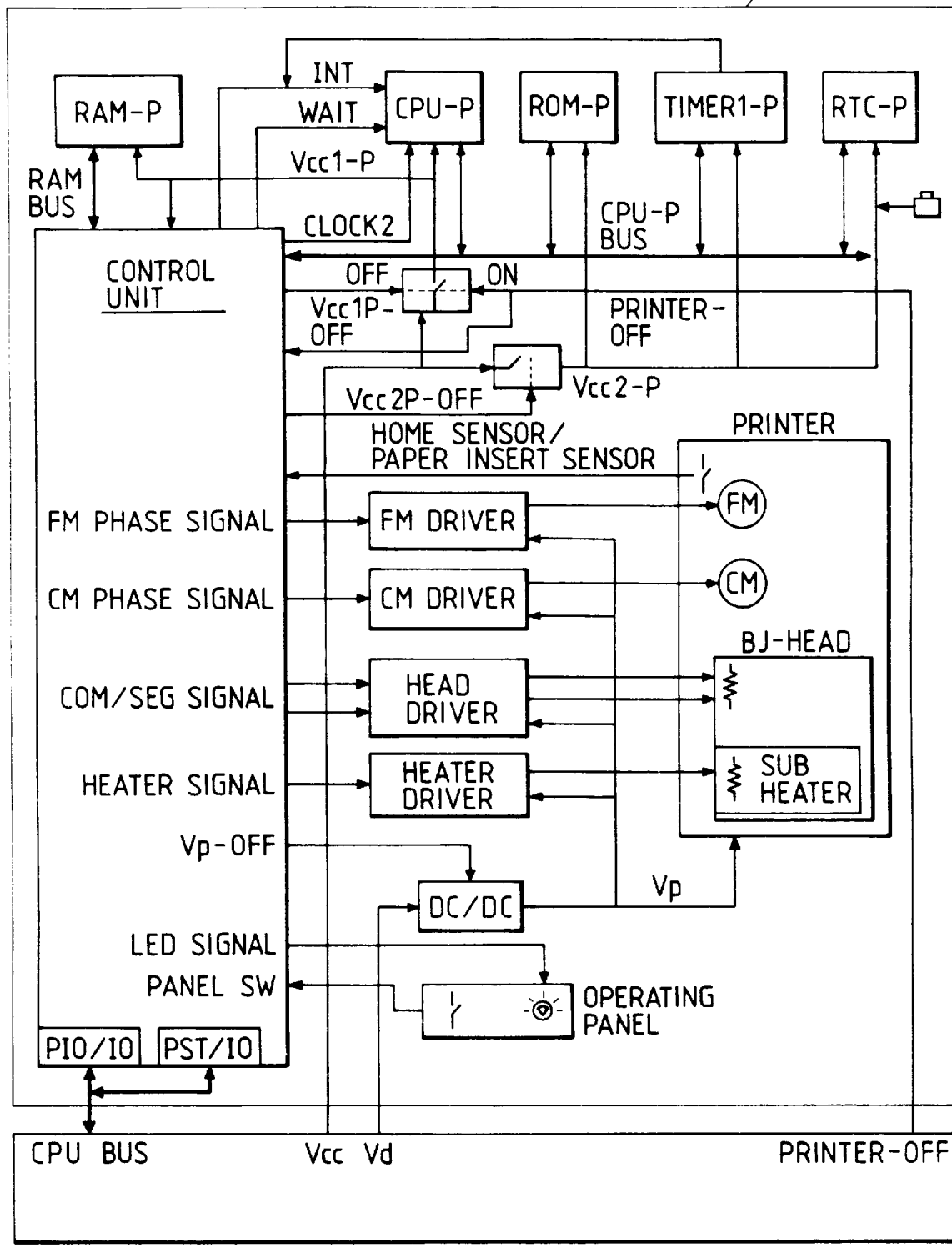
FIG. 3 is a block diagram of a printer IF section.

FIG. 3 is a block diagram showing a construction of a control system of a printer apparatus. The control system is constructed as follows.

A CPU-P is a CPU having a microprocessor form to perform a main control of the printer apparatus. The CPU-P executes transmission and reception of status information of the printer and emulation setting information between the CPU-P and a PST/IO register which can be accessed from the host computer side through a PST/IO register of a printer control & status port section. The CPU-P executes desired status processing and print processing on the basis of the status setting in accordance with a printer command and data which are obtained from the host computer side through a PIO/IO register of a parallel IF adapter section, which will be explained hereinlater, by using a device/a register/a memory on the CPU-P in accordance with a program or data which has previously been stored as microcodes in an ROM-P, which will be explained hereinlater. The ROM-P is an ROM (read only memory) to store fixed data such as programs corresponding to a recording control procedure, a print control procedure, and the like which are executed by the CPU-P, character generator (CG), other table and default values, and the like. A TIMER1-P is a timer to obtain driving phase times of a paper feed motor (FM)/a heater and the like and other time timings. RTC-P is an RTC (realtime clock) to inform the elapsed time of a recovering operation. A control unit comprises: an IF transfer control; a power saving control; an RAM access control; a printer control and status control; a printer port control; and the like. Among them, the RAM access control, printer control & status control, power saving control, and the like can be independently performed irrespective of the control of the CPU-P even when the clock of the CPU-P is stopped and when the CPU-P is in a fault state. The above component elements are connected to a bus of the CPU-P. RAM-P is an RAM (random access memory) having a work area which is used as a register, a line buffer to store print data of one line, a dot development buffer in which data has been again developed to dots, an input buffer from a parallel IF, and areas for emulation information recording and the like. The RAM-P is connected to the control unit by an RAM bus. The RAM-P can be accessed from a plurality of controllers including a CPU-P, which will be explained hereinlater, by an RAM controller of the control unit. Printer driving control signals are generated from the control unit. An FM driver, a CM driver, a head driver, and heater driver convert the printer driving control signals into the driving levels of an FM (feed motor), a CM (carrier motor), a BJ-Head, a heater, and the like, thereby driving the FM, CM, and BJ-Head of the printer. As power saving control signals, there are power control signals such as Vcc1P-off, Vcc2P-off, and Vp-off from the control unit. As input signals, there are signals of Printer-off, printer sensors, and operation panel SW. As output signals, there are an LED driving signal of the operation panel and the like. Among them, a power source of Vcc1-P is supplied due to only a change in Printer-off signal from the active state to the inactive state and power sources can be supplied to only the control unit, CPU-P, and RAM-P. The Vcc1P-off signal can shut off the power source of Vcc1P at a changed OFF timing in accordance with the driving state of the printer by the Printer-off signal. Namely, since the power source is shut off when the cap of the head is open, the apparatus does not suffer a deathblow.

Figure 4:
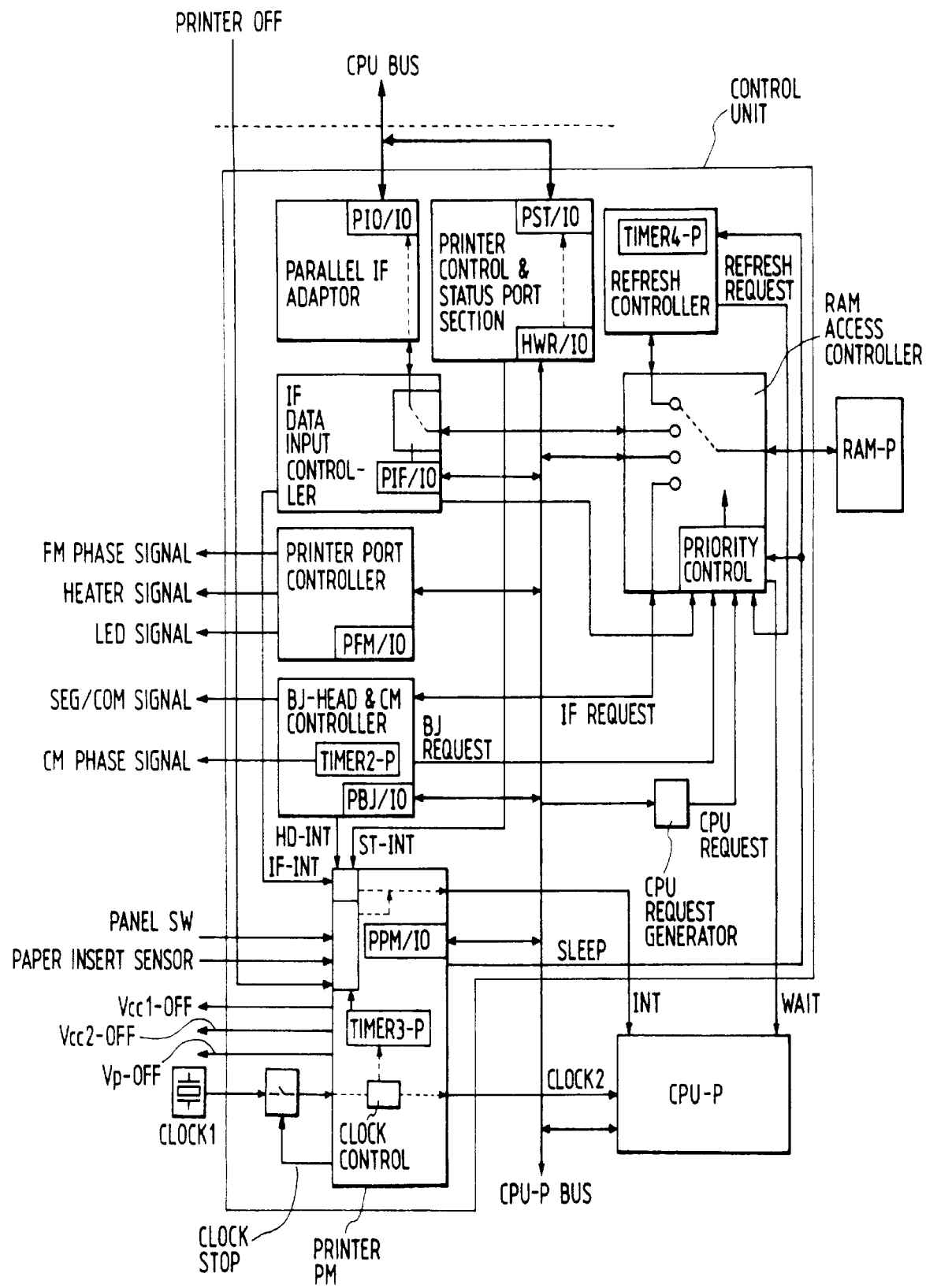
FIG. 4 is a block diagram showing the inside of a compound control unit.

FIG. 4 shows a constructional diagram of the control unit.

A functional block is constructed by: a parallel IF adapter which mainly functions as an IF adapter from the host computer side; an IF data input controller to store parallel data into an input-buffer of the RAM-P through the parallel IF adapter; a printer control & status port section to mainly directly check and control the status of the printer from the host computer side; a refresh controller to generate a refresh timing of the RAM-P; a BJ-Head/CM controller for reading out dot development data of one line from the RAM-P and driving the BJ head and printing, while also controlling a phase excitation of the carrier; a printer port controller to drive the FM, heater, LED, and the like; an RAM access controller having access rights in accordance with the priorities for four access requests of the IF data input controller, refresh controller, BJ-Head/CM controller, and CPU-P; and a printer PM to perform a power saving control. The power saving control will be explained hereinlater. The return of the CPU-P to the ordinary processing mode from the low electric power consumption mode to stop the supply clocks in the fault state is realized by various kinds of interruptions which are concentratedly managed by the PM controller. After all of the conditions to return the CPU-P were satisfied, a signal is generated as INT, so that the CPU-P restarts the operation and executes the processings.

Figure 5:
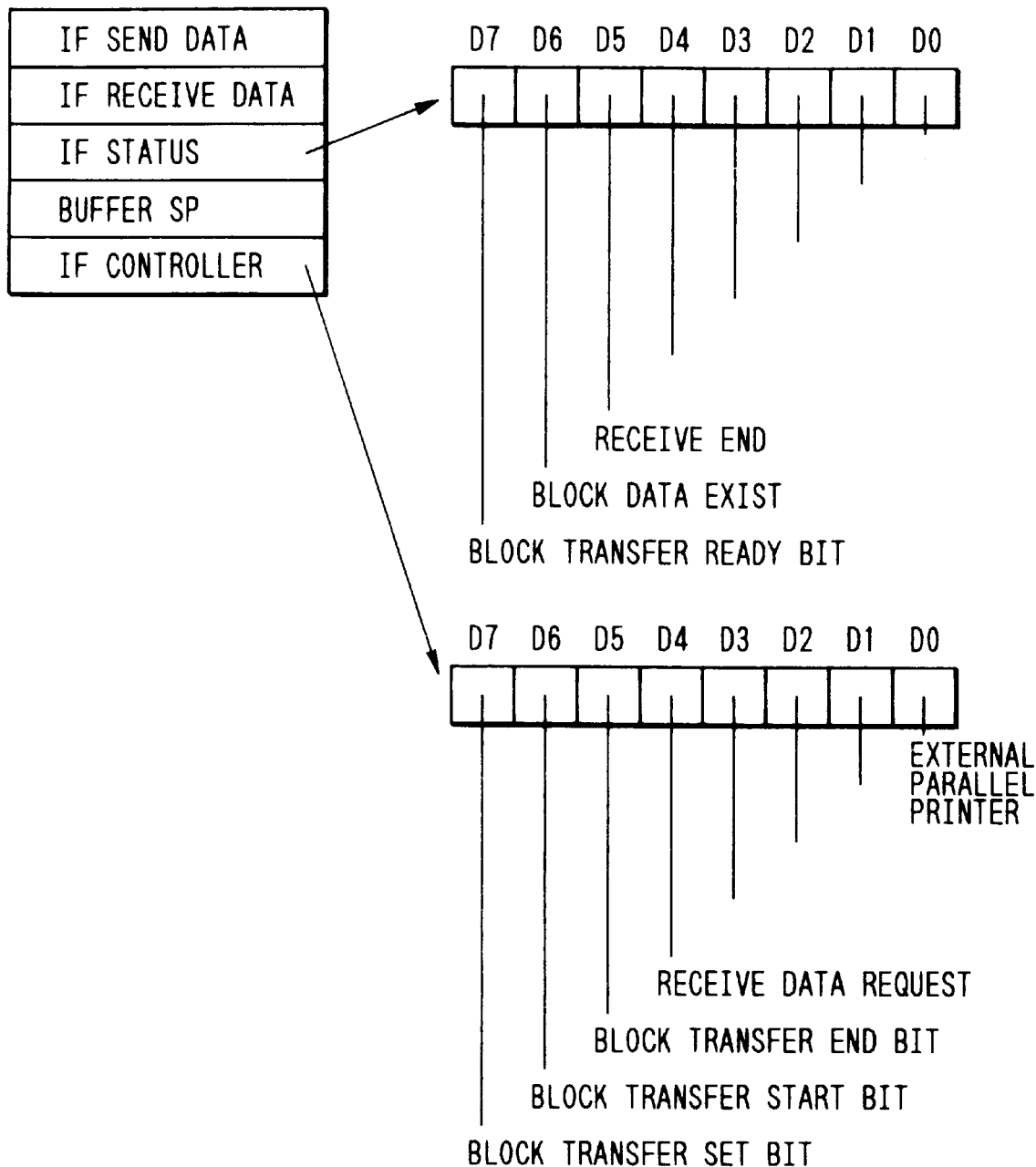
FIG. 5 is a constructional diagram of a PIO/IF register.

FIG. 5 shows a construction of the IO register (PIO-IO) which is seen from the host computer side of the parallel IF adapter. The PIO/IO comprises registers such as IF send data, IF receive data, IF status, Buffer SP, and IF controller and is a group of registers for parallel IF transfer control from the host computer to the printer.

Figure 6:
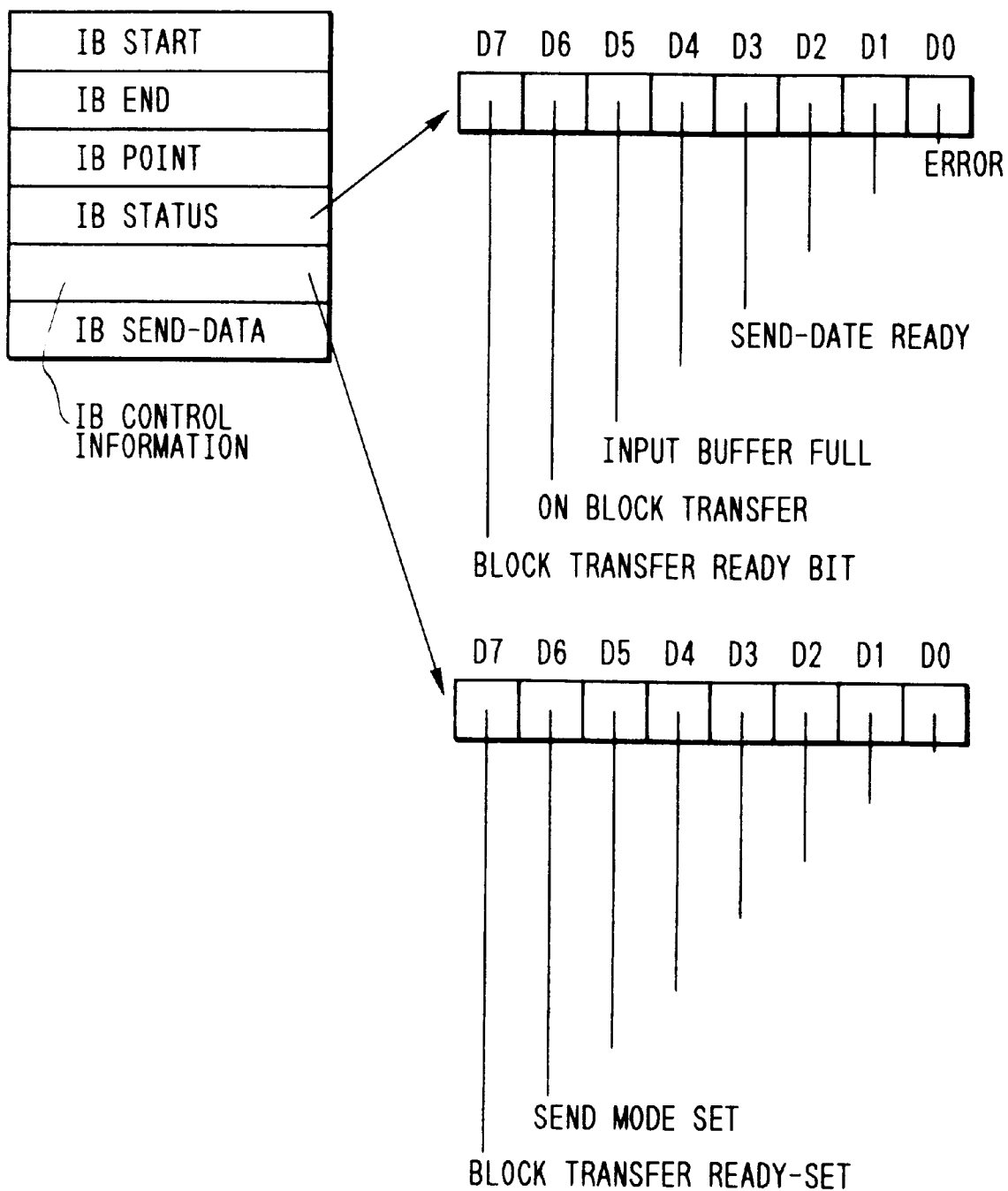
FIG. 6 is a constructional diagram of a PIF/IF register.

FIG. 6 relates to the IF data input controller and shows a construction of the IO register (PIF/IO) which is seen from the printer side and comprises registers such as IB start, IB end, IB POINT, IB status, IB control information, and IB SEND-DATA. Functions of those registers will be explained hereinlater.

Figure 7:
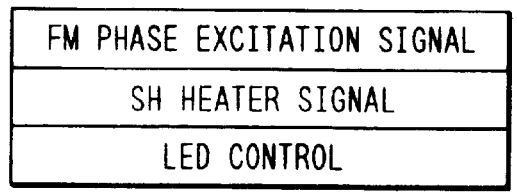
FIG. 7 is a constructional diagram of a PFM/IF register.

FIG. 7 relates to the printer port controller and shows a construction of the IO register (PFM/IO) which is seen from the printer side. The PFM/IO comprises registers of FM phase excitation signal, SH heater signal, and LED control.

Figure 8:
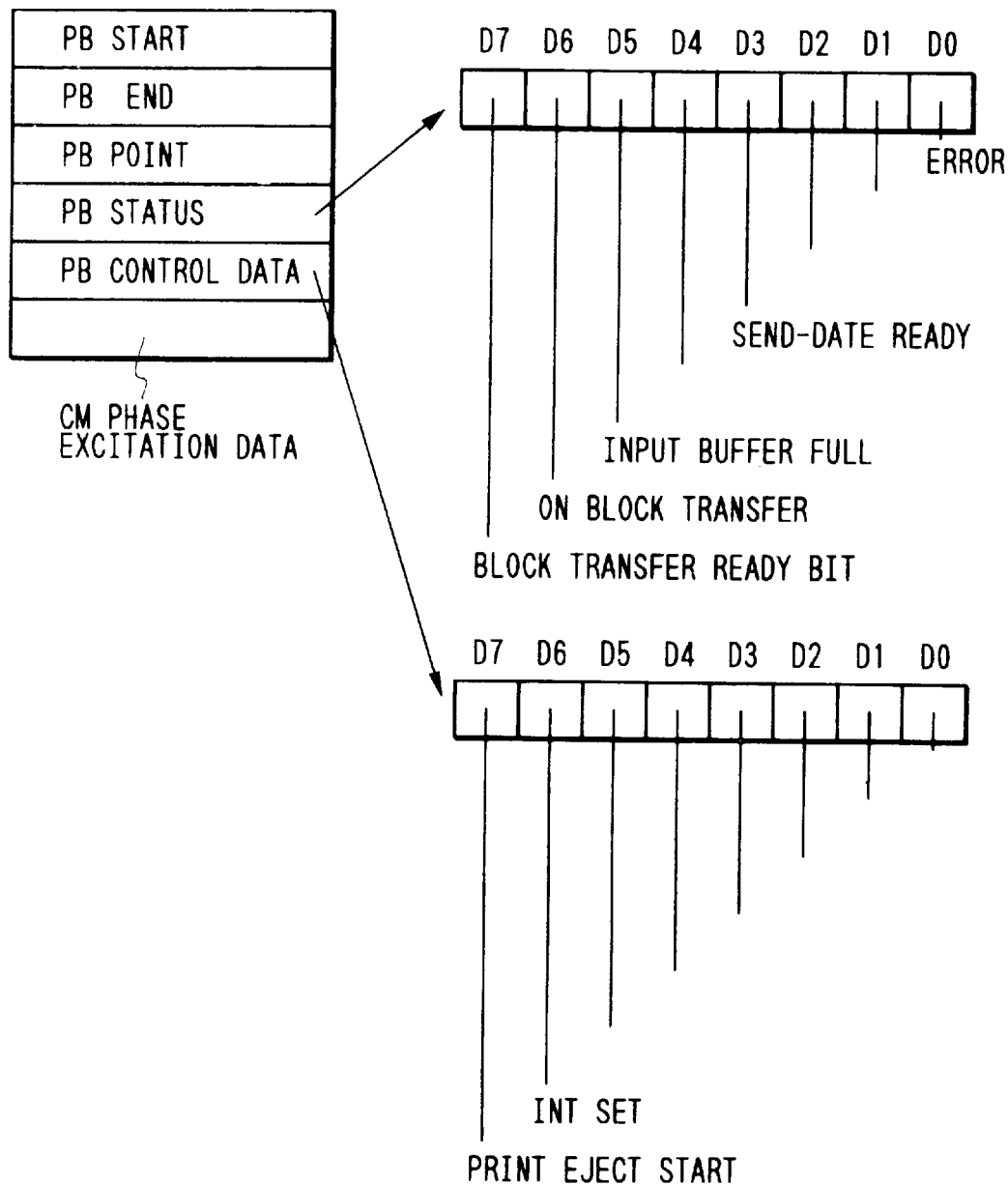
FIG. 8 is a constructional diagram of a PBJ/IF register.

FIG. 8 relates to the BJ-Head/CM controller and shows a construction of the IO register (PBJ/IO) which is seen from the printer side. The PBJ/IO comprises registers such as PB start, PB end, PB PIONT, PB status, PB control data, and CM phase excitation data.

Figure 9:
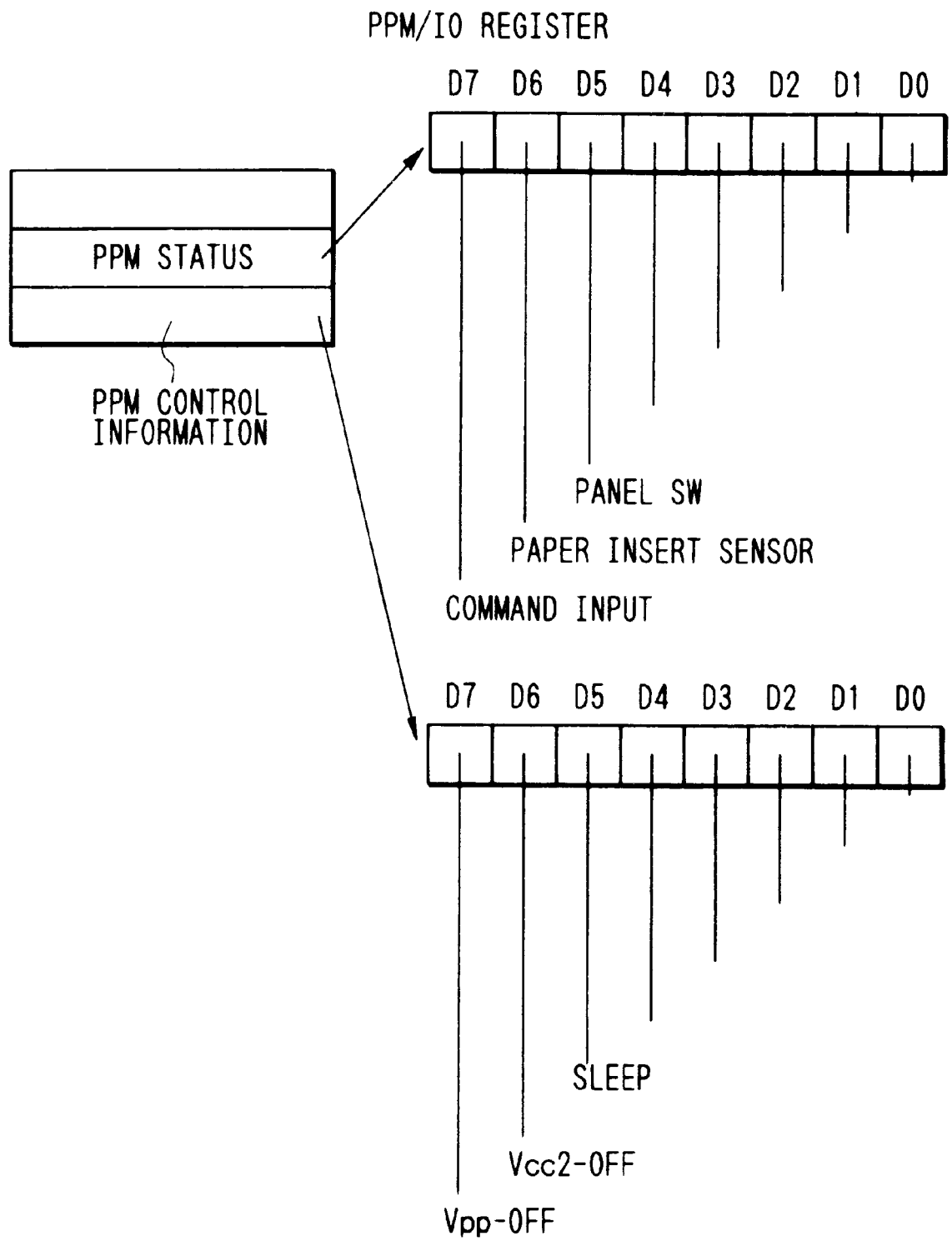
FIG. 9 is a constructional diagram of a PPM/IF register.

FIG. 9 relates to the printer PM and shows a construction of the IO register (PPM/IO) which is seen from the printer side. The PPM/IO comprises registers such as PPM status and PPM control information.

Figure 10:
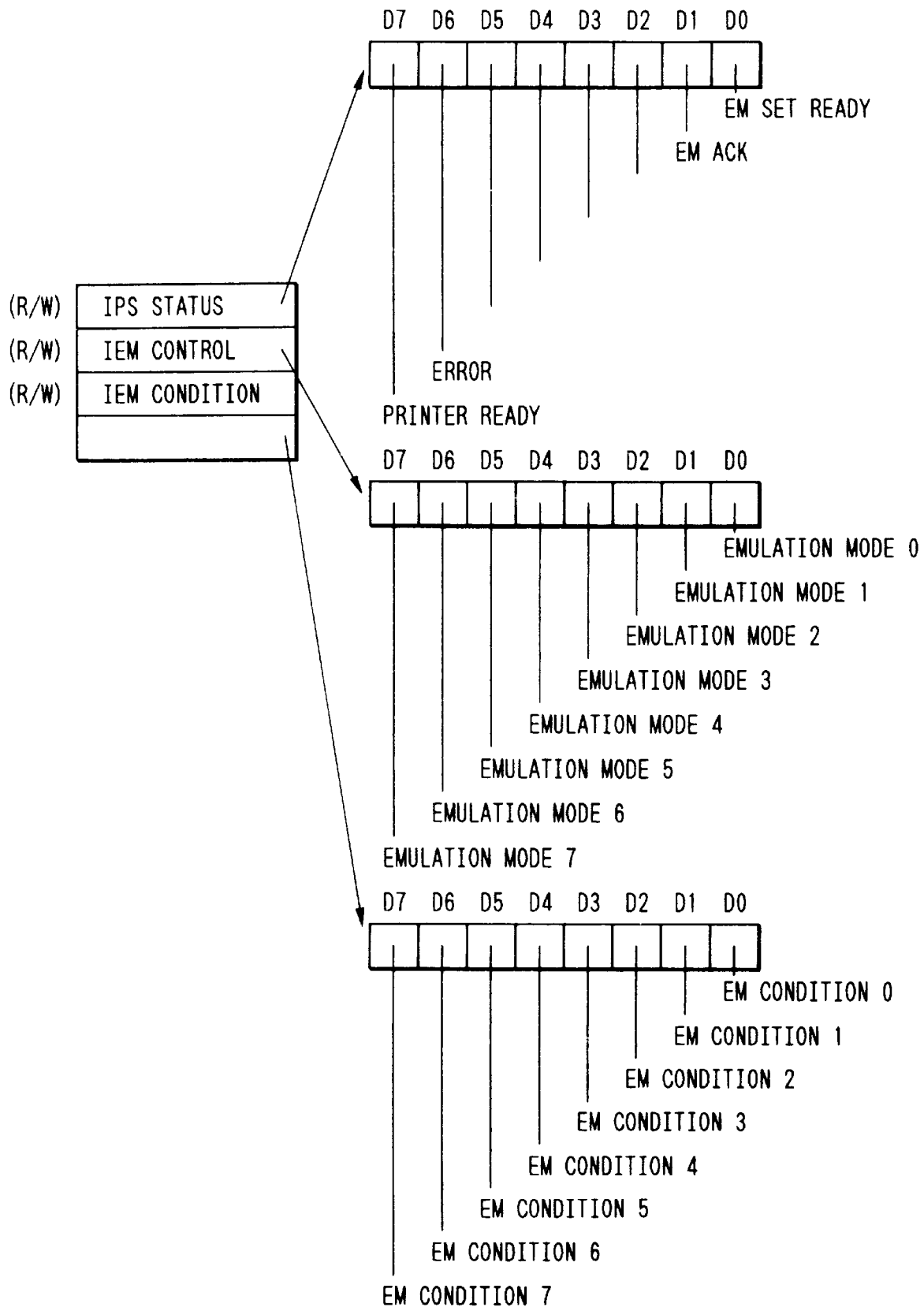
FIG. 10 is a constructional diagram of a PST/IO register.

FIG. 10 relates to the printer control & status port section and shows a construction of the IO register (PST/IO) which is seen from the host computer side. The PST/IO comprises registers such as PS status, EM control, and EM condition.

Figure 11:
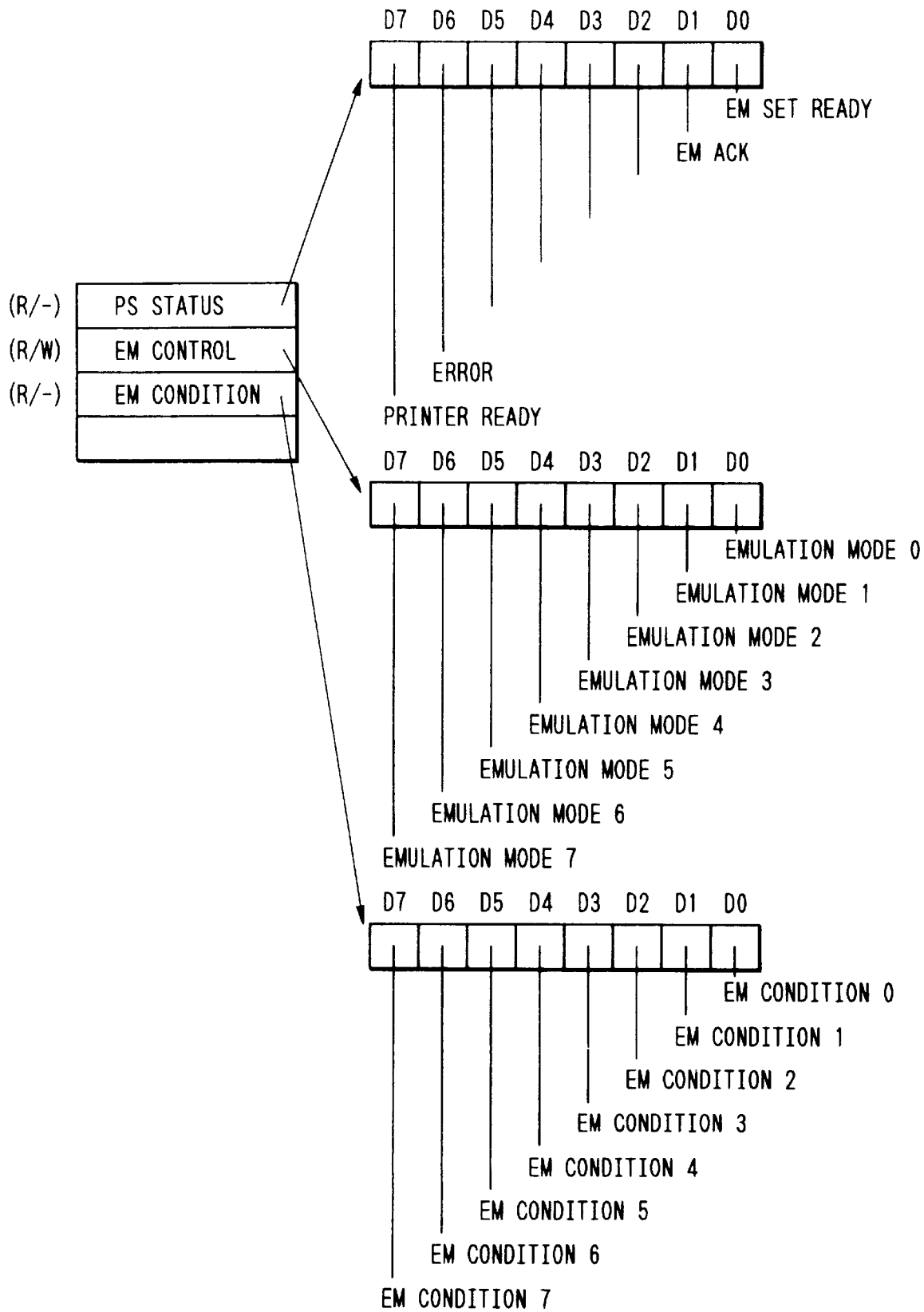
FIG. 11 is a constructional diagram of an HWR/IO register.

FIG. 11 relates to the printer control & status port section and shows a construction of the IO register (HWR/IO) which is seen from the CPU-P side. The HWR/IO comprises registers such as IPS status, IEM control, and IEM condition. The relation between the PST/IO register and the HWR/IO register is processed as follows by the control of the printer control & status port section.

The IPS status register of the HWR/IO indicative of the printer status and the emulation hand shaking status which are written by the CPU-P can be confirmed as it is by the host CPU by the PS status register of the PST/IO. On the other hand, the EM control register and EM condition register of the PST/IO are used for a purpose such that the host CPU changes various kinds of setting conditions regarding the emulation mode setting of the printer apparatus and an individual emulation. That is, when the emulation mode is written from the host CPU into the EM control register, an interruption occurs in the CPU-P of the printer. The emulation mode set by the interrupting process is read out from the IEM control register and is switched to the emulation mode in which the analysis of the command which is transferred from the parallel IF of the printer has been set. Various kinds of printer setting information in the newly set emulation mode and the change mode are written into the IEM control register and IEM condition register. Such information is seen in the EM control register and EM condition register. Therefore, the host CPU can confirm various kinds of printer setting information for the changed emulation mode. Similarly, when the printer setting information is changed, various kinds of printer setting information to be changed are written into the EM condition register by the host CPU, thereby completing the change of the printer setting information. An EM set ready bit and an EM acknowledge bit of the PS status register are used for the above-hand-shaking and indicate that the writing into the EM control register and EM condition register is permitted and that the change of the printer setting information has been completed and the changed status information has been specified in the EM control register and EM condition register. Those bits correspond to the writing operations of the IEM set ready bit and IEW acknowledge bit in the IPS status register of the HWR/IO register from the CPU-P, respectively.

Figure 12:
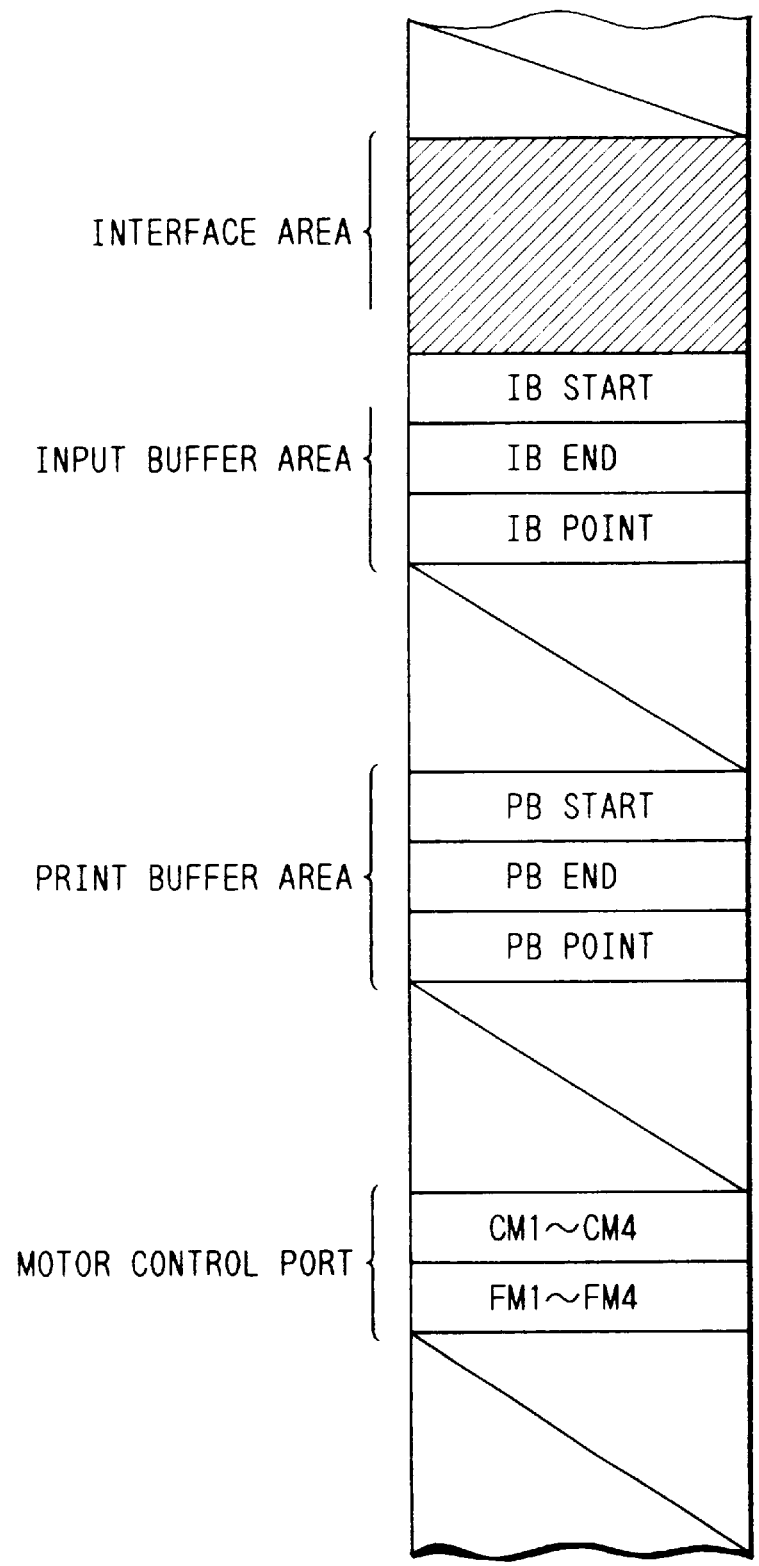
FIG. 12 is a diagram showing a printer I/O register.

FIG. 12 shows a map in the I/O data register of the printer.

A motor control port in the above map is used to control the port by directly rewriting the values in the register, thereby driving each motor ($CM_1$ to $CM_4$, $FM_1$ to $FM_4$).

A print buffer area is used to set a data area necessary for printing. By setting a start address (PB START) and an end address (PB END), the print data is sequentially read out within the range designated by those start and end addresses by a print buffer controller from the start address. The print data is read out from the RAM-P until the address reaches the end address. A control signal is sent to the head driver. In this instance, a print data address pointer (PB POINT) indicates a data address at which the data is at present bent sent.

An input data buffer area is also used to set a data area necessary for data reception. By setting a start address (IB START) and an end address (IB END), the input data is sequentially written within the range designated by the start and end addresses by an input buffer controller from the start address. The input data is written into the RAM-P until the address reaches the end address. In this instance, an input data address pointer (IB POINT) indicates a data address at which the data has already been received at present.

Figure 13:
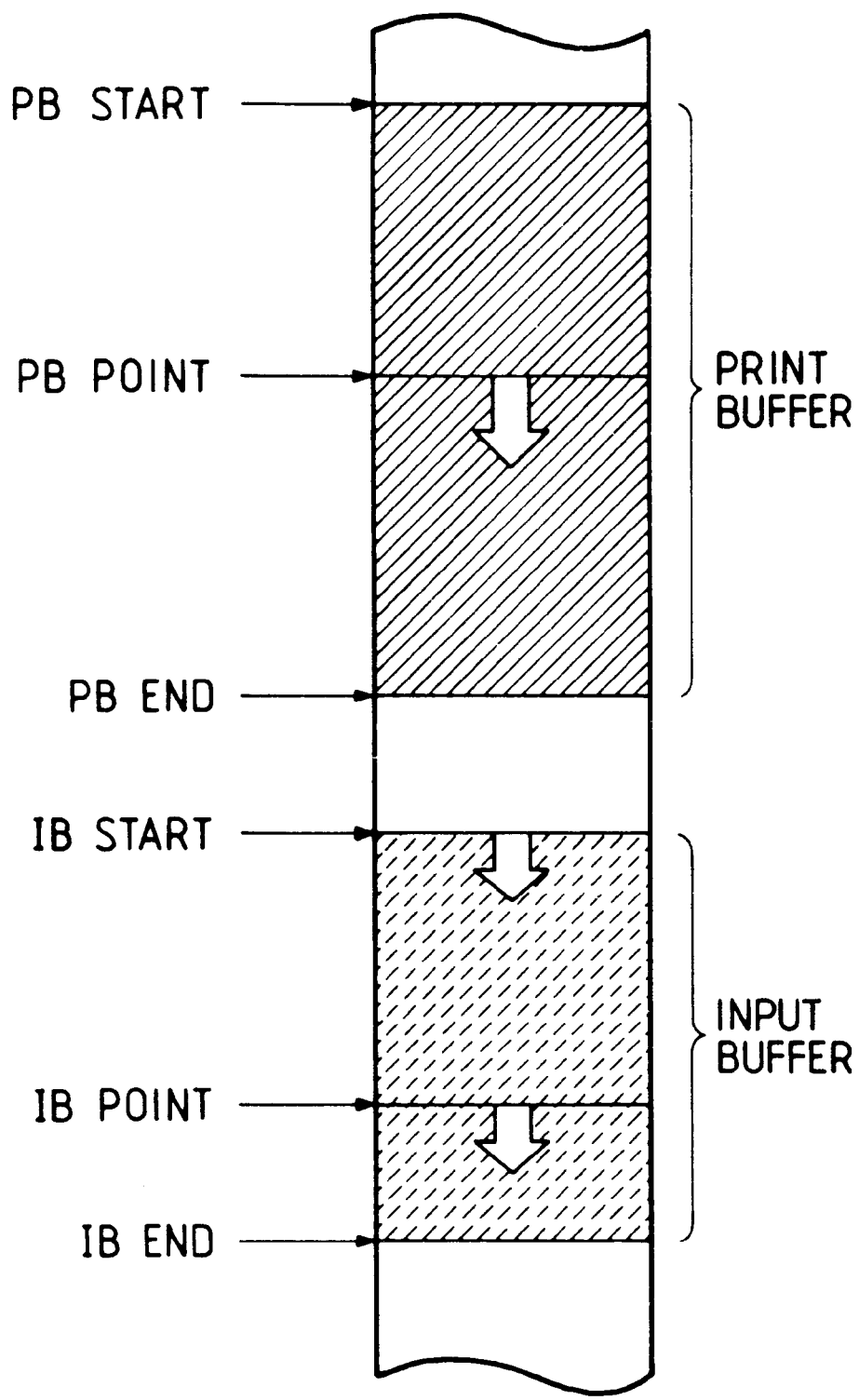
FIG. 13 is a diagram showing an address map in an RAM of a printer.

FIG. 13 shows address areas in a print buffer (PB) and an input buffer (IB) in the RAM-P in the above operations, respectively. As shown in FIG. 12, each address is indicated in a printer I/O register. An interface area is an I/O area which is common between the host computer and the printer.

A portion of the interface area is an area to transmit or receive data to/from the host computer and corresponds to a parallel interface port in the host computer.

Figure 14:
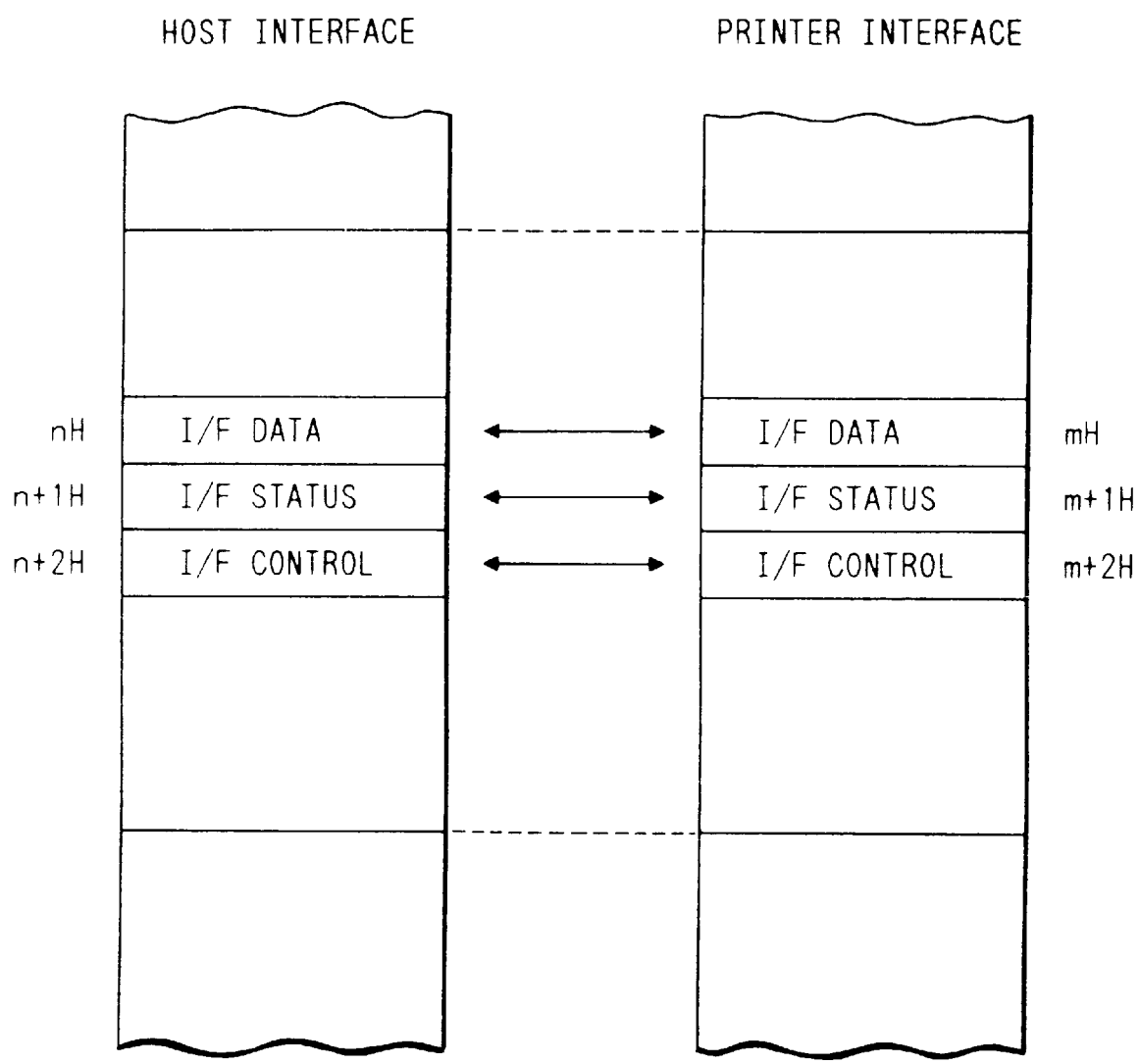
FIG. 14 is a diagram showing an I/O register between the host computer and the printer.

The interface area will now be described with reference to FIG. 14 showing the correlation between the interface areas of the host computer and the printer.

An address map is set so that the addresses of (n, n+1, n+2) which are seen from the host computer side correspond to the addresses of (m, m+1, m+2) which are seen from the printer side in a manner such that the addresses in the I/F data register, I/F status register, and I/F control register on the host computer side are the same as the addresses in the I/F data register, I/F status register, and I/F control register on the printer side.

That is, the registers are constructed so that data can be read and written in the bidirections at the addresses in the above portions.

As shown in FIG. 17, the host computer side also has an I/O register to control peripheral equipment and such an I/O register is used for I/O control in the host computer. Namely, the host computer side has I/O areas of the blocks shown in FIG. 2. Only the control area of the interface among them is common to the interface area of the I/O register on the printer side.

Figure 15:
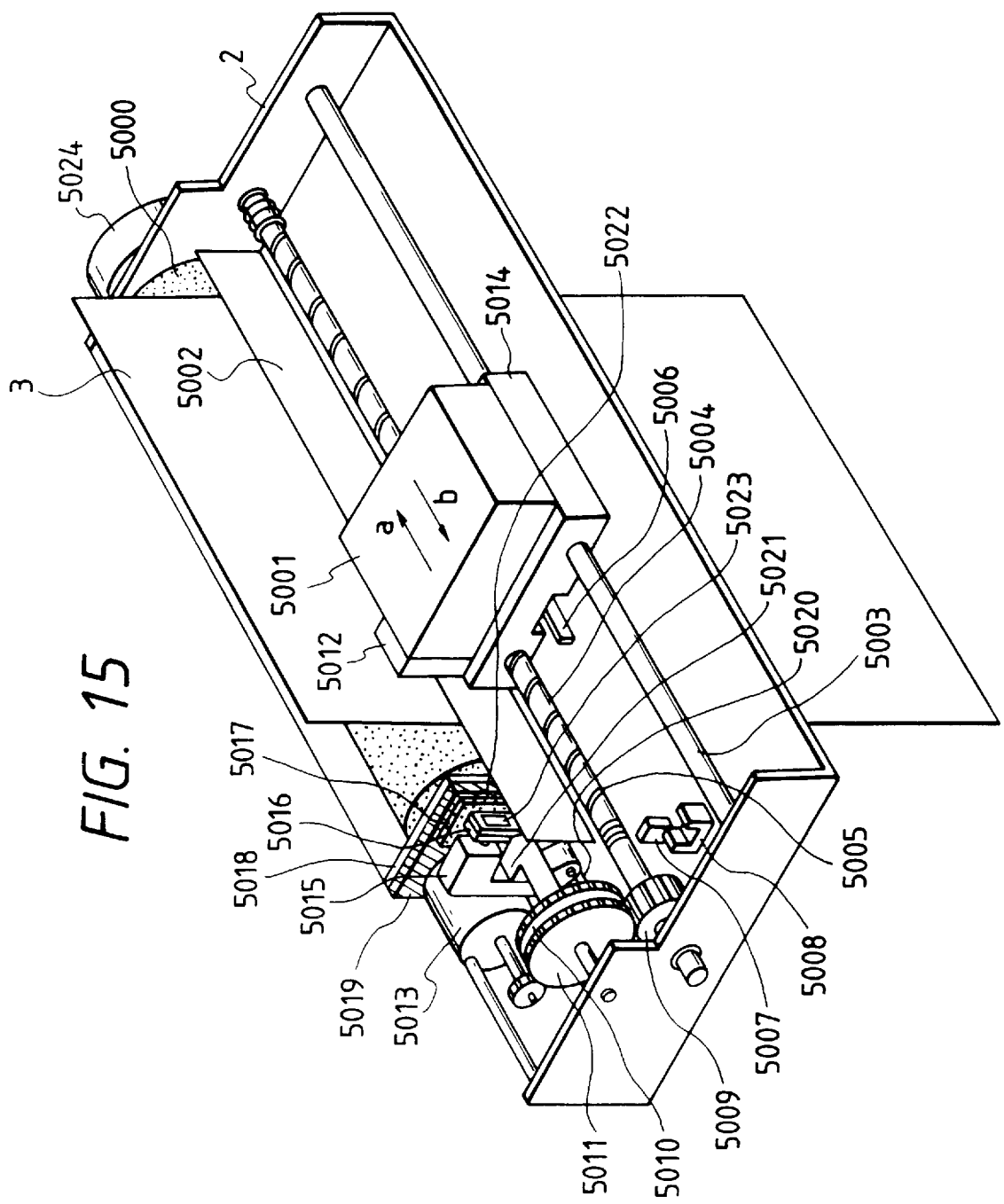
FIG. 15 is a perspective view of an internal unit of the pritner.

FIG. 15 is a perspective view for explaining an internal construction of the printer unit (FIG. 2) using an ink jet recording system to which the invention is embodied or applied. In FIG. 15, reference numeral 5001 denotes an ink tank and 5012 indicates a recording head coupled to the ink tank. An integrated exchangeable cartridge is formed by the ink tank 5001 and the recording head 5012. Reference numeral 5014 denotes a carriage to attach such a cartridge to the printer main body and 5003 indicates a guide to scan the carriage in the sub scanning direction.

Reference numeral 5000 denotes a platen roller to scan a recording paper 3 in the main scanning direction. Reference numeral 5024 denotes a paper feed motor to rotate the platen roller. In the carriage 5014, a flexible cable (not shown) to supply a signal pulse current for driving and a current for adjusting the temperature of the head to the recording head 5012 is connected to a printed circuit board (not shown) having an electric circuit to control the printer.

Further, the printer unit 2 with the above structure will now be described in detail. A lead screw 5005 is rotated interlockingly with the forward/reverse rotation of a driving motor 5013 through driving force transfer gears 5011 and 5009. The carriage 5014 has a pin (not shown) which is come into engagement with a spiral groove 5004 formed on the lead screw 5005. The carriage 5014 is reciprocated in the directions shown by arrows a and b. Reference numeral 5002 denotes a paper pressing plate to press a paper onto the platen roller 5000 in the moving direction of the carriage. Reference numerals 5007 and 5008 denote photocouplers serving as home position detecting means for checking the existence of a lever 5006 of the carriage 5014 in the region corresponding to each of the photocouplers, thereby switching the rotating direction of the motor 5013. Reference numeral 5016 denotes a member to support a cap member 5022 to cap the front surface of the recording head. Reference numeral 5015 indicates sucking means to suck the inside of the cap. The sucking means 5015 executes a sucking recovery of the recording head 5012 through an opening 5023 in the cap.

Reference numeral 5017 denotes a cleaning blade and 5019 indicates a member which enables the cleaning blade 5017 to be moved in the front/rear directions. The cleaning blade 5017 and the member 5019 are supported to a main body supporting plate 5018. It will be obviously understood that the cleaning blade is not limited to the shape as shown in the diagram but a well-known cleaning blade can be also applied to the invention. Reference numeral 5021 denotes a lever to start the sucking operation of the sucking recovery. The lever 5021 is moved in association with the movement of a cam 5020 which is come into engagement with the carriage 5014. A driving force from the driving motor is transferred and controlled by well-known transfer means such as clutch switching means or the like.

That is, by reversely rotating the driving motor 5013 from the home position of the carriage 5014, the driving force transfer gear 5011 is switched to another driving force transfer gear 5010 (the switched state is not shown here). The driving force from the driving motor 5013 is transferred to the lever 5021 through the cam 5020, thereby allowing the capping, cleaning, and sucking recovery of the recording head 5012 to be executed.

Figure 16:
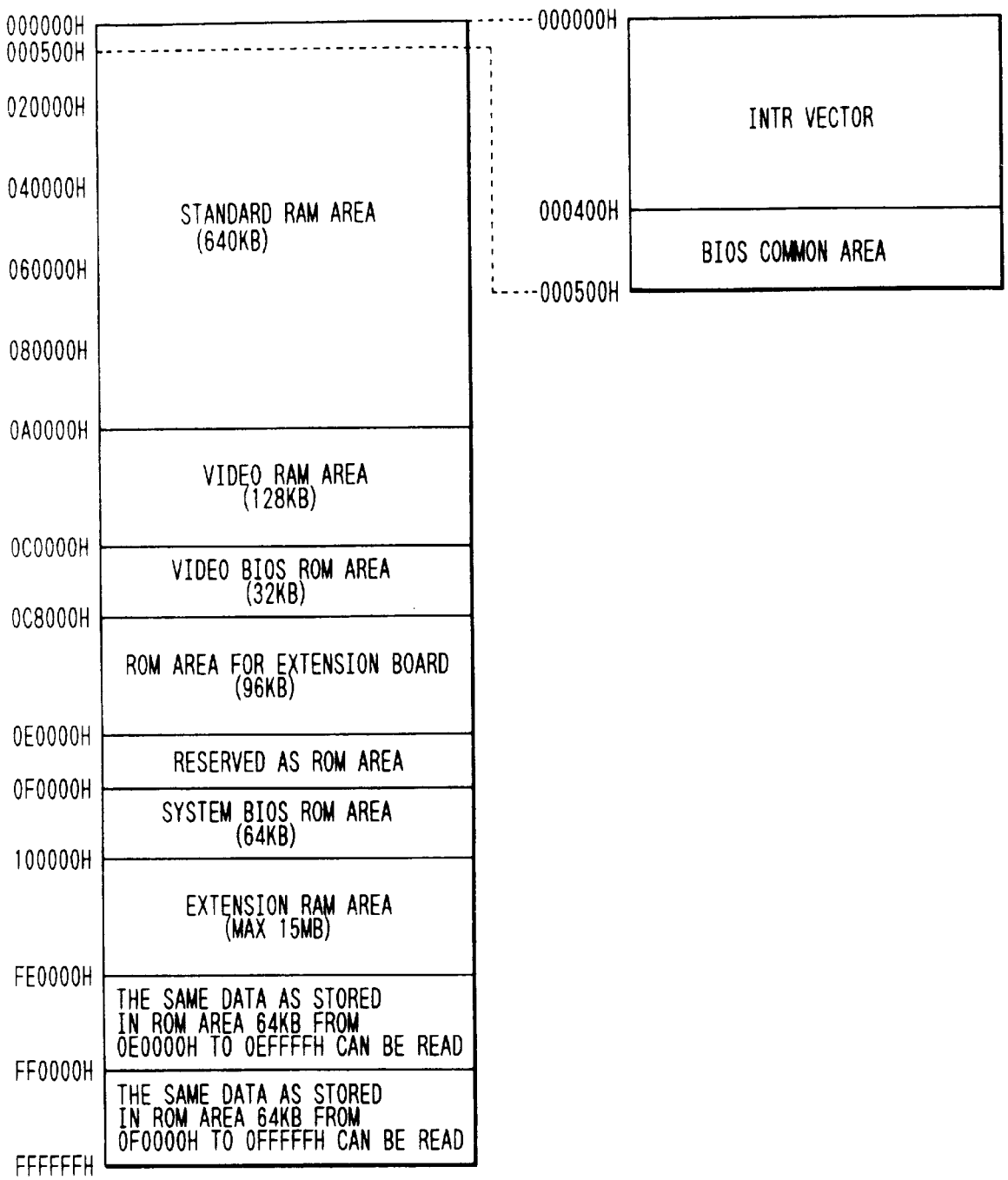
FIG. 16 is a diagram showing a memory map in an RAM in the host computer.

FIG. 16 shows a detailed arrangement of a memory map in the RAM on the host computer side in FIG. 2. Addresses 0000h to A0000h are provided as a standard area in the RAM. Addresses 100000h to FE0000h are provided as an extension area. The standard area has a memory capacity of 640 kB. The extension area has a memory capacity of 15 Mb. Memory areas are mapped in the RAM so as to be arranged in those areas.

An area to preserve a vector for interruption exists in the head portion 00000h to 000400h of the standard area of the RAM. An entry address of each processing for the interruption is preserved in such an area.

A video RAM (VRAM) area and a video BIOS ROM area in FIG. 16 are arranged in the VGAC in FIG. 2. A program for video control is held in the video BIOS ROM area. Video display data is held in the video RAM area.

An area from C8000h to E0000h is an extension ROM area which is used by an extension board or the like.

An area from F0000h to 10000h is arranged in a BIOS ROM area and holds a BIOS program to execute various kinds of I/O processings.

FIG. 17 shows an address map of each I/O. By reading or writing data from/to the address port set for each hardware, data is transmitted or received to/from each of the hardwares. For example, the keyboard will now be described. The data transmission and reception with a keyboard controller are executed through ports arranged in the addresses 60h to 64h. By reading out the data reception port among them, data can be received from the keyboard.

The other remaining addresses can be handled in a manner similar to the above.

An area indicated by parallel ports 1 to 3 shows an interface area. As shown in FIG. 14, such an interface area is an I/O space which is common to the interface area of the printer.

FIGS. 18 and 19 are diagrams showing in detail the contents of the interruption vector in FIG. 13. Interruption numbers 0h to Fh are allocated to the hardware interruption. Interruption number of 10h and subsequent numbers are allocated to the software interruption.

The program at the address registered in each entry is executed for each interruption. The address to the program in the ROM BIOS or the address to the program stored in the RAM is set for each entry. Each processing is executed upon hardware interruption and software interruption and each processing is performed.

Processings after the power source of the main body side was turned on will now be described hereinbelow.

Figure 20:
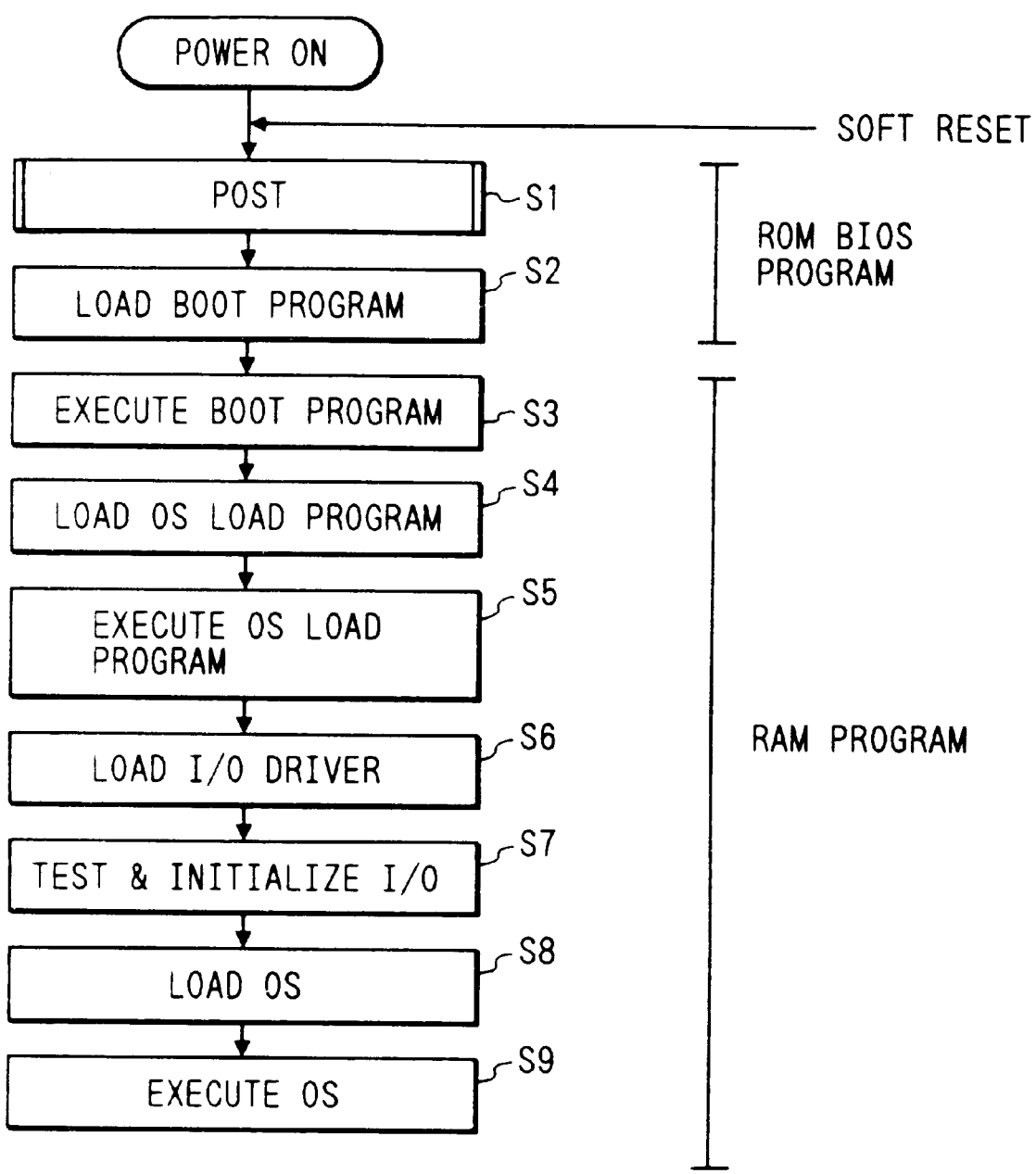

FIG. 20 is a flowchart when the power source is turned on. The processing routine first advances to step S1. In case of the soft reset processing by the keyboard, the processing routine also advances to step S1 in a manner similar to the case of the turn-on of the power source. A POST processing is executed in step S1. The POST processing relates to a power-on self-test and each hardware is tested and initialized. In the next step S2, a boot program for activation of a system program is loaded. The boot program is preserved on an FD (floppy disc), and HD (hard disc), or the like and is arranged at, for instance, a track 0 and a sector 0. By reading the track 0 and sector 0 into the memory, the boot program is loaded. The processes in steps S1 to S2 exist in the ROM BIOS. In the next step S3, the loaded boot program is executed. The boot program is used to load a program to load an OS program from the FD or HD. In the next step S4, the OS load program is loaded. In step S5, the OS load program is executed. The OS load program is used to load the OS into the memory. First, in step S6, the I/O driver is loaded. The I/O driver denotes a program to control the I/O. By the I/O driver, the OS executes the transmission and reception of data with various kinds of I/O. In step S7, the I/O is tested and initialized. In step S8, the OS is loaded into the memory. A preparation to execute the OS is completed by the above processing steps until now. The processing routine subsequently advances to step S9, and the OS is executed. The OS processes the input from the keyboard and displays various messages on the display and communicates with the operator. The OS executes various kinds of command processes in accordance with inputs of various commands of the operator.

Figure 21:
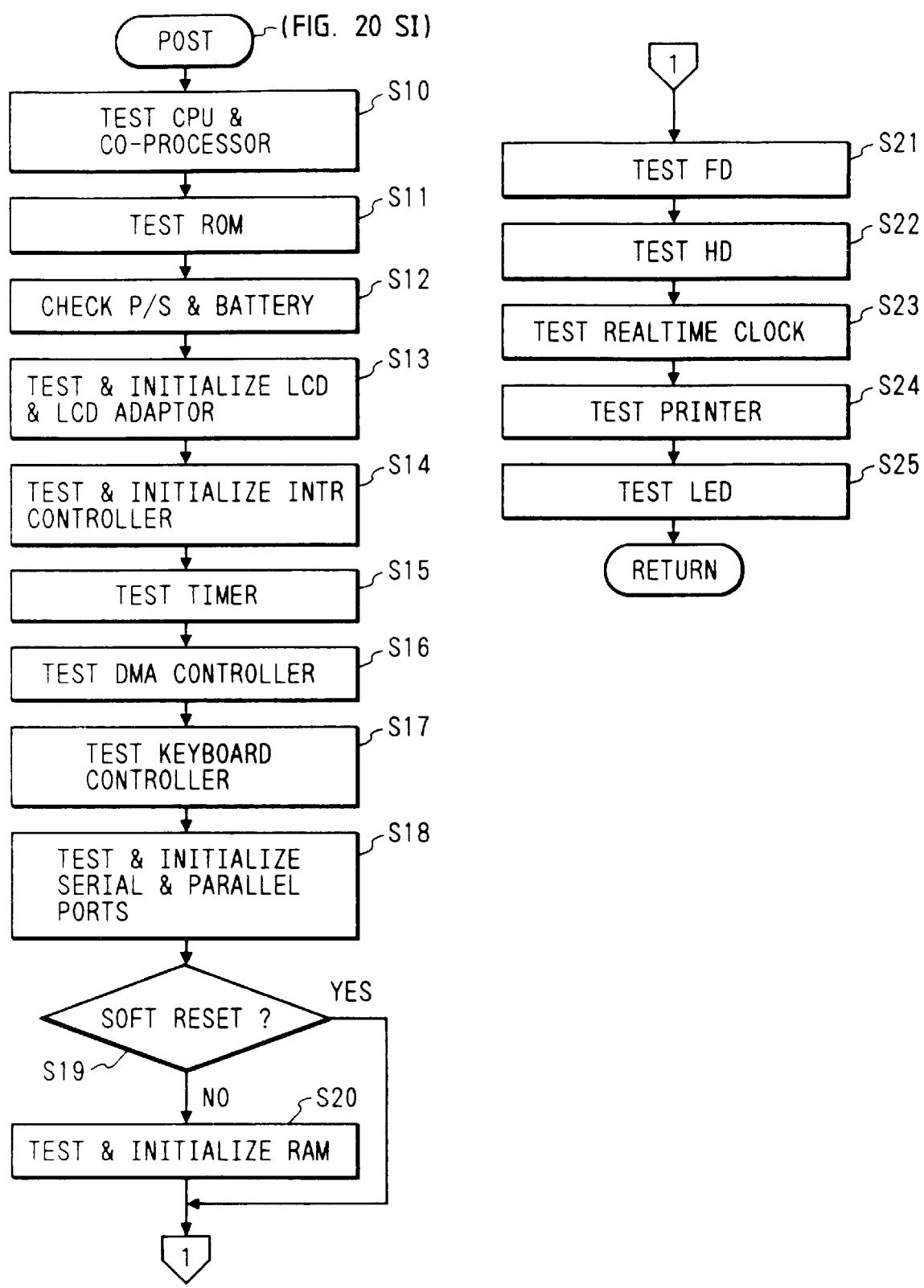
FIG. 21 is a diagram showing a flowchart of POST.

FIG. 21 is a flowchart for explaining the POST processing in step S1 in FIG. 20 in detail. A CPU (FPU numerical value arithmetic operating processor in FIG. 2) is tested (step S10). The ROM is subsequently tested (step S11). The power supply and the battery are subsequently checked (step S12). An LCD and an LCD adapter are tested and initialized (step S13). The LCD adapter also includes an RAM and an ROM and they are also checked. An interruption controller is tested and initialized (step S14). A timer is tested (step S15). A DMA controller is tested (step S16). A keyboard and a keyboard controller are tested (step S17). A serial and parallel ports are tested and initialized (step S18). A check is now made to see if the soft reset mode has been set or not (step S19). If YES, the test and initialization processings of the RAM in step S20 are skipped and step S21 follows. If NO, step S20 follows and the RAM is tested and initialized. The FD is tested (step S21). The HD is tested (step S22). A realtime clock is tested (step S23). The printer is tested. When the printer is tested, various kinds of printer ports and the printer connecting state are checked (step S24). An LED is tested (step S25). The processing routine is subsequently returned. By the above processings, the POST processing shown in step S1 in FIG. 20 is executed. When there is an error or the like in each apparatus, the occurrence of such an error is informed.

A keyboard interruption processing and a key code obtaining processing will now be described. By depressing a corresponding key of the keyboard, an interruption occurs from the keyboard controller and is processed by the interruption controller, and the keyboard interruption processing is executed. In the key code obtaining processing, the preserved key code is extracted from a key buffer by the keyboard interruption and is returned to the necessary processing. The key buffer is provided in the BIOS common area in FIG. 16. The keyboard interruption processing is allocated to a hardware interruption entry 09h or the like shown in FIG. 18. The key code obtaining processing is allocated to a software interruption entry 16h or the like shown in FIG. 18. The keyboard interruption processing and the key code obtaining processing are executed by accessing the software interruption from the keyboard, respectively.

Figure 22:
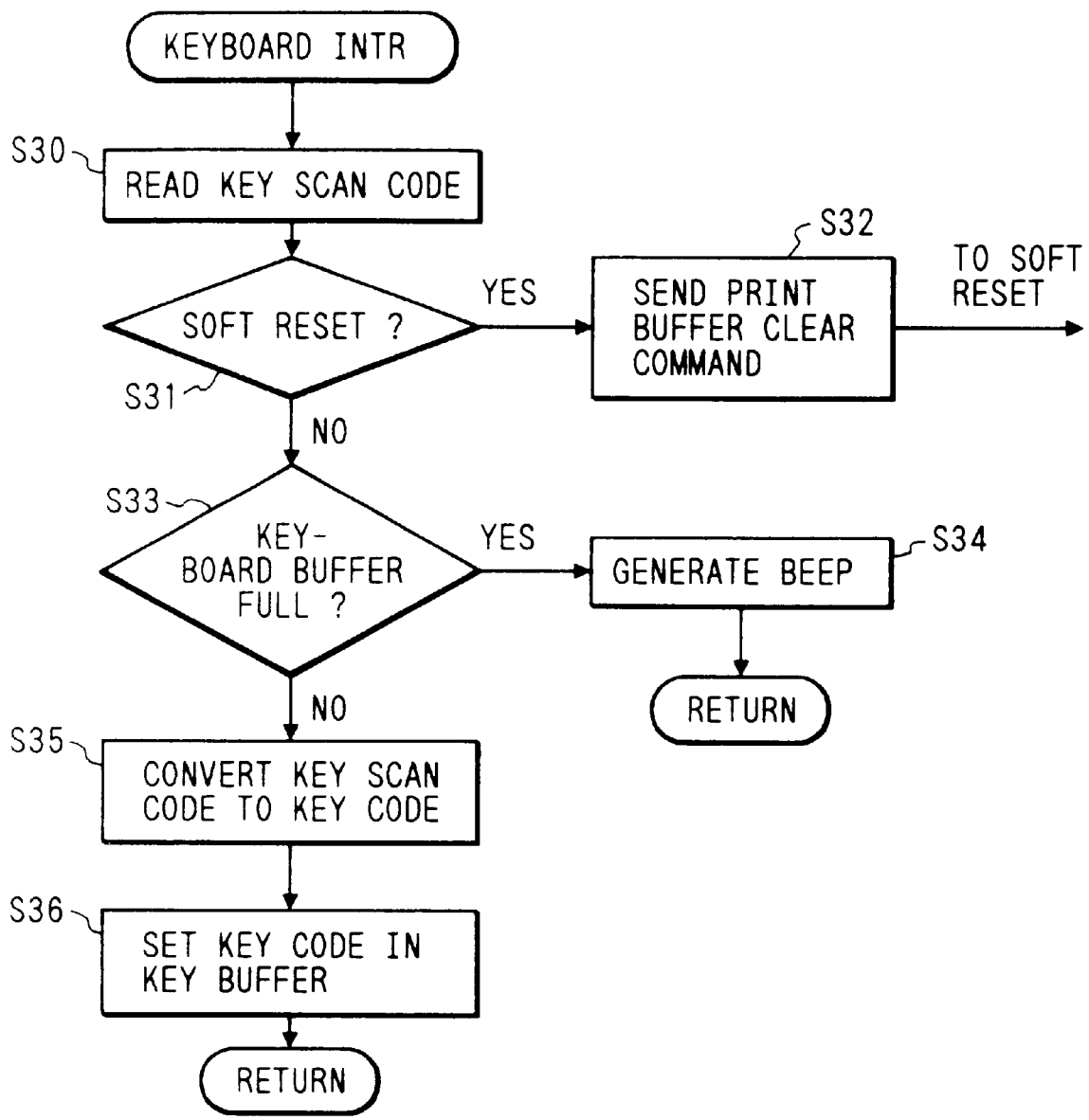
FIG. 22 is a diagram showing a flowchart for a keyboard interruption processing.

FIG. 22 shows a flowchart regarding processings in the case where the keyboard interruption occurs. In the diagram, when the keyboard interruption first occurs, a key scan code is read out from the port allocated to the keyboard of the I/O in step S30. A check is made to see if the read-out key scan code is a code corresponding to the soft reset or not in step S31. If YES in step S31, a print buffer clear command is transmitted in step S32. After it was transmitted, the actual soft resetting operation is started. If NO in step S31, a check is made to see if the keyboard buffer is full or not in step S33. If YES, a beep sound for alarming is generated in step S34 and the processing routine is finished. If NO, the key scan code is converted into the key code corresponding to the character code in step S35. Further, the converted key code is set into the key buffer in step S36 and the processing routine is finished.

Figure 23:
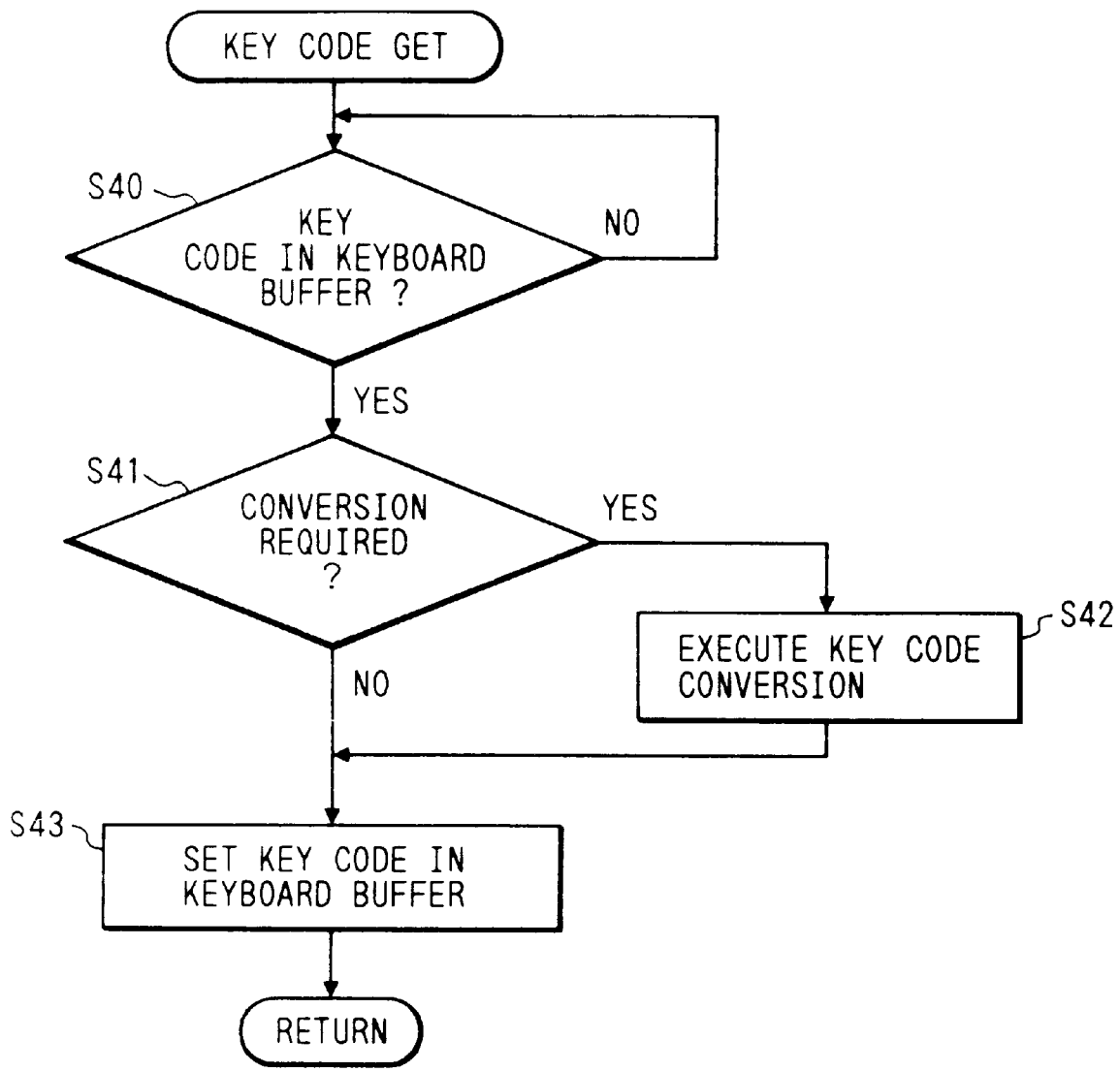
FIG. 23 is a diagram showing a flowchart for a key code obtaining processing.

FIG. 23 shows a flowchart regarding the key code obtaining process.

In the diagram, when the key code obtaining processing routine is started, a check is first made in step S40 to see if there is a key code in the keyboard buffer or not. If NO, the processing in step S40 is repeated and the apparatus waits until the key code is stored into the keyboard buffer. If YES in step S40, a check is made in step S41 to see if it is necessary to convert the key code or not. If YES in step S41, the key code is converted in step S42 (the conversion of the key code occurs mainly in the case where a keyboard differs every country or the like).

If there is not need to convert the key code, or after the key code was converted in step S42 because of the necessity of the conversion of the key code, the key code is set into the keyboard buffer in step S43 and the processing routine is finished.

As described above, when the soft reset is executed within the keyboard interruption processing, the buffer clear command is sent to the printer and the buffer clear processing of the printer is executed.

The case where a country change command is executed will now be described. The OS executes the following country change processing in accordance with a designation of the country change command from the operator.

Figure 24:
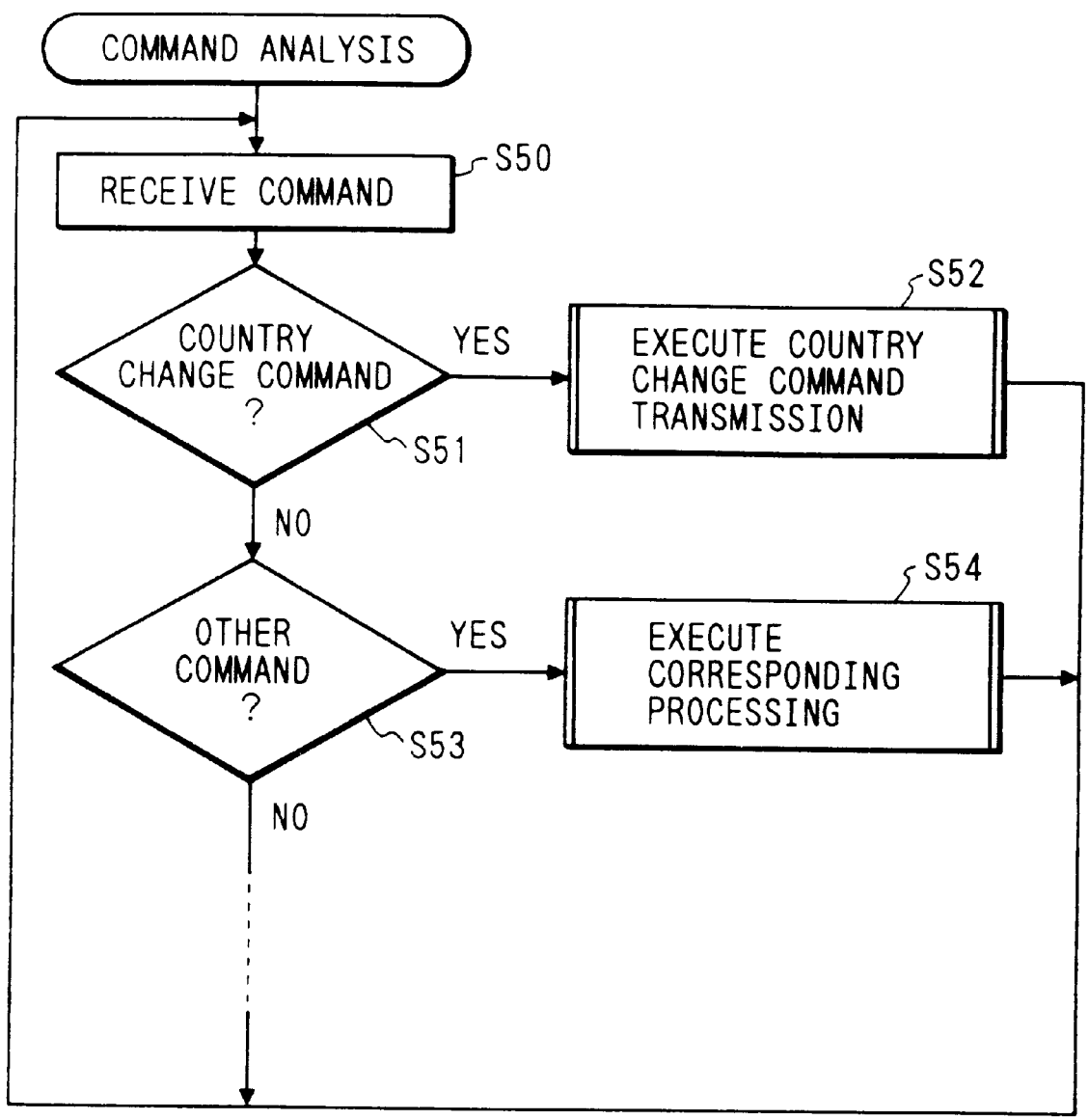
FIG. 24 is a diagram showing a flowchart for a command analysis processing.

FIG. 24 is a diagram showing a flow for a command analysis processing of a command which is supplied from the key in the host computer.

When the command analysis processing is executed, the command input from the keyboard or the like by the operator is received in step S50. A check is made in step S51 to see if the received command indicates the country change command or not. If YES in step S51, a country change print command transmission processing is executed in step S52. The apparatus again waits for input of another command.

If NO in step S51, a check is made in step S53 to see if the input command is another command or not. If YES in step S53, the corresponding processing is executed in step S54 and the apparatus again waits for input of another command.

In steps S53 to S54, similar processings of only the number of necessary commands are extended; however, their detailed descriptions are omitted here.

Figure 25:
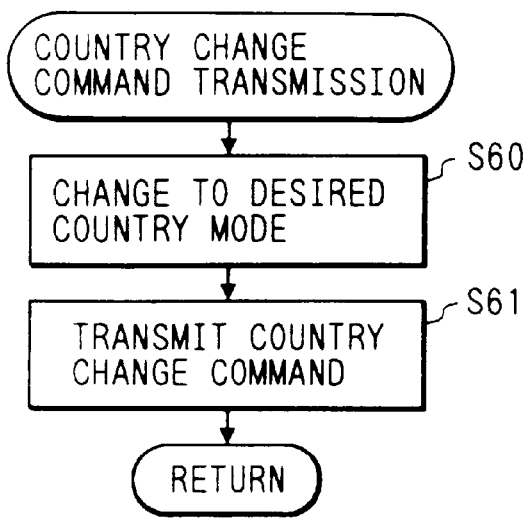
FIG. 25 is a diagram showing a flowchart for a country change processing of the host computer.
Figure 26:
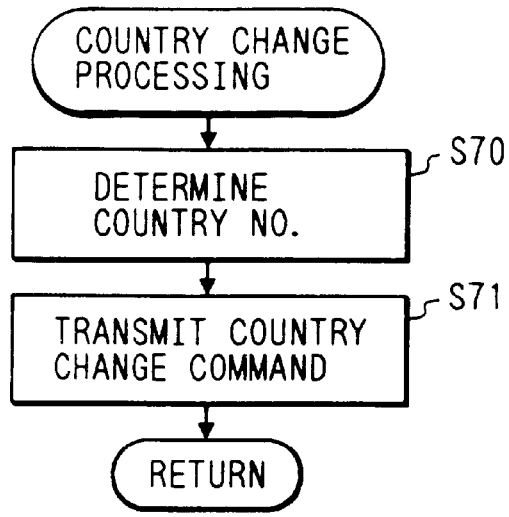
FIG. 26 is a diagram showing a flowchart for a country change processing of the printer.

FIG. 25 is a diagram showing a flow for the country change print command transmission processing on the host computer side in step S52 in FIG. 24.

When the country change print command transmission processing is executed, in step S60, the present country mode set on the host computer side is changed to a desired country mode in accordance with the command sent. Such an information has been stored in the RAM in FIG. 2. After the country mode was changed, a country change print command is transmitted to the peripheral equipment in step S61 in order to perform a similar country change processing. The processing routine is finished.

When the country change print command transmission processing is executed, in step S70, the changed country mode is checked on the basis of the country information stored in the RAM on the main body (host computer) side in FIG. 2. A corresponding country No. is determined so as to be transmitted to the printer side.

In step S71, the country change print command is transmitted in order to change the printer mode to the country corresponding to the determined country No. and the processing routine is finished.

Figure 27:
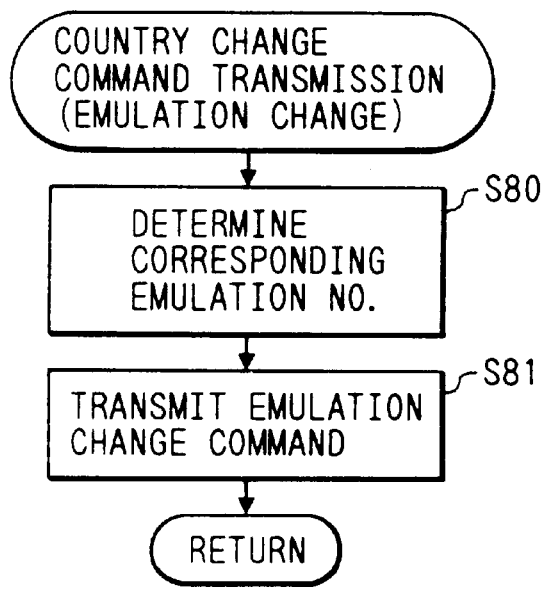
FIG. 27 is a diagram showing a flowchart for a country change processing of the printer.

FIG. 27 is a diagram showing a flow in case of performing the country change print command transmission processing in step S61 in FIG. 25 by the emulation.

When the country change print command transmission processing is executed, in step S80, the changed country information stored in the RAM in FIG. 2 on the main body (host computer) side is examined and the emulation No. corresponding to the changed country information is decided. The emulation No. has been stored in the RAM in FIG. 2 in a table form in correspondence to the country information.

In step S81, an emulation change print command is transmitted to the printer side in order to change the printer to the determined emulation and the processing routine is finished.

By the above processings, due to the generation of the country change command, both of the country mode change on the host computer side and the country change on the printer side or the emulation change on the printer side can be simultaneously executed. The control on the printer side will be described hereinlater with reference to FIG. 46.

The printer side will now be described.

Figure 28:
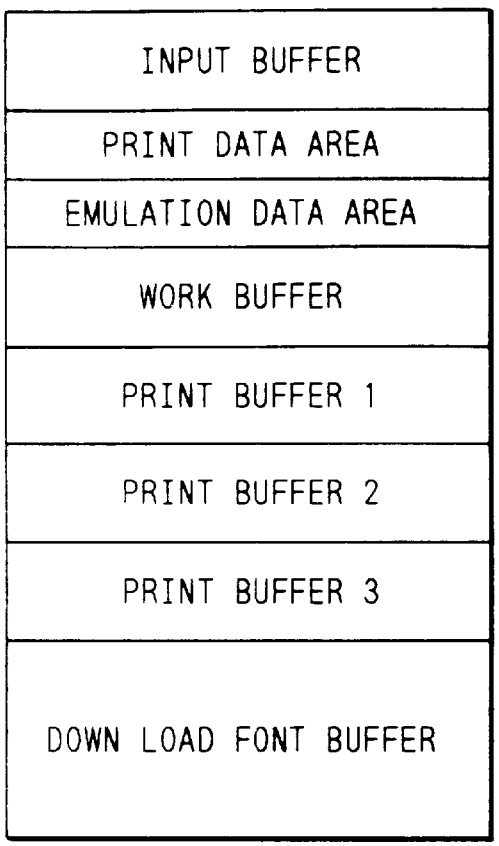
FIG. 28 is a diagram showing the details of the RAM in the printer.

FIG. 28 is a diagram showing the details of a read/write memory which is expressed by the RAM-P shown in FIG. 3 and includes a buffer, a flag, and the like. In the diagram, an input buffer is a buffer to receive the print command and print data which have been transferred from the main body to the printer. Data supplied to the input port of the printer is held in the input buffer as already described with reference to FIG. 13. A print data area is a data area including the flags and registers which are necessary to print. The printing operation is performed by using the values held in the data area, for example, margin information and the like.

Figure 29:
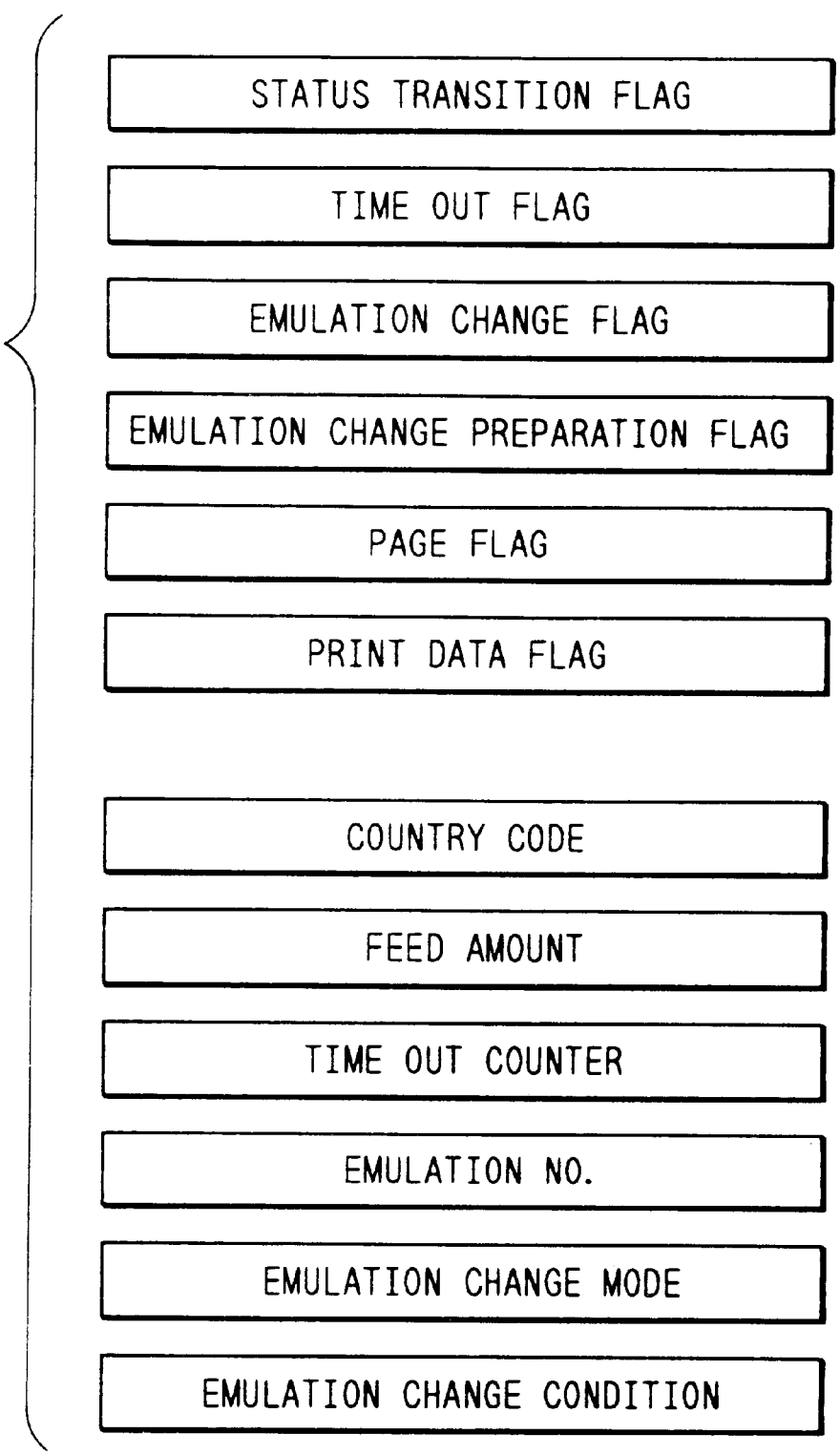
FIG. 29 is a diagram showing the details of print data areas.

FIG. 29 shows the detailed contents in the print data area shown in FIG. 28. The print data area includes: a status transition flag to indicate a writing status of the I/O register; a time out flag to indicate the time out of the data reception; an emulation change flag to indicate an emulation change request; an emulation change preparation flag; a print data flag to indicate the presence or absence of the print data; and the like. The print data area also includes: a country code register to hold a country code; a feed amount register to hold a feed amount of the paper; a time out counter register to count the time out of the data reception; an emulation No. register to hold the emulation No. to be changed; an emulation mode register to hold the emulation change mode; an emulation change condition register to hold an emulation change condition; and the like.

The emulation data area is a data area including the flags, registers, and emulation information which are necessary for each emulation. The emulation processing is executed by using the values held in the emulation data area. Further, the contents in the emulation data area are shown in detail in FIG. 30. A work buffer is a work area which is temporarily used for printing and emulation and is used for works such as process of data, change, and the like. Print buffers 1 to 3 are areas to hold the data to print. Print image data formed by the emulation is held in the print buffers. The data held in the print buffers is transferred to the printer and the printing is performed. The data of a capacity that is needed to print of one time can be stored in one of the print buffers 1 to 3. In the embodiment, three print buffers 1 to 3 are provided. The reason why a plurality of print buffers are prepared is because while one print buffer is used to actually print the data, a print image can be developed into another remaining print buffer. Consequently, the data development into the print buffer and the printing operation can be executed in parallel. A down load font buffer is a font buffer area. When fonts other than the font data provided in the printer are printed, such a down load font buffer is used to print those fonts by transferring the font data from the main body. When the fonts are transferred into the down load font buffer, the print data is printed by the fonts held in the font buffer area.

Figure 30:
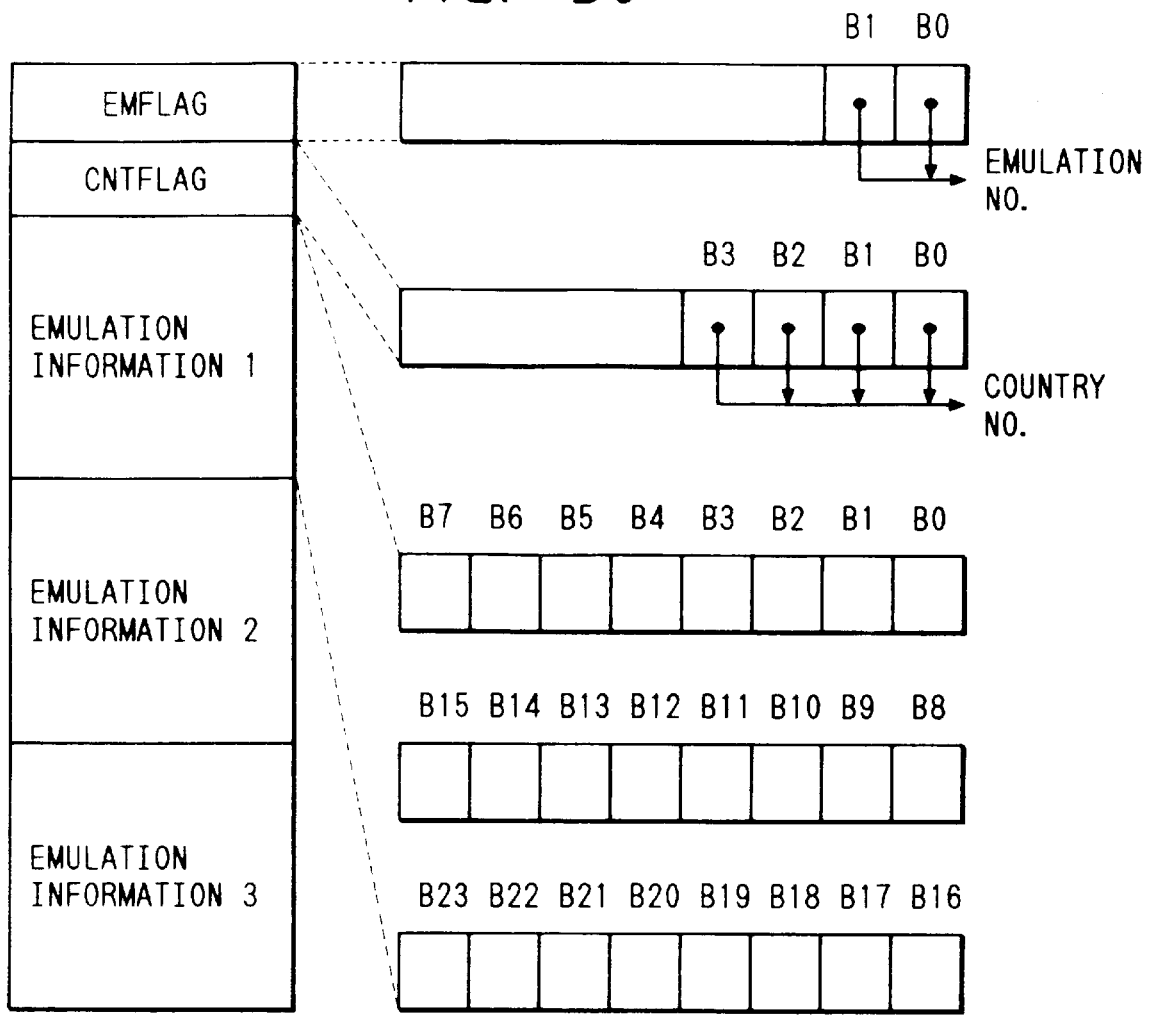
FIG. 30 is a diagram showing the details of emulation data.

FIG. 30 is a diagram showing in detail the emulation data area. The emulation number is held in an emulation flag EMFLAG area. The EMFLAG indicates the corresponding No. of the emulation by using two bits $B_0$ and $B_1$. The bits $B_0$ and $B_1$ can have a value of 0 to 3: 0 indicates the emulation 1; 1 indicates the emulation 2; and 2 indicates the emulation 3. In the embodiment, they correspond to the emulations 1 to 3 and each emulation corresponds to the value registered in the emulation flag EMFLAG. When the emulation change command is executed, the designated emulation No. is set into EMFLAG. A country flag CNTFLAG area is a buffer to hold the country No. and the country No. is designated by four bits of $B_0$ to $B_3$ and is held. An arbitrary value of 0 to 15 can be set by the four bits of $B_0$ to $B_3$ and the country No. can be expressed by such a value. In the embodiment, since the embodiment relates to two countries of Japan and U.S.A., it is assumed that 0 indicates U.S.A. and 1 indicates Japan. An individual value can be also set to each of the other countries. The country No. is set into a country flag in accordance with a country setting command. Emulation information areas 1 to 3 are areas to hold the emulation information which is held by each emulation. The emulation information areas are expressed by 24 bits of $B_0$ to $B_{23}$. Each of the bits $B_0$ to $B_{23}$ is used to designate the information, for example, character quality or page length which is necessary for each emulation. In addition to such information, a value as an initial value which is used in each emulation is held in the emulation information area. Those information can be set and changed by setting and change commands of each information. The information corresponding to the emulation which is at present being executed is rewritten. In the embodiment, although the explanation of the content of each bit is omitted, it can have necessary emulation information. Although each of the emulation information areas 1 to 3 has a similar format, the contents of the bits can be specified for each emulation.

Figure 31:
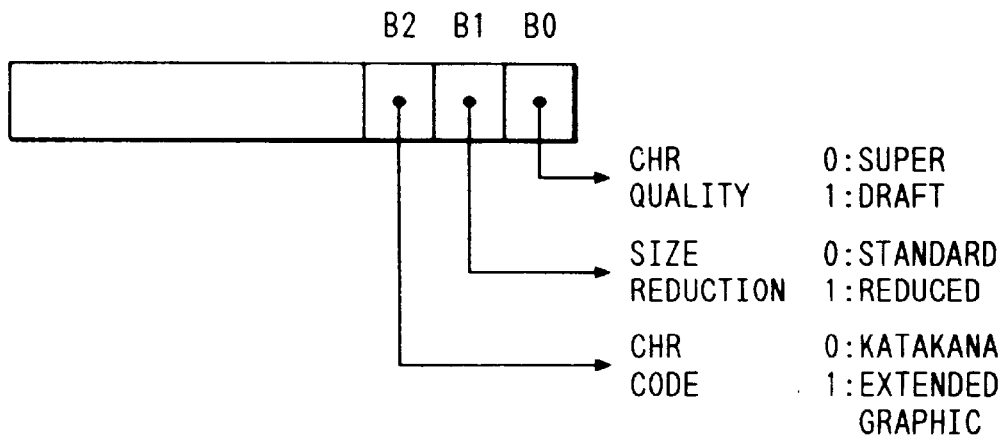
FIG. 31 is a diagram showing a practical example of emulation information.

FIG. 31 shows a specific example of emulation information. In the example, functions of the character quality, reduction character, and character code are provided for each bit by using two bits of $B_0$ to $B_2$ and each bit indicates the setting of each function in each emulation by 0 or 1. It is possible to set such that each emulation has a similar format or different formats. It is also possible to classify the emulations so as to have several values by using a plurality of bits.

Each emulation is executed in accordance with the values held in the emulation data area.

Figure 32:
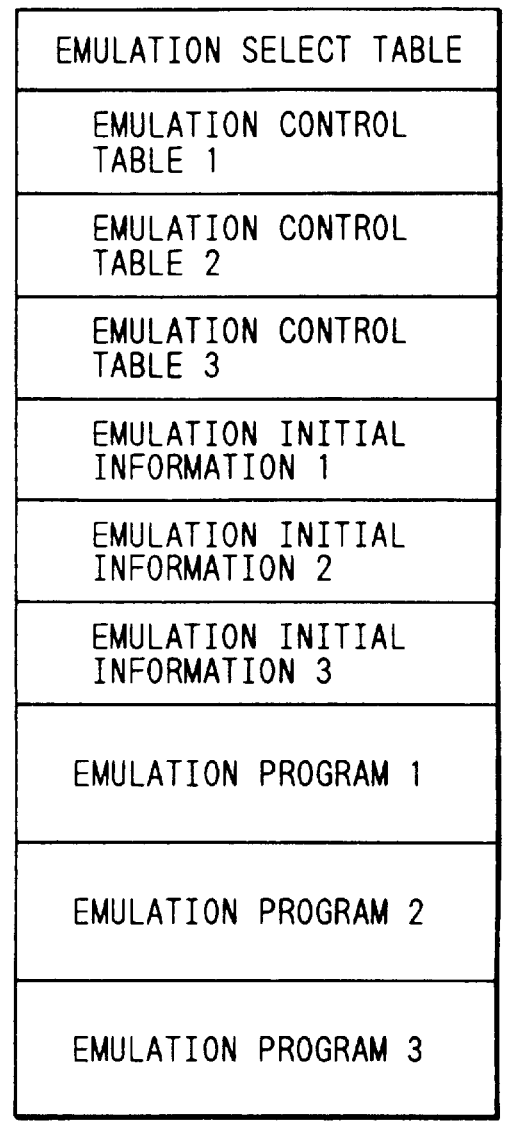
FIG. 32 is a diagram showing a table to execute emulation.

FIG. 32 is a diagram showing a table to execute the emulation. The table is held in the ROM-P (on the printer side) in FIG. 3. An emulation select table includes a pointer to indicate each emulation control table and corresponds to each of tables 1 to 3. Emulation control tables 1 to 3 are management tables of the emulations 1 to 3 and correspond to the respective emulations. Emulation initial information 1 to 3 are tables to hold the initial values of the emulation information and have the initial values in accordance with the emulations. The initial values are used as initial values when the command is designated and when information is not set yet. Those initial values are set into the areas of the emulation information 1 to 3 in FIG. 30. Programs of the emulations are held in the emulation program areas 1 to 3. When each emulation is executed, either one of emulation programs 1 to 3 is executed.

Figure 33:
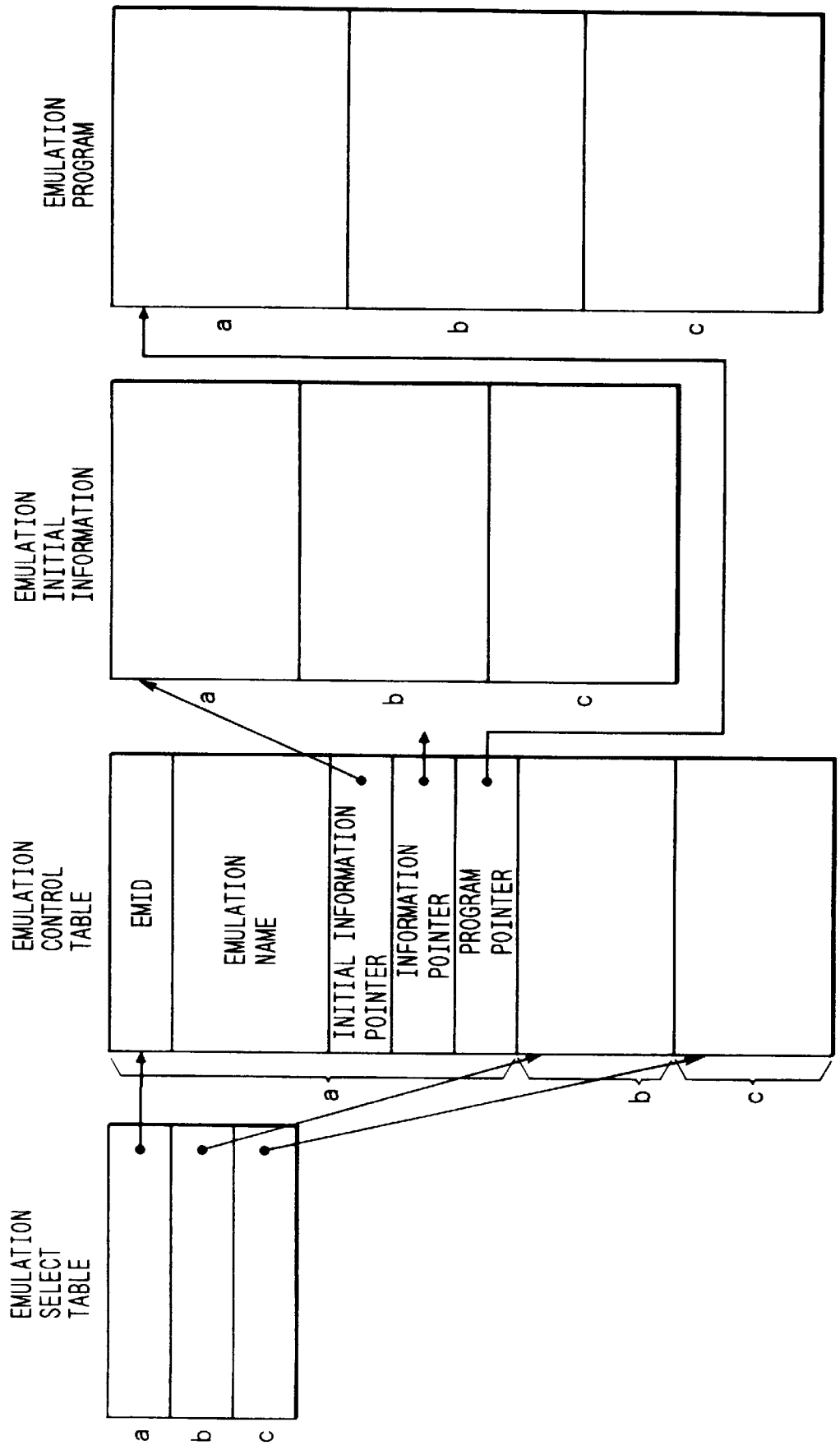
FIG. 33 is a diagram showing a construction of a table to execute emulation.

FIG. 33 is a diagram showing a construction of tables shown in FIG. 32. Indicates a pointer and holds its address. An emulation select table has pointers to emulation control tables a to c. The emulation control table has an emulation ID (EMID). EMID is an identifier of the emulation corresponding to each emulation and has a different value for each emulation. An emulation name is expressed by a character train indicative of the name of emulation and can be used when the user wants to know the name of emulation. An initial information pointer indicates a table including the initial value of the emulation initial information and designates a table of each initial information. An information pointer indicates each emulation information, namely, the emulation information in FIG. 30 and designates the present emulation information. The emulation is executed on the basis of the data existing before the information pointer. A program pointer indicates an emulation program and designates a program which is executed by each emulation. The program pointer is used as an address of each program when each emulation is changed.

Figure 34:
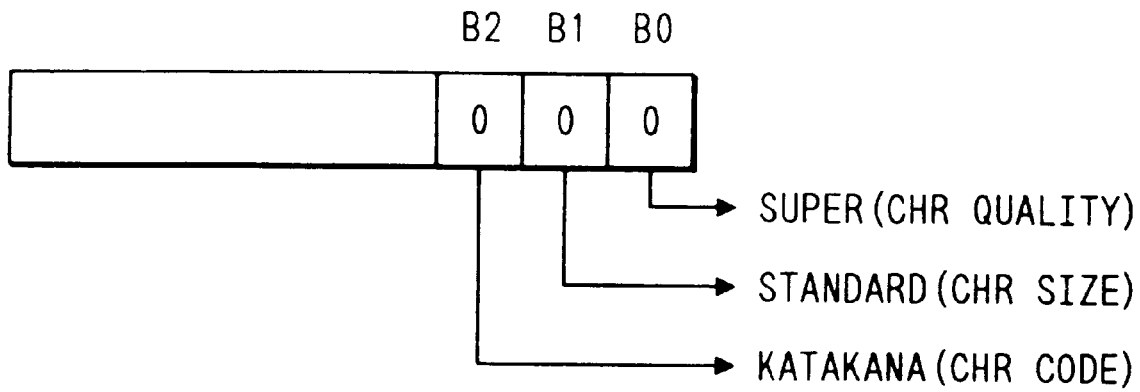
FIG. 34 is a diagram showing an initial value of emulation initial information.

FIG. 34 is a diagram showing initial values set in the emulation initial information in FIG. 33 in the ROM-P in FIG. 3. FIG. 34 corresponds to the emulation information in FIG. 30 and shows the initial values in case of the embodiment. In case of this emulation, the set values of the super, standard, and KATAKANA are used as initial values and the contents in this table are used as initial values of the emulation information.

An actual emulation change management is executed by using the emulation execution table as mentioned above.

Figure 35:
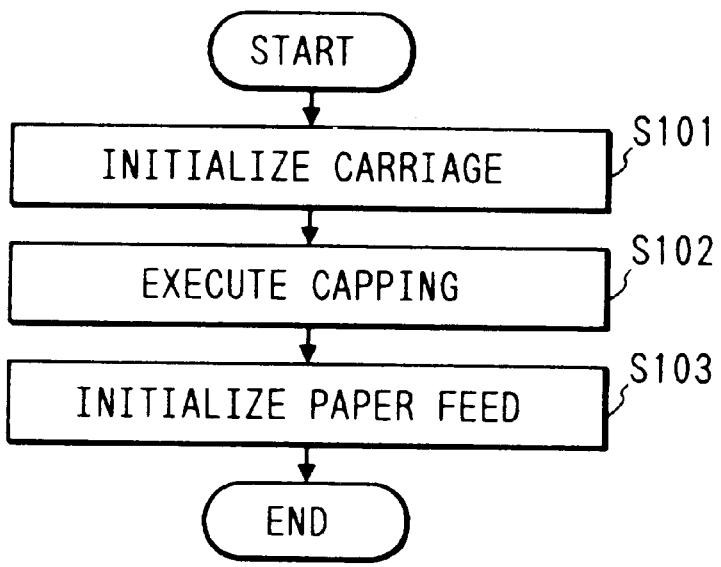
FIG. 35 is a diagram showing a flowchart for initialization control of the printer unit.
Figure 36:
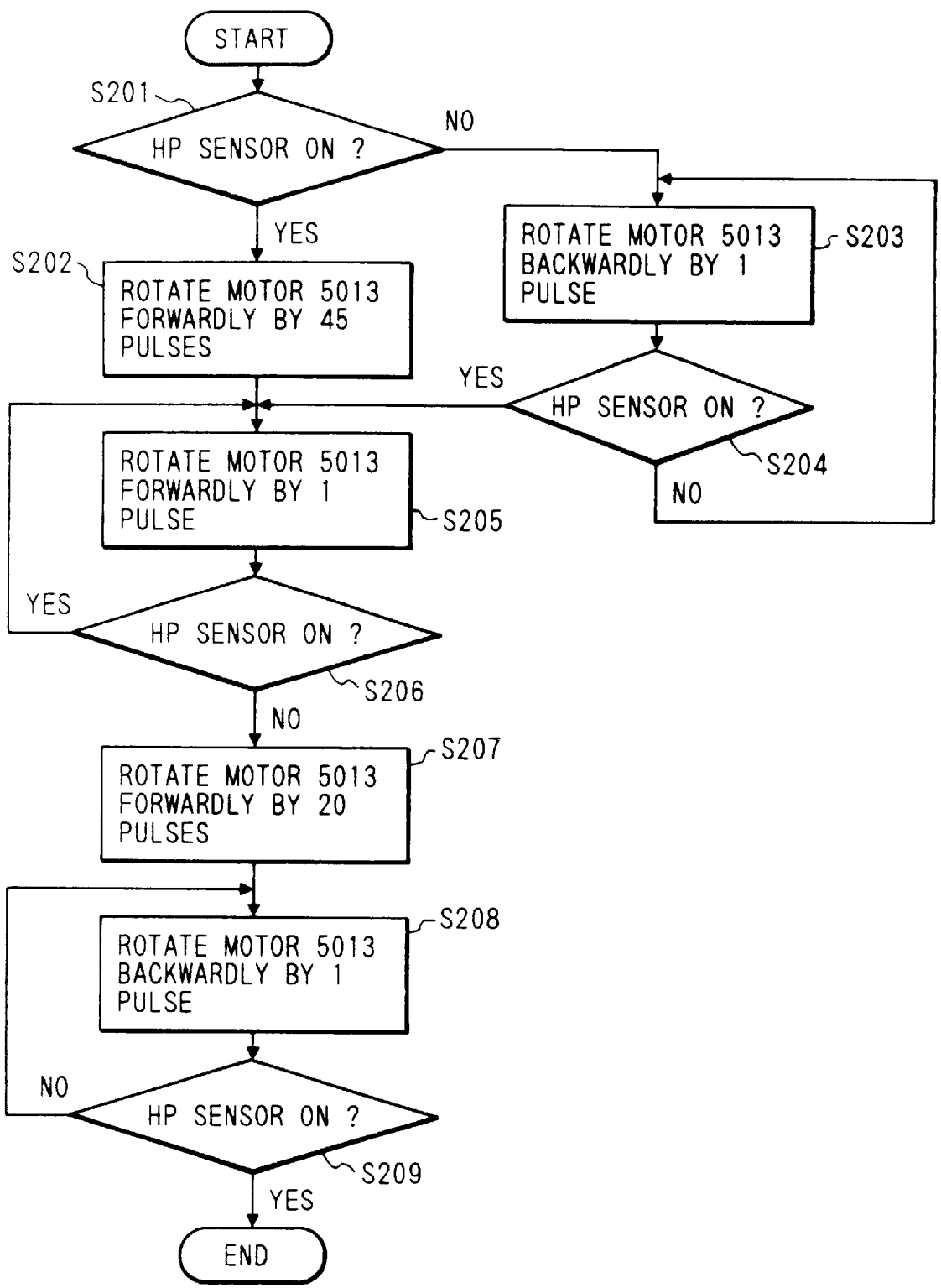
FIG. 36 is a diagram showing a flowchart showing the details of initialization of a carriage.

FIG. 35 is a flowchart showing initialization control of the printer unit 2. There are three steps for initialization. First, the carriage 5014 is initialized (S101). The initialization of the carriage denotes that the carriage 5014 is moved and the existence of the carriage 5014 is checked by the photocouplers 5007 and 5008, thereby positioning the carriage 5014 to the home position. FIG. 36 shows the details of the carriage initialization.

A capping operation is subsequently performed (S102). The capping operation denotes that the front surface of the recording head 5012 is capped by the cap member 5022. The capping operation functions to prevent that the recording head 5012 is dried. The recording head 5012 must be always capped by the cap member 5022 except a period of time during which the printing operation is executed. FIG. 33 shows the capping operation in detail.

Lastly, the paper feed is initialized (S103). The paper feed initialization denotes the initialization of the paper feed motor 5024 and is executed to specify the printing position. In the embodiment, the paper feed initialization is not explained in detail.

FIG. 36 is a flowchart showing in detail the carriage initialization which is controlled by the CPU-P in FIG. 3.

When the lever 5006 attached to the carriage 5014 traverses the photocouplers (HP sensors) 5007 and 5008 (HP sensors are ON), it is possible to detect that the carriage 5014 is located in the home position side region. The position at which the HP sensors are turned on from the off state is set to the home position (HP) of the carrier.

In first step S201, a check is made to see if the carriage 5014 has already existed in the home position side region or not. If YES, step S202 follows and the driving motor 5013 is forwardly rotated by an amount of 45 pulses (the carriage 5014 is moved to the right by an amount of 45 pulses), thereby moving the carriage 5014 to the outside of the home position side region. If NO in step S201, steps S203 and S204 follow and the driving motor 5013 is reversely rotated one pulse by one (the carriage 5014 is moved to the left one pulse by one), thereby moving the carriage 5014 until it enters the home position side region. In steps S205 and S206, the carriage 5014 is again moved to the right one pulse by one until the HP sensors are turned off. In step S207, the carriage 5014 is further moved to the right by an amount of 20 pulses. In steps S208 and S209, the carriage 5014 is moved to the left one pulse by one. When the HP sensors are turned on from the off state, the movement of the carriage 5014 is stopped and the initialization is finished.

Figure 37:
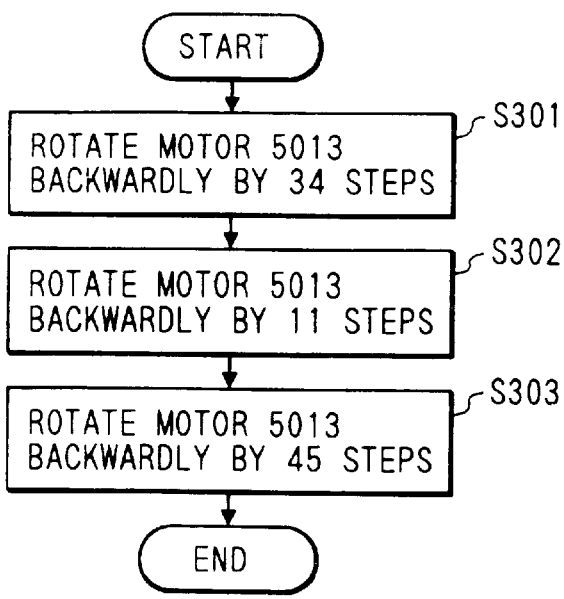
FIG. 37 is a diagram showing the details of a flow for a capping processing.

FIG. 37 is a flowchart showing in detail the capping operation. By reversely rotating the driving motor 5013 from the home position of the carriage 5014, the driving force transfer gear is switched and the lever 5021 is moved through the cam 5020. To move the lever 5021 to the capping position, the following three control steps (S301 to S303) are necessary as a capping flow. First, when the carriage 5014 is located at the home position, the driving motor 5013 is reversely rotated by an amount of 34 pulses and the driving force transfer gears 5010 and 5011 are switched (S301). The driving motor 5013 is further reversely rotated by an amount of 11 pulses and the cap member 5022 is once moved away from the recording head 5012 (S302). Further, the driving motor is reversely rotated by an amount of 45 pulses, the cap member 5022 is pressed to the surface of the recording head 5012, and the capping operation is completed (S303).

The emulation processing on the printer side will now be described. The printer has three emulation processings and can switch each program.

Figure 38:
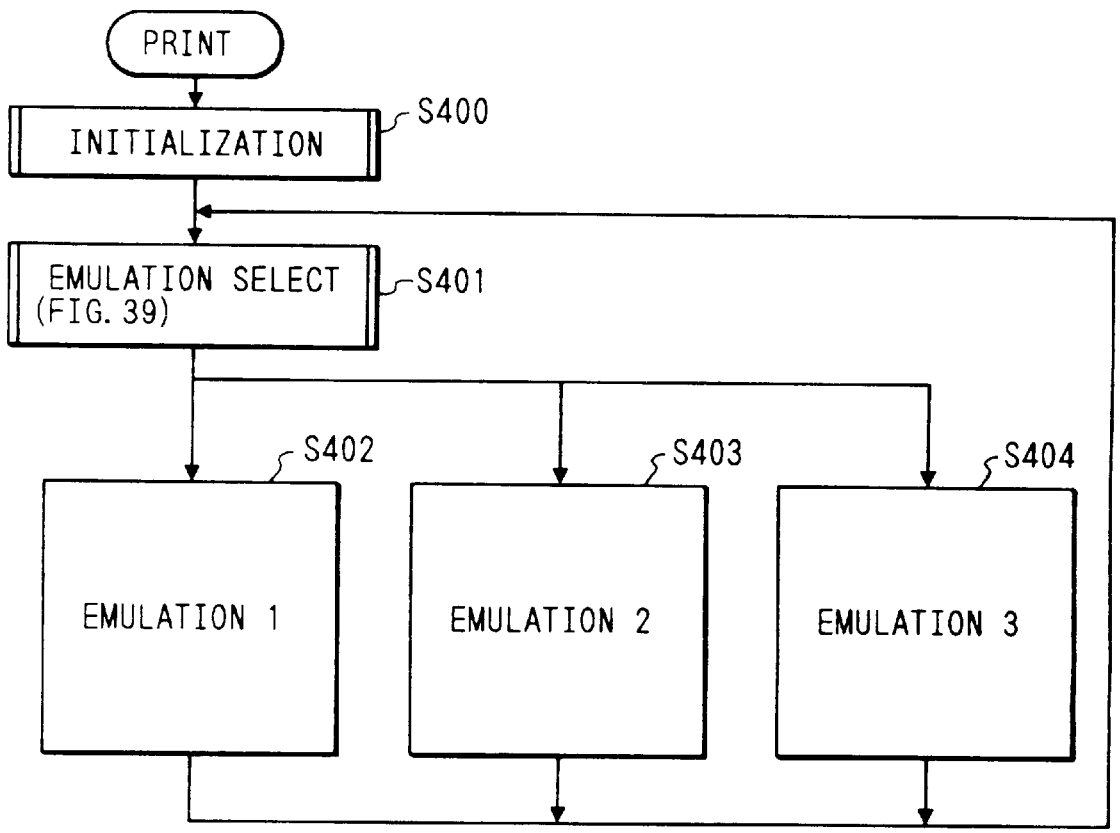
FIG. 38 is a diagram showing a flowchart for a print processing.
Figure 39:
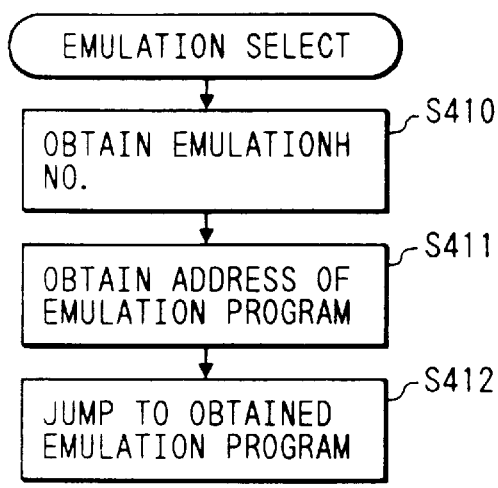
FIG. 39 is a diagram showing a flowchart for an emulation selection processing.

FIG. 38 is a flowchart showing the print processing of the embodiment. In step S400, the initialization processing is first executed. In the initialization processing, a processing to clear the print buffer or the like is performed. In step S401, an emulation selection processing is executed. FIG. 39 shows the emulation selection processing in detail. Either one of the emulations 1 to 3 is selected by the selection processing in step S401 and is executed. One of the three emulations in steps S402 to S404 is executed. Since each emulation operates in a manner such that a series of operations are completed in each emulation, when the emulation change command is executed, each emulation is finished and the processing routine. advances to step S401 for the emulation selection processing. The above processings are repeated.

FIG. 39 is a flowchart showing in detail the processing in step S401 in FIG. 38. In the first step S410, the emulation No. set in the emulation flag EMFLAG shown in FIG. 30 is taken out. The emulation flag EMFLAG is shown in FIG. 30 and the emulation No. is set into the bits $B_0$ to $B_1$. In the next step S411, a corresponding emulation control table is selected from the emulation select table corresponding to the emulation No. of the emulation flag EMFLAG. A pointer of the emulation program is taken out from the selected emulation control table. Subsequently, in step S412, the processing routine advances to the next of the program address obtained in step S411 and each emulation program is executed. By the above processings, the emulation selection processing is executed and the emulation is selected.

Figure 40:
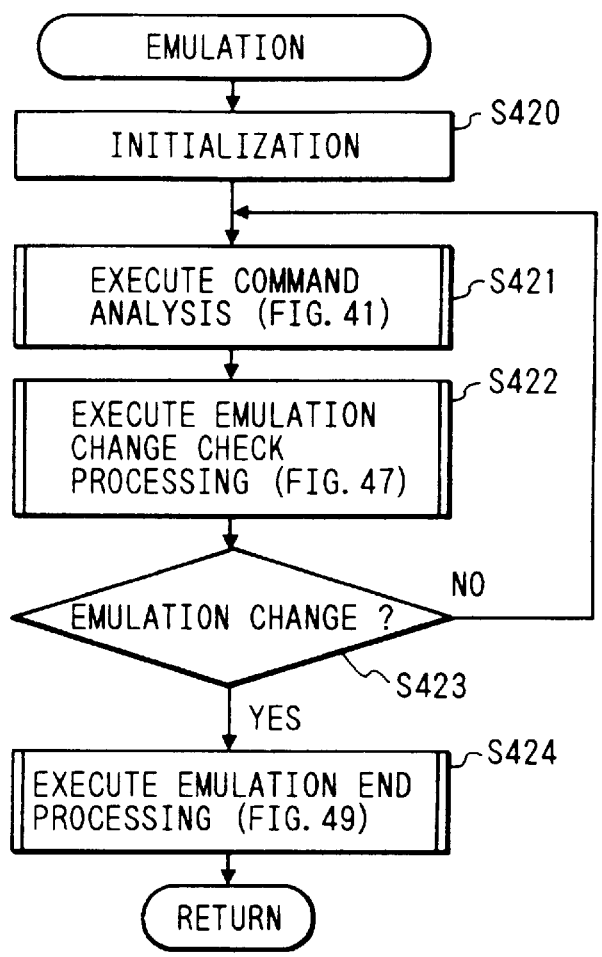
FIG. 40 is a flowchart showing the details of emulation.
Figure 41:
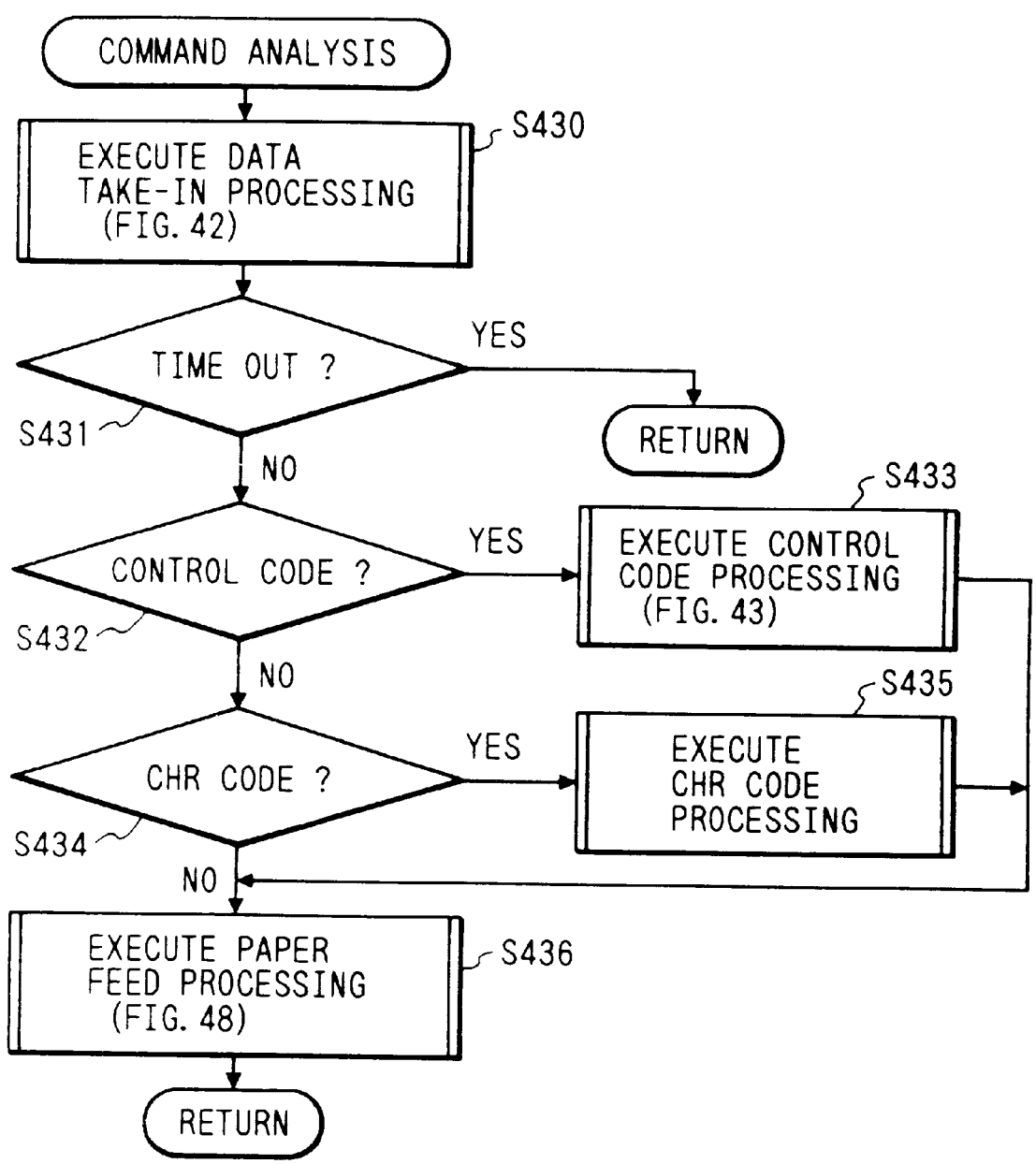
FIG. 41 is a flowchart showing the details of command analysis.
Figure 47:
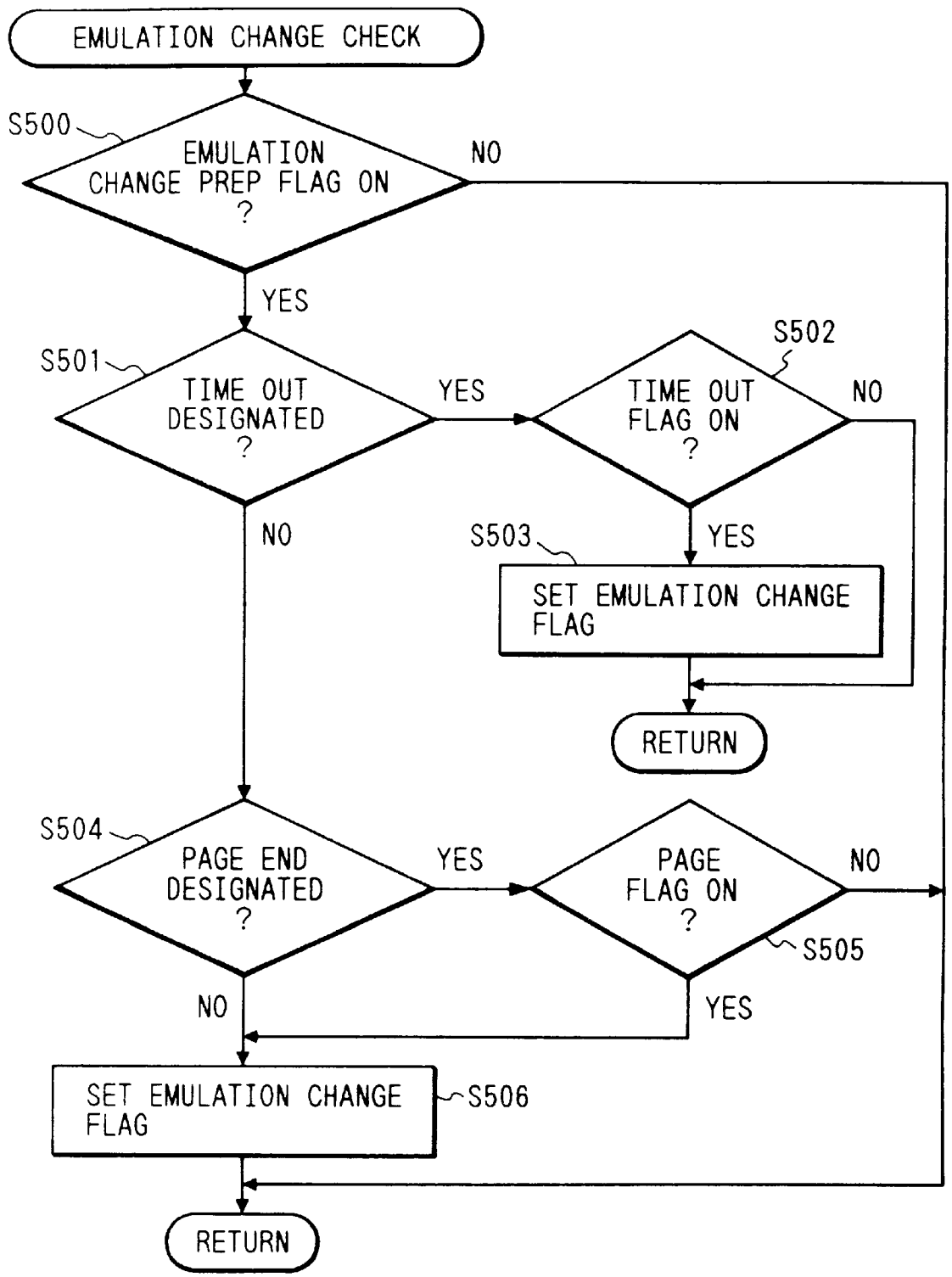
FIG. 47 is a flowchart showing the details of an emulation change check processing.

FIG. 40 is a flowchart for explaining in detail the emulations shown in steps S402 to S404 in FIG. 38. Common portions in each of the emulations are shown. The initialization processing is first executed in step S420. In the initialization process, the initialization of the data areas which are necessary for each emulation and the like are executed. In the next step S421, a command analysis processing is executed. In the command analysis processing, the print data and print command which were sent to the printer are analyzed and the printing operation is actually performed. FIG. 41 shows a detailed flowchart for the command analysis processing. In the next step S422, an emulation change check processing is executed. In the emulation change check processing, a check is made to see if there is an emulation change instruction during the execution of the analysis of the print data and print command or not. A check is made to see if an emulation changing condition is satisfied or not. If YES, an emulation change flag is set. FIG. 47 shows a detailed flowchart for the emulation change check processing. The processing routine advances to step S423 and a check is made to see if the emulation is changed or not by discriminating whether an emulation change flag has been set or not. When the emulation change flag is not set, step S421 follows and the following processings are repeated. When the emulation change flag has been set, step S424 follows and an emulation end processing is executed. In the emulation end processing, when the emulation is changed, a processing such that the remaining print data is printed or the like is performed. FIG. 49 shows a detailed flowchart for the emulation end processing.

By the above processings, a series of emulation processings and the emulation change processing can be executed.

Figure 42:
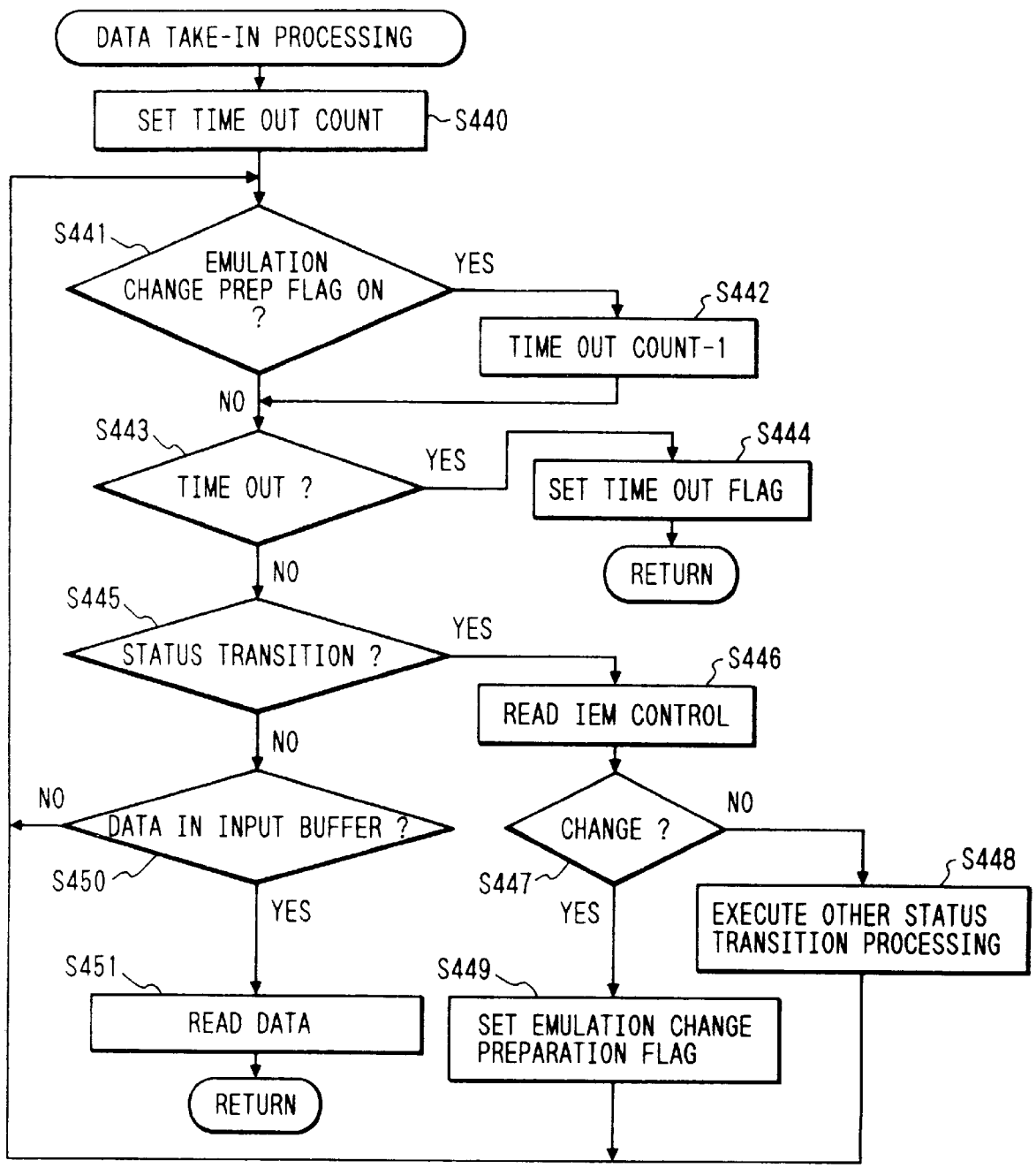
FIG. 42 is a flowchart showing the details of a data take-in processing.
Figure 43:
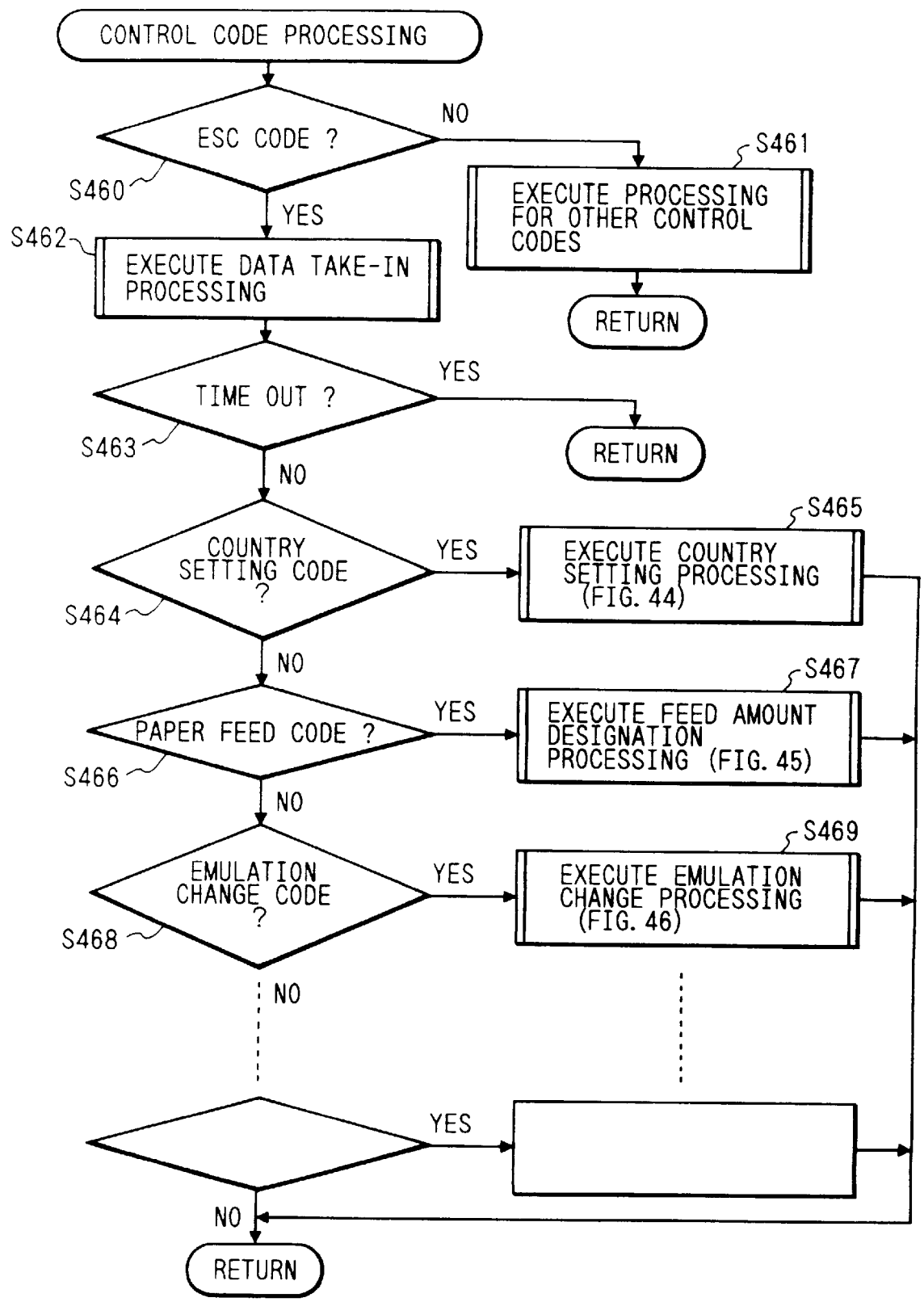
FIG. 43 is a flowchart showing the details of a control code processing.
Figure 48:
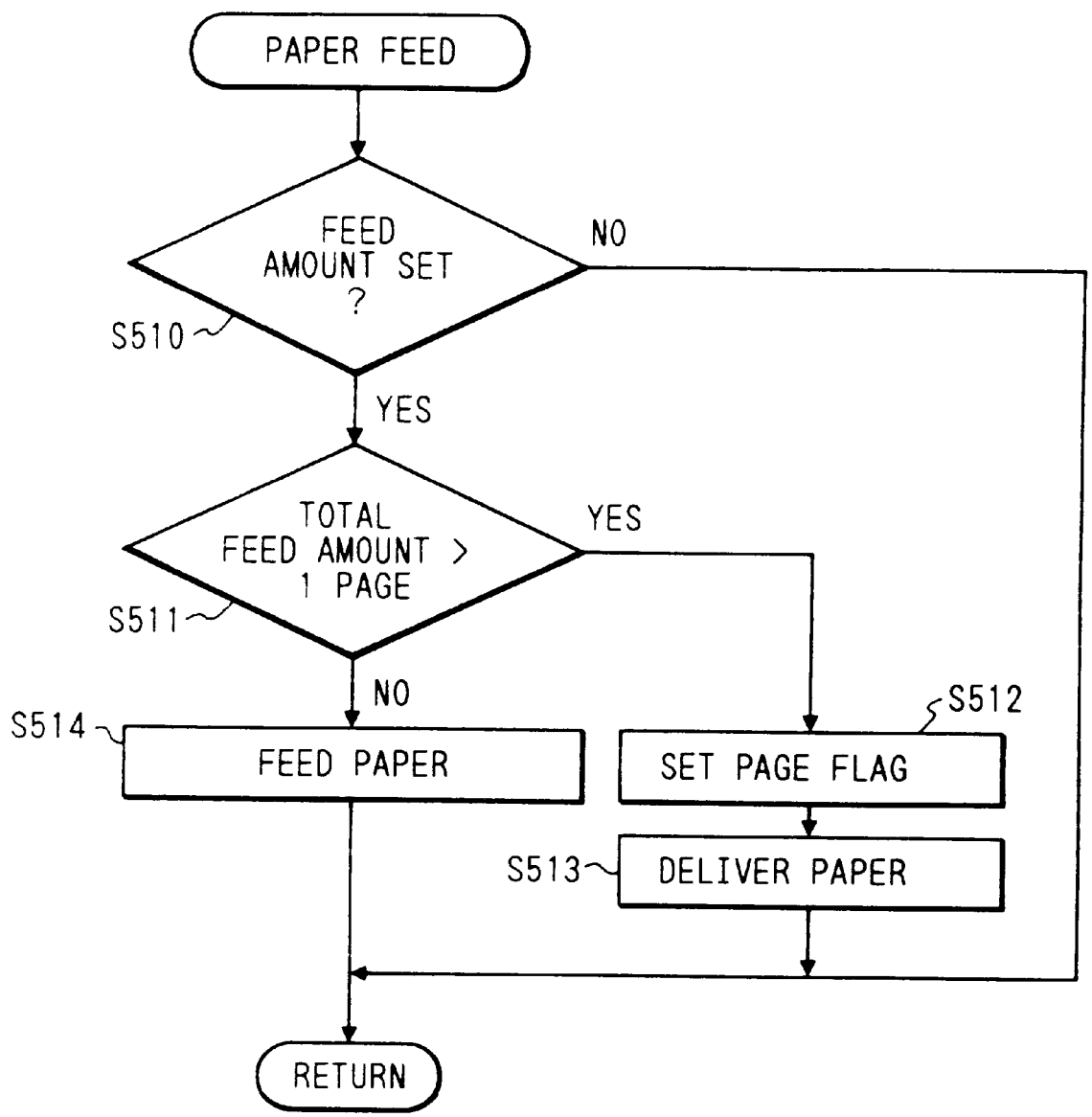
FIG. 48 is a flowchart showing the details of a paper feed processing.

FIG. 41 is a diagram showing the command analysis processing in detail. Upon execution of the emulation, the command analysis processing is performed. In the first step S430, a data take-in processing is executed. Data is written into the I/O port from the host computer and the written data is preserved in the input buffer shown in FIG. 28. In the data take-in processing, the data preserved in the input buffer is taken out and FIG. 42 shows a detailed flowchart for the data take-in processing. The processing routine advances to step S431 and a check is made to see if a time out has occurred or not by discriminating whether a time out flag has been set or not. When the time out flag is not set, a step S432 follows. When the time out flag has been set, the processing routine is returned. In the next step S432, a check is made to see if the data control obtained in step S430 is performed or not by judging whether the data indicates a control code for print control or not. In the embodiment, an ESC code (1Bh) or the like is used as a control code. In case of the control code, step S433 follows and a control code processing is executed. In the control code processing, a print processing corresponding to each control code is executed. FIG. 43 shows a detailed flowchart for the control code processing. After the control code processing was executed, step S436 follows. If NO in step S432, step S434 follows and a check is made to see if the data obtained in step S430 indicates a character code or not by discriminating whether the data is a print character code or not. In the embodiment, as a character code, an alphanumeric code, a Chinese character code, or the like is used as a code other than the control code for print control. In case of the character code, step S435 follows and a character code processing is executed. In the character code processing, the character font data corresponding to each character code is developed into the print buffer. If NO in step S434, step S436 follows and a paper feed processing is executed. In the paper feed processing, the paper feed designated by the control code or the like is executed. FIG. 48 shows a detailed flowchart for the paper feed processing.

By the above processings, a series of command analysis processings can be executed.

FIG. 42 is a diagram showing the data take-in processing in detail. In the first step S440, a time out count is set. In the time out count, when no data exists in the input buffer, the maximum repeating times of the time out occurring in the counter is held by the counter shown in FIG. 29. The processing routine advances to step S441 and a check is made to see if an emulation change preparation flag is ON or not. When the emulation change preparation flag has been set, step S442 follows and the count value of the time out count is decreased by "1". Therefore, only when the emulation change preparation flag is ON, the time out count is decreased by "1". The processing routine advances to step S443. If NO in step S441, step S443 follows and a check is made to see if the time out has occurred or not by judging whether the time out count is equal to 0 or not. When the time out count is equal to 0, step S444 follows and the time out flag is set and the processing routine is returned. If NO in step S443, step S445 follows and a check is made to see if there is a status transition or not by discriminating whether a status transition flag has been set or not. When the writing into the HWR/IO register in FIG. 11 occurs, the status transition flag is set in an interruption processing shown in FIG. 50. When the status transition flag has been set, there is a possibility such that the emulation change instruction has been issued from the host computer. When there is a status transition, step S446 follows and the IEM control of the HWR/IO register is read. Step S447 follows and a check is made to see if there is a change in data which has been read in step S446 or not. If NO in step S447, step S448 follows and other status transition processings are executed. Since the remaining processing steps are not directly concerned with the embodiment, their descriptions are omitted. The processing routine is returned to step S441. If YES in step S447, step S449 follows and the emulation change preparation flag is set to ON. The processing routine is subsequently returned to step S441. If there is no status transition in step S445, step S450 follows and a check is made to see if data exists in the input buffer or not. If no data exists, the processing routine is returned to step S441. If data exists, step S451 follows and the data is read out from the input buffer. The processing routine is subsequently returned.

By the above processings, the data take-in processing can be executed. The data take-in processing is finished in the case where data exists in the input buffer or in the case where the emulation change instruction has been issued from the host computer and no data exists in the input buffer. Each of the above cases can be judged by the flag.

Figure 44:
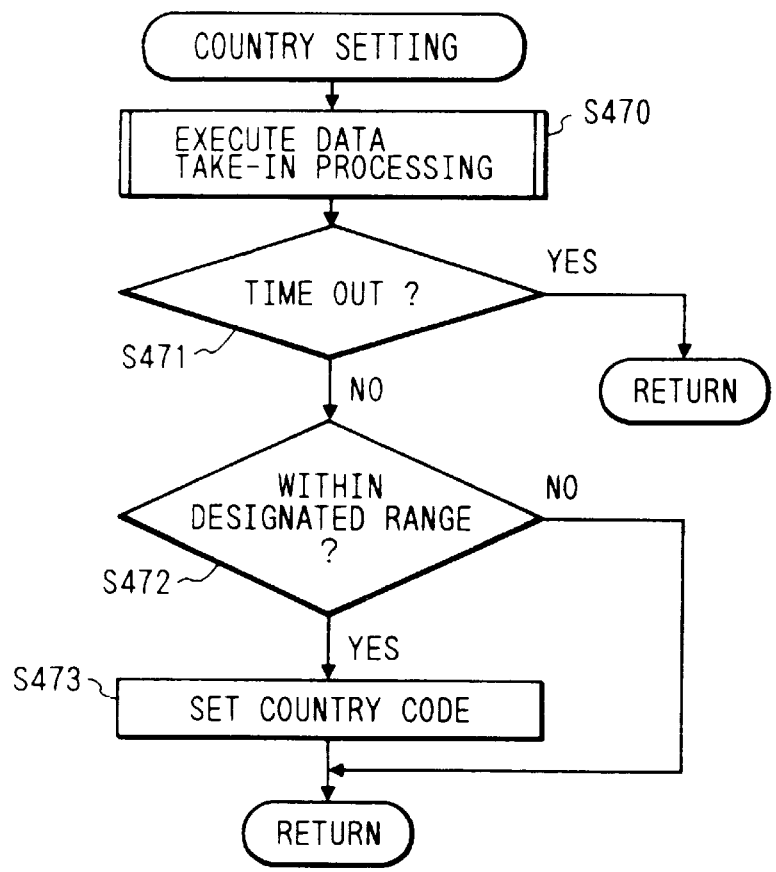
FIG. 44 is a flowchart showing the details of a country setting processing.
Figure 45:
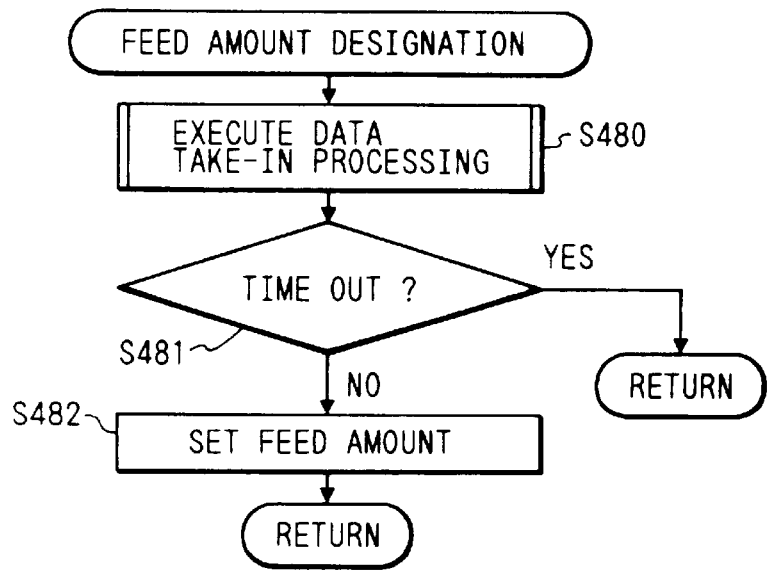
FIG. 45 is a flowchart showing the details of a feed amount setting processing.
Figure 46:
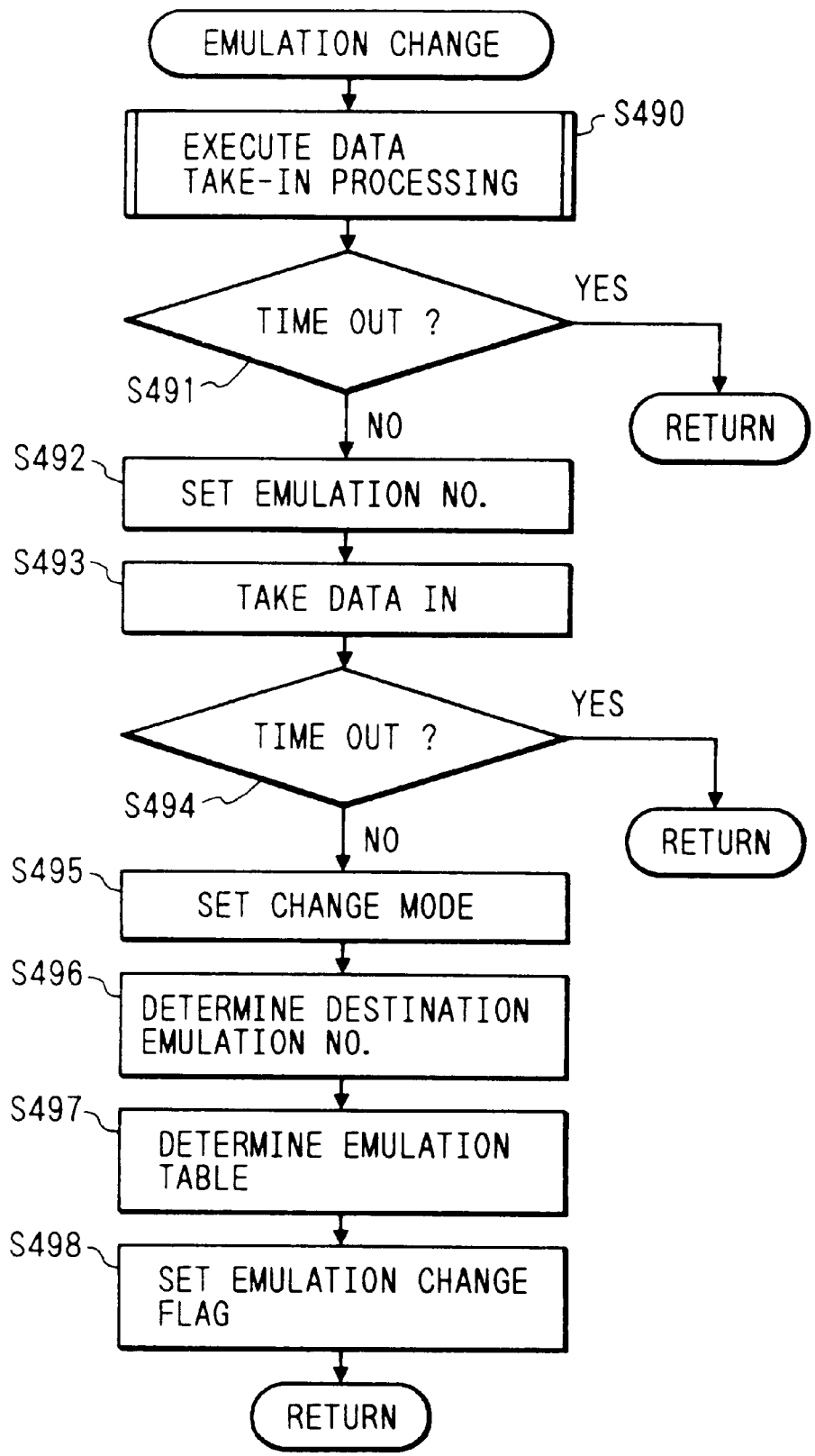
FIG. 46 is a flowchart showing the details of an emulation change processing.

FIG. 43 is a diagram showing the control code processing in detail. In step S460, a check is first made to see if the input code is a control code of ESC or not. If NO, step S461 follows and processings for other control codes are executed. Since the other remaining processing steps are not directly concerned with the embodiment, their descriptions are omitted here. The processing routine is subsequently returned. If YES in step S460, step S462 follows and a data take-in processing subsequent to the ESC is executed. Various kinds of commands are distinguished by the data subsequent to the ESC. Step S463 follows and a check is made to see if a time out has occurred or not. If YES, the processing routine is returned. If NO in step S463, step S464 follows and a check is made to see if the data obtained in step S462 is a country setting command code or not. If YES in step S464, step S465 follows and a country setting processing is executed by a command to change the country setting to the designated country. FIG. 44 shows a flowchart for the country setting processing in detail. The processing routine is subsequently returned. If NO in step S464, step S466 follows and a check is made to see if the input code is a paper feed command code or not. If YES, a step S467 follows and the feed amount designation processing is executed by a command to feed the paper by the designated feed amount. FIG. 45 shows a flowchart for the feed amount designation processing in detail. The processing routine is now returned. If NO in step S466, step S468 follows and a check is made to see if the input code is an emulation change code or not. If YES, step S469 follows and the emulation change processing is executed by a command to change the emulation to the designated emulation. FIG. 46 shows a flowchart for the emulation change processing in detail. The processing routine is now returned. Discriminating and processing steps similar to those mentioned above are executed with respect to each of the other commands hereinbelow. The processing routine is subsequently returned.

By the above processings, a series of control code processings can be executed.

FIG. 44 is a diagram showing the country setting processing in detail. In the first step S470, the data take-in processing subsequent to the ESC is executed. The set value of the country is obtained by the data subsequent to the ESC. Step S471 follows and a check is made to see if a time out has occurred or not. If YES, the processing routine is returned. If NO in step S471, step S472 follows and a check is made to see if the data obtained in step S470 lies within the designated range or not. If NO in step S472, the processing routine is returned. If YES in step S472, step S473 follows and the data obtained in step S470 is set as a country code. The country code exists in the data area shown in FIG. 29 and the replacement or the like of the character code is performed by using the value set in step S473.

By the above processings, the country setting processing can be executed.

FIG. 45 is a diagram showing the feed amount setting processing in detail. In the first step S480, the take-in processing of the data subsequent to the ESC is executed. The set value of the feed amount is obtained by the data subsequent to the ESC. Step S481 follows and a check is made to see if a time out has occurred or not. If YES, the processing routine is returned. If NO in step S481, step S482 follows and the data obtained in step S480 is set as a feed amount. The feed amount exists in the data area shown in FIG. 29 and the paper is fed by using the value set in step S482.

By the above processings, the feed amount setting processing can be executed. In the print processing, the paper is fed by using the set feed amount value.

FIG. 46 is a diagram showing the emulation change processing in detail. In the first step S490, the take-in processing of the data subsequent to the ESC is executed. The emulation No. to be changed is obtained by the data subsequent to the ESC. Step S491 follows and a check is made to see if a time out has occurred or not. If YES, the processing routine is returned. If NO in step S491, step S492 follows and the data obtained in step S490 is set as an emulation No. The feed amount exists in the data area shown in FIG. 29 and the paper is fed by using the feed amount value set in such a data amount. Step S493 follows and the data take-in processing is executed. Step S494 follows and a check is made to see if a time out has occurred or not. If YES, the processing routine is returned. If NO in step S494, step S495 follows and the data obtained in step S490 is set as an emulation change mode. Step S496 follows and the emulation No. to be changed is determined by using the value set in step S492. Step S497 follows and the emulation table is decided from the emulation No. determined in step S496. Step S498 follows and the emulation No. which has been switched to the emulation flag EMFLAG is set into the bits $B_0$ to $B_1$. The processing routine is returned.

By the above processings, the emulation change processing by the print control command can be executed.

FIG. 47 is a diagram showing the emulation change check processing in detail and corresponds to step S422 in FIG. 40. In the first step S500, a check is made to see if the emulation change preparation flag has been set or not. If NO, the processing routine is returned. If YES in step S500, step S501 follows and a check is made to see if the time out has been designated or not. The time out is designated in accordance with the conditions set in the emulation change condition area in FIG. 29. If YES in step S501, step S502 follows and a check is made to see if a time out flag has been set or not. If NO in step S502, the processing routine is returned. If the time out flag has been set, step S503 follows and the emulation change flag is set. The processing routine is returned. If the time out is not designated in step S501, step S504 follows and a check is made to see if a page end has been designated or not in accordance with the condition set in the emulation change conditions in FIG. 29. If YES in step S504, step S505 follows and a check is made to see if the page end flag has been set or not. If NO in step S505, the processing routine is returned. If the page end flag has been set, step S506 follows and the emulation change flag is set and the processing routine is returned.

By the above processings, the emulation change check processing can be executed. By this processing, it is possible to judge whether the emulation change condition is satisfied or not.

FIG. 48 is a diagram showing the paper feed processing in detail and corresponds to step S436 in FIG. 40. In the first step S510, a check is made to see if the feed amount has been set or not. If NO, the processing routine is returned. If the feed amount has been set, step S511 follows and a check is made to see if the total feed amount exceeds the feed amount of one page or not. The feed amount is added as a total amount each time the feeding operation is performed. When the total feed amount exceeds the feed amount of one page, step S512 follows and the page flag is set. In the next step S513, a paper delivery processing is performed and the processing routine is returned. If NO in step S511, step S514 follows and the paper is fed and the processing routine is returned.

By the above processings, the paper feed processing can be executed. By such a processing, the paper feed processing and the page flag can be set.

FIG. 49 is a diagram showing the emulation end processing in detail and corresponds to step S424 in FIG. 41. In the first step S520, a check is made to see if the print data has been set or not. If NO in step S520, step S522 follows. If YES, step S521 follows and a print start processing is executed and the remaining print data in the print buffer is printed. In the next step S521, the emulation change flag is set to off and the processing routine is returned.

By the above processings, the emulation end processing can be executed. By such a processing, when the emulation is changed, the remaining print data in the print buffer can be printed without being lost.

FIG. 50 is a diagram showing the printer interruption processing in detail. Processings for various kinds of interruptions are executed. A check is made in step S530 to see if the writing into the HWR/IO register is executed or not. If NO, step S531 follows and the other interruption processings are executed. The processing routine is subsequently returned. Explanations of the other interruption processings are omitted here. If YES in step S530, step S532 follows and a check is made to see if the status transition flag has been set or not. If YES, the processing routine is returned and no processing is performed. If NO in step S532, step S533 follows and the status transition flag is set.

By the above processings, the printer interruption processing can be executed. By such a processing, when the emulation is changed due to the writing into the HWR/IO register, the status transition flag can be set.

As described above, the emulation of the printer can be changed due to the writing into the I/O register. The country setting processing can be performed by the country setting command. The feed processing can be executed by the feed amount designation command. The emulation change processing can be performed by the emulation change command.

(Embodiment 2)

In the embodiment, the emulation change due to the time out and the emulation change condition due to the change in page have been described. However, it is also possible to set another condition such that the emulation is changed due to the reception of an initialization command. The emulation change conditions are not limited to those mentioned above.

(Embodiment 3)

Although the embodiment has been described with respect to the case where the emulation is changed after one command was executed, the number of commands to be processed is not limited.

As described above, there is an effect such that by informing the emulation information to the host computer on the printer side and discriminating the delimiter of the print data, the print data can be properly printed until the delimiter of the print data in accordance with the emulation change command from the host computer.

According to the invention as described above, it is possible to provide a printer comprising: the memory means for storing the emulation information which is designated from the host computer; the emulation changing means for changing the emulation on the basis of the emulation information stored in the memory means; and the judging means for judging the delimiter of the print data.

According to the invention as described above, it is possible to provide a printer control method comprising the steps of: storing the emulation information which is designated from the host computer; and changing the emulation on the basis of the emulation information stored and the delimiter of print data.

[Embodiment for Saving Power]

In FIG. 1 mentioned above, the printer unit 2 using the recording head of the ink jet type (BJ-Head) is arranged in front of the display section and is enclosed in the apparatus main body 101. The printer unit 2 has an opening portion (not shown) which can be opened or closed by the operator, so that the recording head can be exchanged.

The recording paper 3 is inserted from a paper feed port 101a provided in the lower portion of the keyboard 102 and is conveyed in a conveying path which penetrates in the apparatus main body 101. The paper is delivered from a paper delivery port (not shown) to the rearside of the apparatus. The keyboard 102 is rotatably attached to the apparatus main body 101 through hinges 102a provided on both sides of the apparatus main body. Therefore, even in case of using a relatively short recording paper such as envelope, postcard, or the like, the keyboard 102 is upwardly opened and the recording paper 3 can be inserted to the deep position in the conveying path. Since the conveying path of the recording paper 3 is provided in the lower portion of the keyboard 102 as mentioned above, even in a state in which the recording paper has been set, various kinds of operations using the keyboard 102, the display section 103, and an operation panel SW 105 can be executed.

Figure 51:
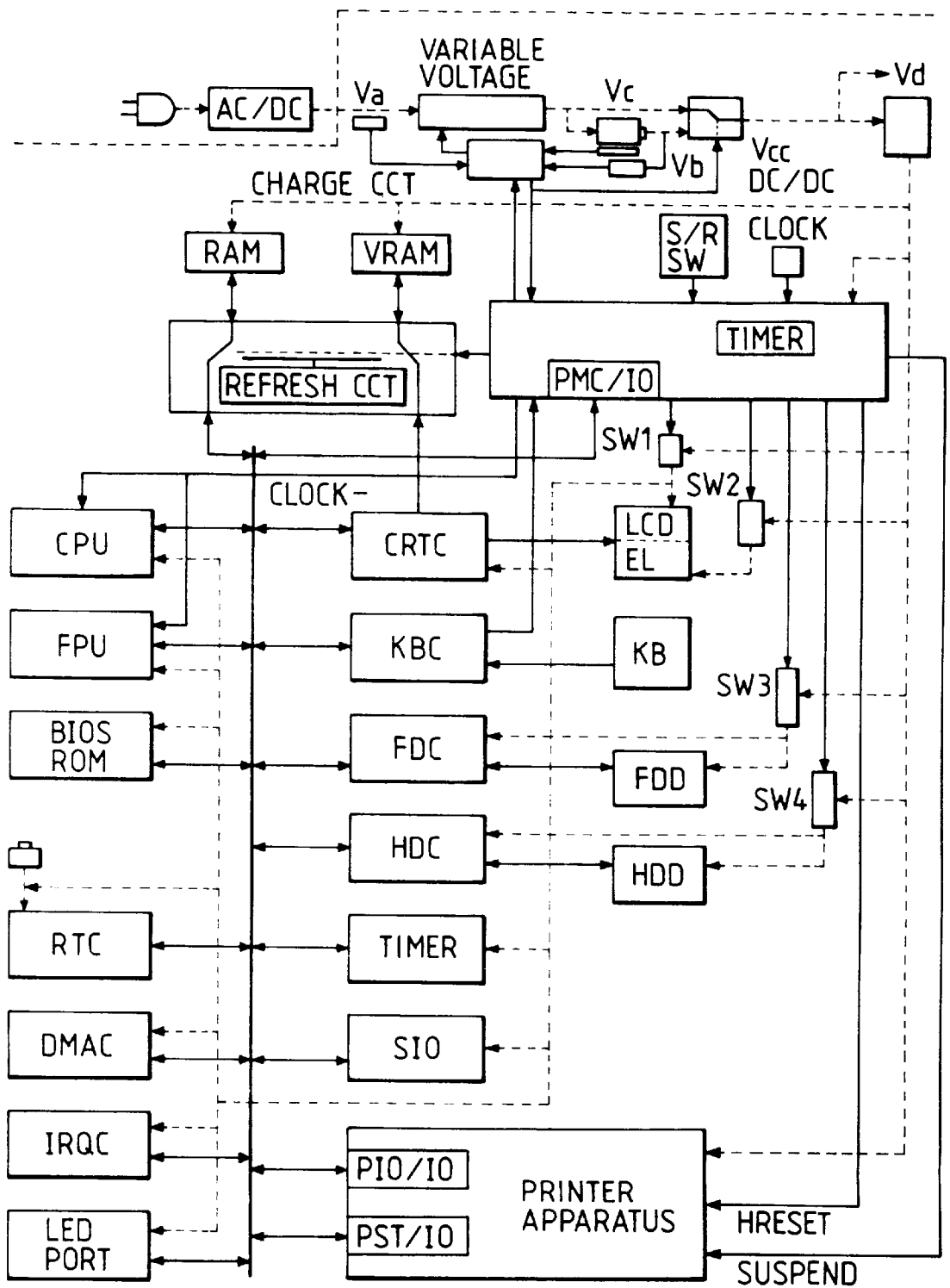
FIG. 51 is a schematic block diagram between the host computer and the printer.

FIG. 51 shows a schematic block diagram of the host computer and the printer.

First, in the host computer, a central processing unit (CPU) executes a main control and a BIOS ROM (Basic Input Output System ROM) instructs a fundamental control. An application program is read out from a floppy disc (FDD) or a hard disc (HDD) through a floppy disc controller (FDC) or a hard disc controller (HDC). The program is executed by using a system memory (RAM). In this instance, as a display method of the screen, characters or the like are displayed on a liquid crystal display (LCD) by using an LCD controller (LCDC). A key input from a keyboard (KB) is performed via a keyboard controller (KBC). A numerical value arithmetic operating processor (FPU) supports arithmetic operation processings to the CPU. A realtime clock (RTC) shows the elapsed time of the present time point. Even when the power supply of the whole system is shut off, the operation of the realtime clock is executed by a dedicated battery. A DAM controller (DMAC) performs a data transfer without using the CPU in order to transfer the data at a high speed between memories, between a memory and an I/O, and between an I/O and another I/O. An interruption controller (IRQC) accepts the interruption from each I/O and executes processings in accordance with the priorities. A timer (TIMER) has free running timers of a few channels and executes various kinds of time managements. There are a serial interface (SIO), an extension port (PROT), and an LED to inform the operating status to the user as other component elements which are connected to the outside.

In addition to each of the above controls which the general personal computer has, in a notebook type personal computer, it is necessary to cope with at least two power sources of an AC adapter and a battery. Particularly, when the battery is used, an electric power consumption is necessary. For this purpose, such a personal computer has the following construction. Namely, the personal computer comprises: a host power management section (host PM section); a refresh controller; and a charge controller. The host PM section executes a time control for each of the on/off operation of the inverter circuit of the EL, the power supply to the FDD, the power supply to the HDD, and the power supply to devices other than the RAM and VRAM, a clock control for the CPU and the like, a power supply control procedure in the suspending/resume mode, and the like. The refresh controller switches the RAM and VRAM by an instruction signal of the host PM section in accordance with the suspending mode and the CPU-clock operating mode, thereby refreshing. The charge controller can also drive the host computer side while charging a secondary battery.

The printer apparatus is connected to the host computer via general parallel interface register PIO/IO and printer control & status register PST/IO. The printer apparatus executes the data transmission and reception at the register level of the I/O port and a connection image is similar to that in case of performing the data transmission and reception with an external printer.

Figure 52:
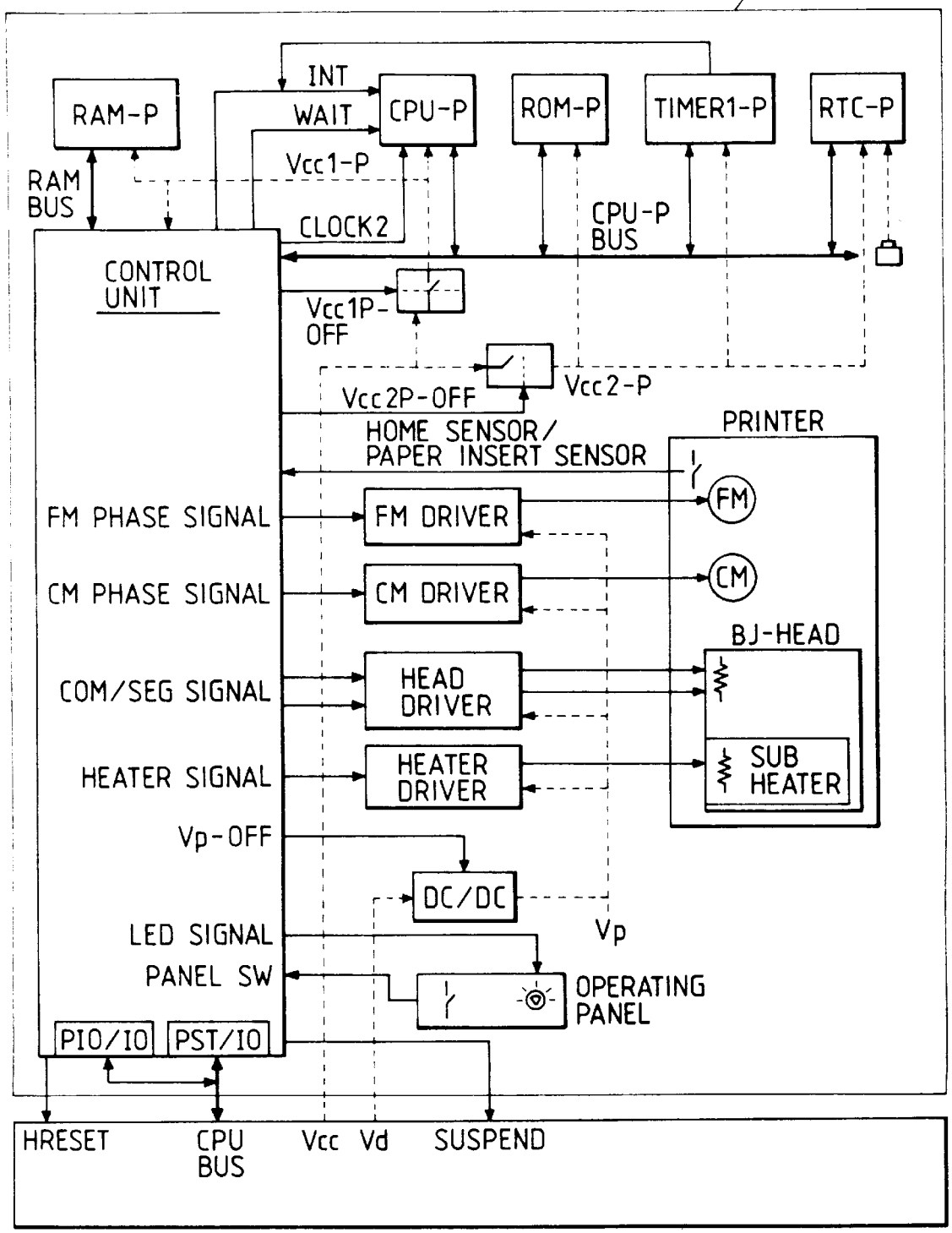
FIG. 52 is a block diagram of a printer section.

FIG. 52 is a block diagram showing a construction of the control system of the printer apparatus. The control system has mainly the following construction.

The CPU-P is a CPU of a microprocessor form to perform a main control of the printer apparatus. The CPU-P transmits and receives status information of the printer and emulation setting information to/from the host computer side through a PST/IO register of a printer control & status port section, which will be explained hereinlater. In accordance with a printer command and data which are derived from the host computer side through a PIO/IO register of a parallel IF adapter, which will be explained hereinlater, on the basis of the above set status, the CPU-P executes desired status processing and print processing in accordance with programs and data which have previously been stored as microcodes in an ROM-P, which will be explained hereinbelow. An ROM-P is an ROM (read only memory) to store the programs corresponding to a recording control procedure, a print control procedure, and the like which are executed by the CPU-P, a character generator (CG), and fixed data such as other tables, default values, and the like. TIMER1-P is a timer to obtain driving phase times of a paper feed motor (FM), a heater, and the like and other time timings. RTC-P is an RTC (realtime clock) to know the elapsed time of the recovering operation. A control unit comprises: an IF transfer control; a power saving control; an RAM access control; a printer control & status control; a printer port control; and the like. Among them, the RAM access control, printer control & status control, power saving control, and the like can be independently controlled irrespective of the control of the CPU-P even when the clock generation of the CPU-P is stopped and the CPU-P is in a fault state. The above component elements are connected to a bus of the CPU-P. RAM-P is an RAM (random access memory) having a work area which is used as a register, a line buffer to store the print data of one line, a dot development buffer in which data has been again developed into dots, an INPUT buffer from a parallel IF, and an area for emulation information recording and the like. The RAM-P is connected to the control unit by an RAM bus. The RAM-P can be accessed from a plurality of controllers as well as the CPU-P by an RAM controller of the control unit. Printer driving control signals are generated from the control unit and are converted into driving levels of an FM (feed motor), a CM (carrier motor), a thermal jet head, a heater, and the like by an FM driver, a CM driver, a head driver, and a heater driver, thereby driving the FM, CM, and thermal jet head of the printer. As power saving control signals, there are power control signals of Vcc1P-off, Vcc2P-off, and Vp-off from the control unit. As input signals, there are signals of Printer-off and printer sensors from the operation panel SW. As output signals, there are an LED driving signals of the operation panel and the like. Among them, the power source of Vcc1-P is supplied only when the Printer-off signal changes from the active state to the inactive state. The power sources can be supplied to only the control unit, CPU-P, and RAM-P. The Vcc1P-off signal can shuts off the power source of Vcc1P at the OFF timing at which the Printer-off signal has been changed in accordance with the driving status of the printer.

Figure 53:
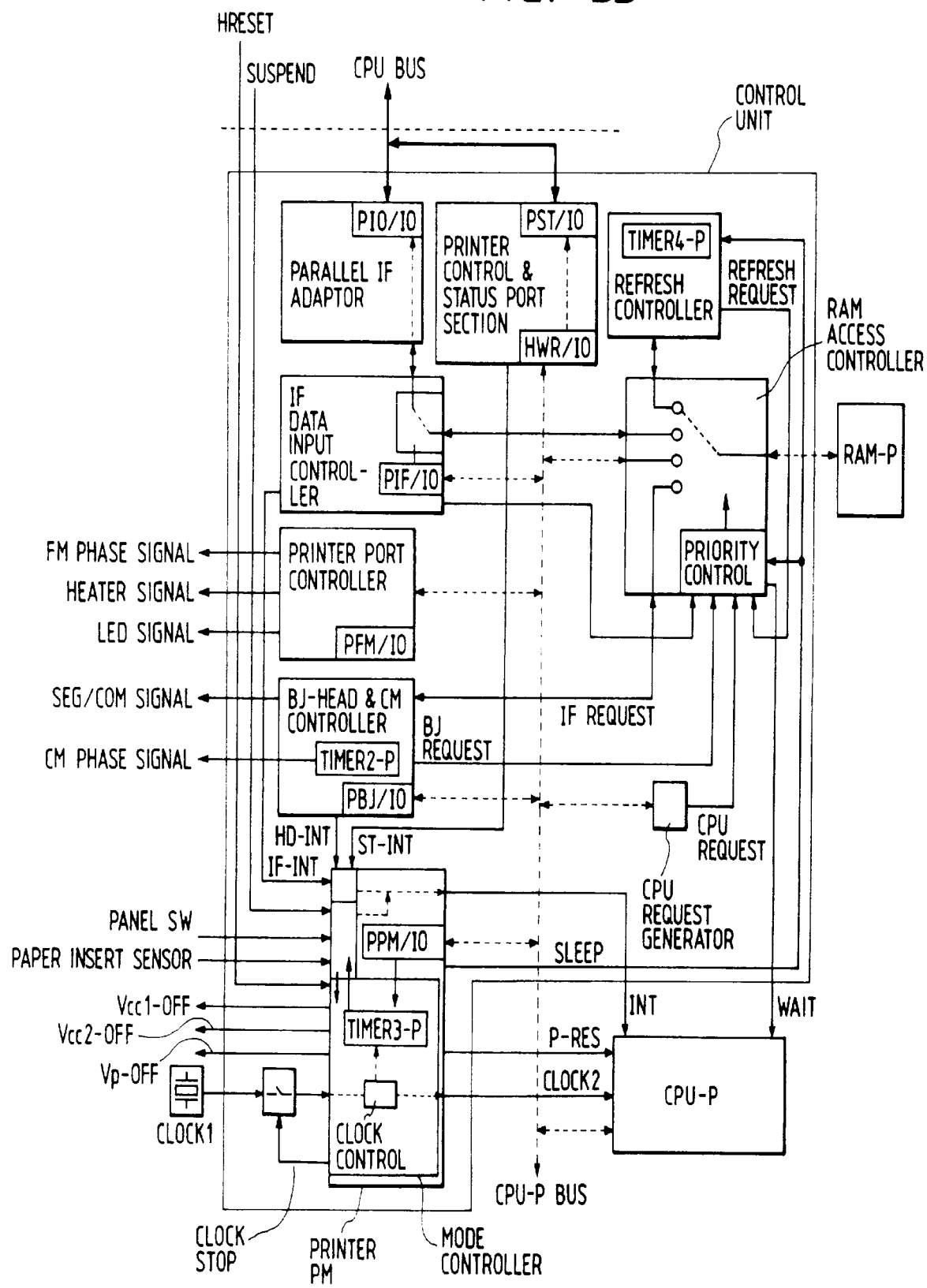
FIG. 53 is an internal block diagram of a compound control unit.

FIG. 53 shows a constructional diagram of the control unit.

A functional block is constructed by: a parallel IF adapter which mainly functions as an IF adapter from the host computer side; an IF data input controller to store parallel data into an input-buffer of the RAM-P through the parallel IF adapter; a printer control & status port section to mainly directly check and control the status of the printer from the host computer side; a refresh controller to generate a refresh timing of the RAM-P; a thermal jet head/CM controller for reading out dot development data of one line from the RAM-P and driving the thermal jet head and printing, while also controlling a phase excitation of the carrier; a printer port controller to drive the FM, heater, LED, and the like; an RAM access controller having access rights in accordance with the priorities for four access requests of the IF data input controller, refresh controller, thermal jet head/CM controller, and CPU-P; and a printer PM to perform a power saving control. The power saving control will be explained hereinlater. The return of the CPU-P to the ordinary processing mode from the low electric power consumption mode to stop the supply clocks in the fault state is realized by various kinds of interruptions which are concentratedly managed by the PM controller. After all of the conditions to return the CPU-P were satisfied, a signal is generated as INT, so that the CPU-P restarts the operation and executes the processings.

Figure 54:
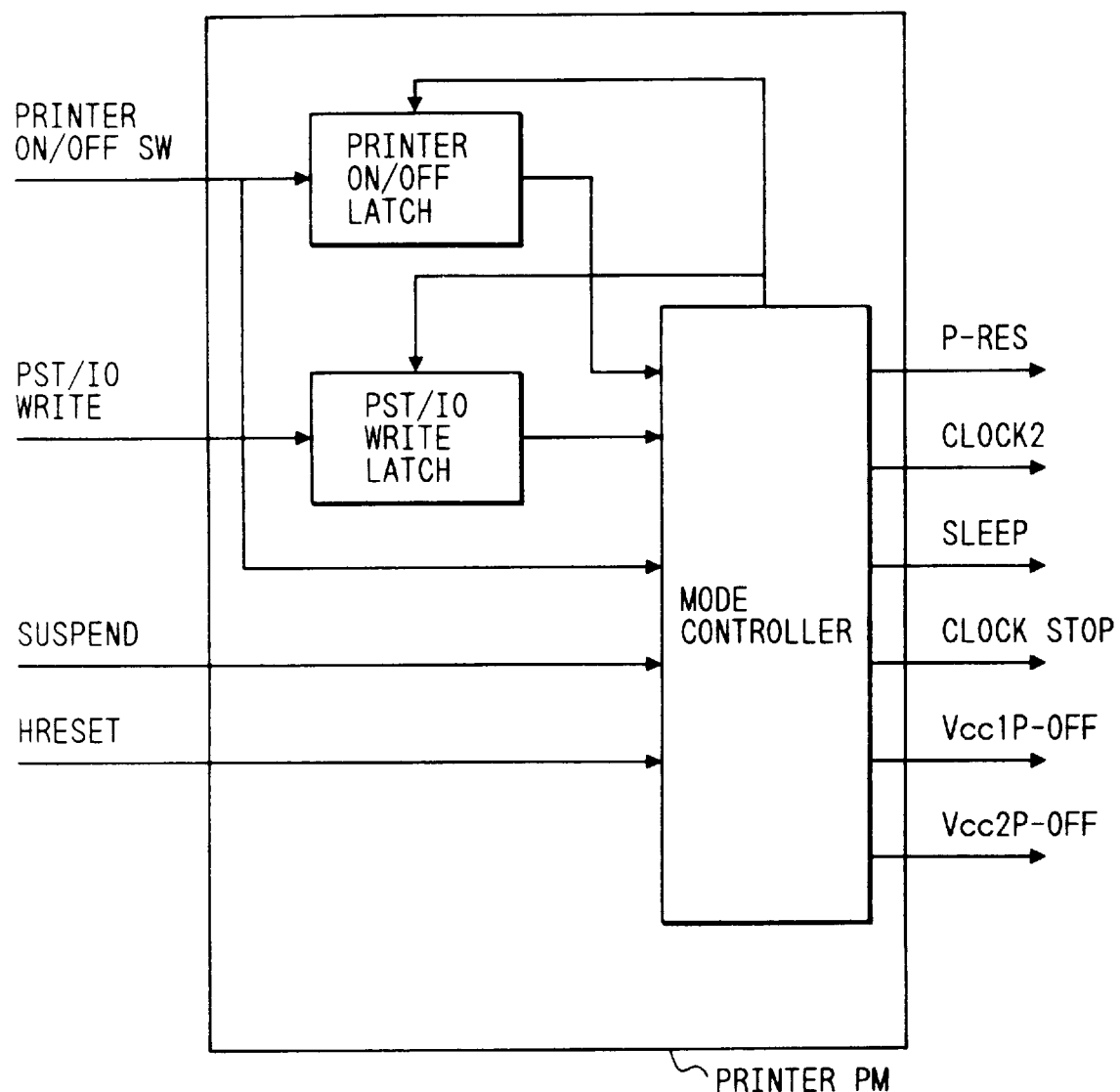
FIG. 54 is an internal block diagram of a printer PM section.

FIG. 54 is an input/output constructional diagram in a mode controller in the printer PM. A printer operation permission/inhibition SW (printer on/off SW) input is supplied as a latch signal through a printer off signal latch circuit to a mode controller and is also directly supplied thereto. A write signal to the PST/IO register is supplied as a latch signal through a PST/IO write latch circuit to the mode controller. As remaining inputs to the mode controller, signals are directly supplied from the host computer to the mode controller. Namely, a hardware-like reset signal HRESET at a time of the system power on or the like and a suspend signal indicating whether the host computer is in the suspending state or not are supplied to the mode controller. A mode transition system, which will be explained hereinlater, is realized by output controls such as P-RES, clock2, sleep, clock-stop, and the like under setting conditions of SLEEP/STOP of a PPM/IO due to those signals and the control of the CPU-P. The P-RES output is used to reset the CPU-P. The clock2 output is used to save an electric power by stopping or delaying the clock generation when the CPU-P is in the fault state or is unnecessary. The sleep output is used to save an electric power by stopping a circuit of a refresh control system or the like in the printer PM. The clock-stop output is used to save an electric power. Namely, the clock-stop output is used to stop the oscillation of the clocks themselves which are supplied to the printer PM, thereby further accomplishing the power saving. The Vcc1P-off and Vcc2P-off signals are used to obtain a larger power saving effect in accordance with the mode status and to simultaneously shut off an electric power of the unnecessary circuit. The signal is effective by the on/off mode controller of the latch circuit when the CPU-P is in the fault state or the clocks are stopped and the apparatus is in the suspending state. The latched signal is used as a judgment signal to discriminate whether the reset of the CPU-P of the printer system due to the P-RES signal is made effective or not when the suspending state is released by the resume.

Figure 55:
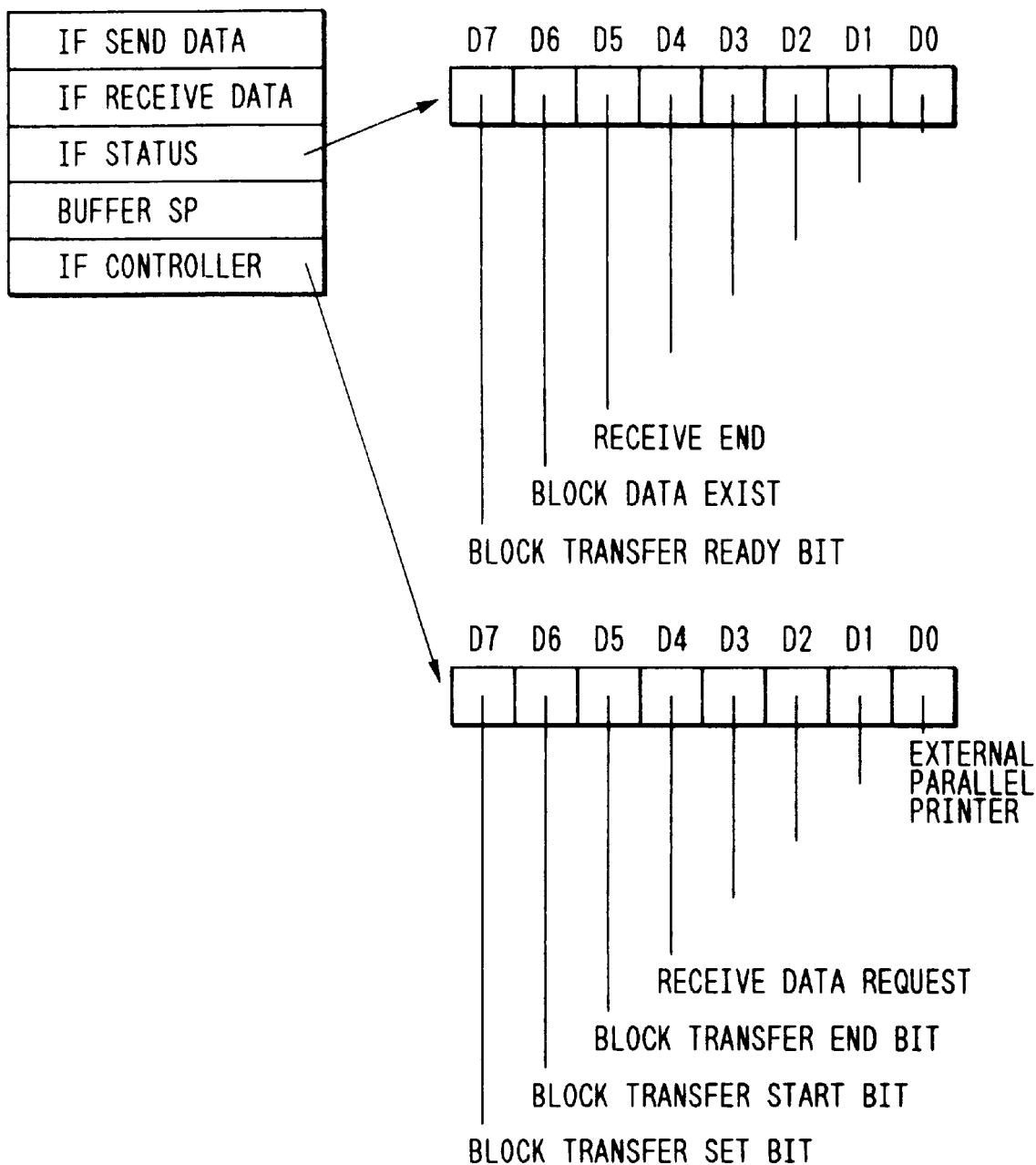
FIG. 55 is a constructional diagram of a PIO/IO register.

FIG. 55 shows a construction of the IO register (PIO-IO) which is seen from the host computer side of the parallel IF adapter. The PIO/IO comprises registers such as IF send data, IF receive data, IF status, Buffer SP, and IF controller and is a group of registers for parallel IF transfer control from the host computer to the printer.

Figure 56:
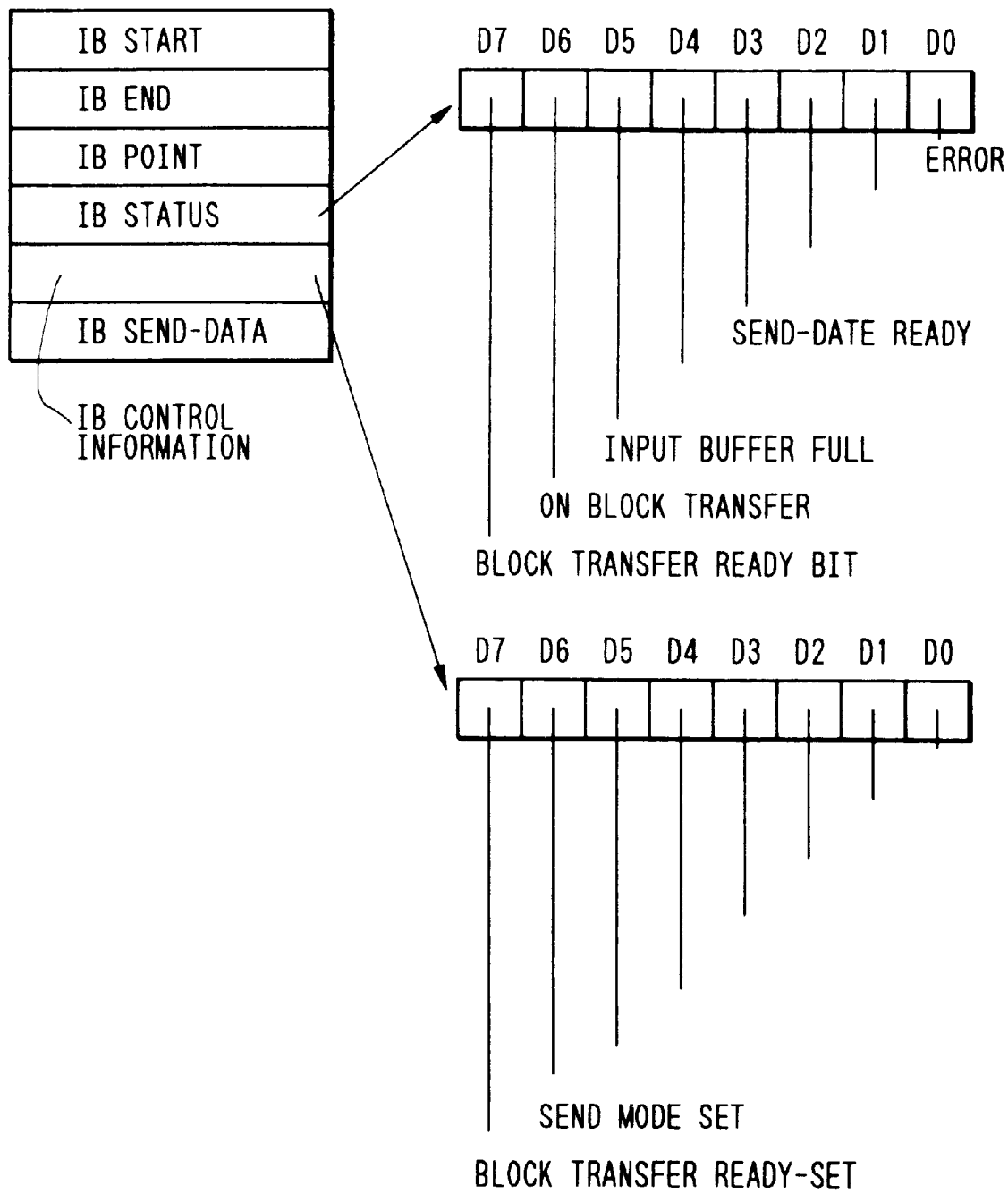
FIG. 56 is a constructional diagram of a PIF/IO register.

FIG. 56 relates to the IF data input controller and shows a construction of the IO register (PIF/IO) which is seen from the printer side and comprises registers such as IB start, IB end, IB POINT, IB status, IB control information, and IB SEND-DATA. Functions of those registers will be explained hereinlater.

Figure 57:
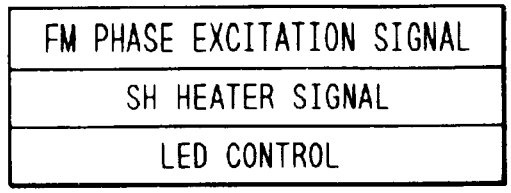
FIG. 57 is a constructional diagram of a PFM/IO register.

FIG. 57 relates to the printer port controller and shows a construction of the IO register (PFM/IO) which is seen from the printer side. The PFM/IO comprises registers of FM phase excitation signal, SH heater signal, and LED control.

Figure 58:
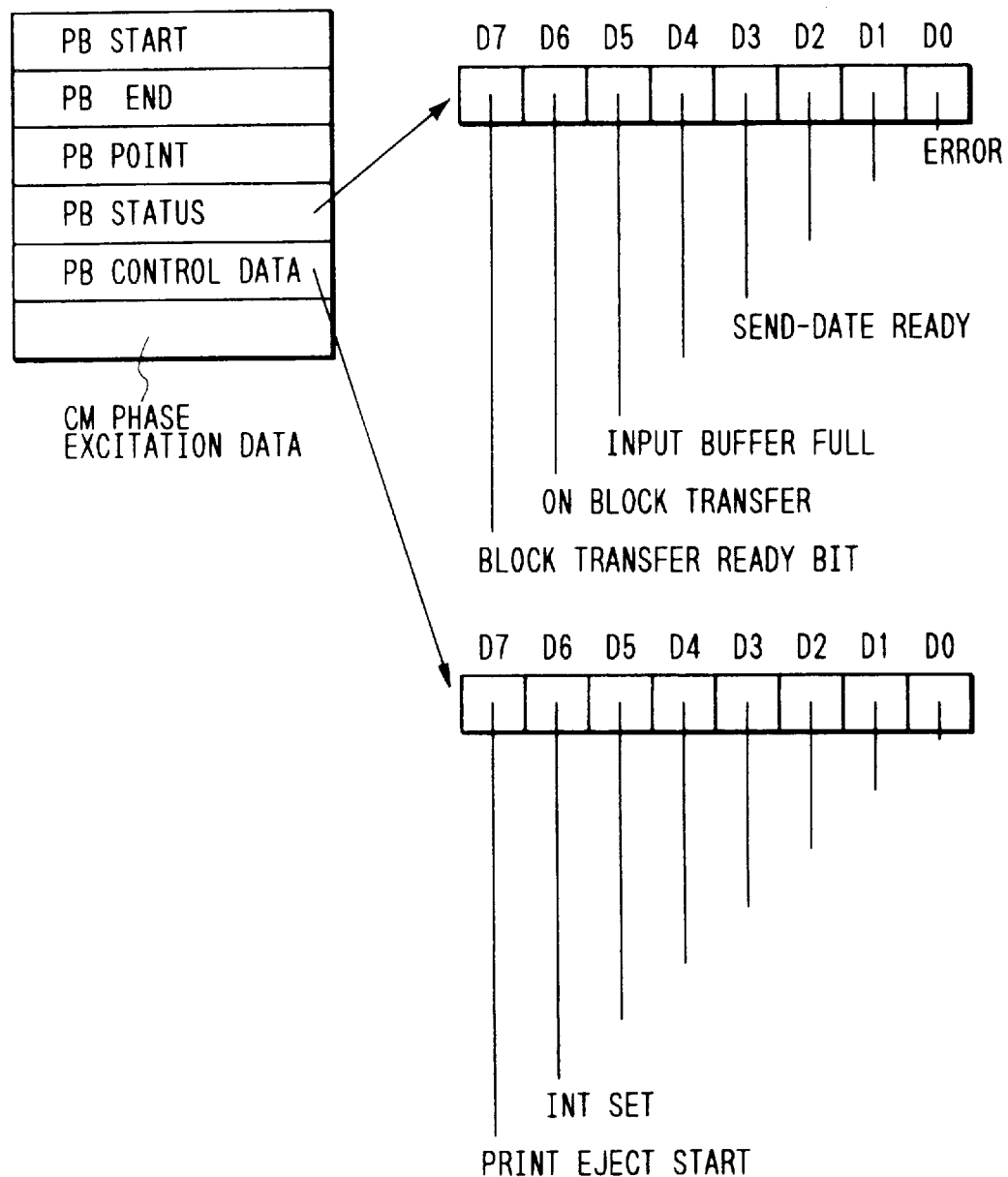
FIG. 58 is a constructional diagram of a PBJ/IO register.

FIG. 58 relates to the thermal jet head/CM controller and shows a construction of the IO register (PBJ/IO) which is seen from the printer side. The PBJ/IO comprises registers such as PB start, PB end, PB POINT, PB status, PB control data, and CM phase excitation data.

Figure 59:
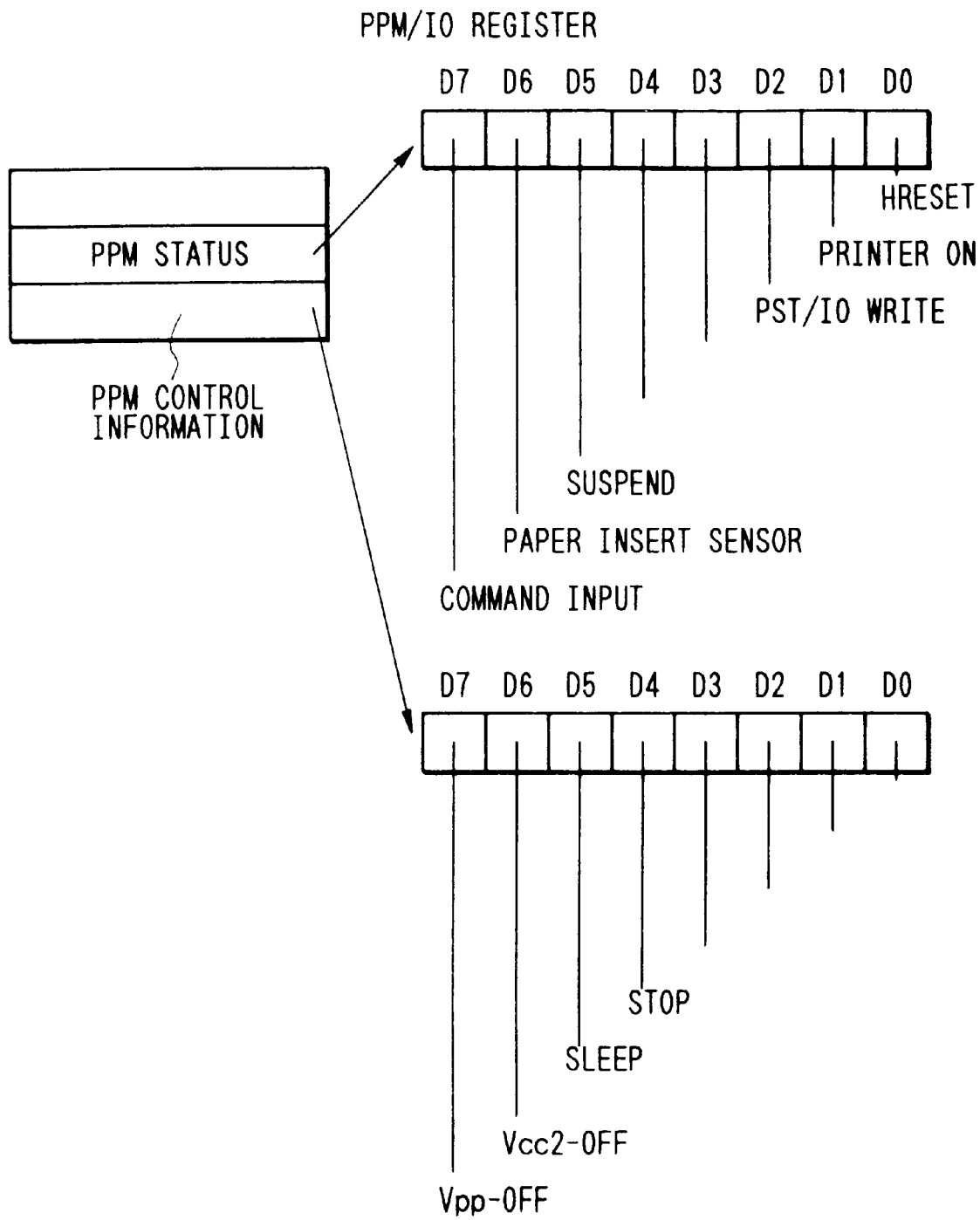
FIG. 59 is a constructional diagram of a PPM/IO register.

FIG. 59 relates to the printer PM and shows a construction of the IO register (PPM/IO) which is seen from the printer side. The PPM/IO comprises registers such as PPM status and PPM control information.

The PPM status is a register to indicate causes of generation when the reset signal and the interruption signal are generated to the CPU-P. Bits of $D_0$, $D_1$, and $D_2$ indicate reset signals due to the hardware reset, printer-on of a panel SW, and writing into the PST/IO register from the host computer, respectively. Bits of $D_5$, $D_6$, and $D_7$ indicate interruptions due to the suspend, paper insert sensor, and writing into the PIO/IO register from the host computer, respectively.

Figure 60:
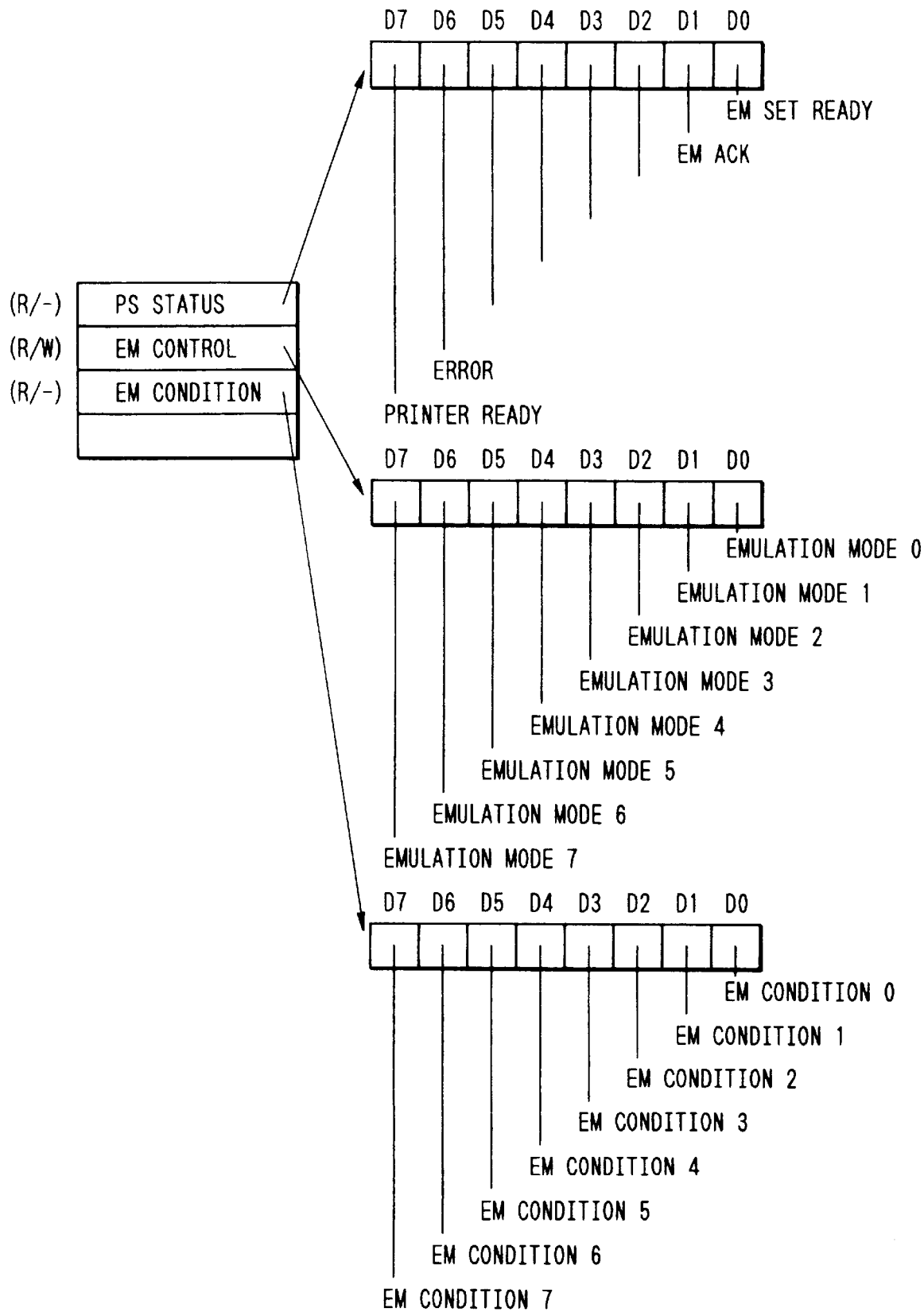
FIG. 60 is a constructional diagram of a PST/IO register.

FIG. 60 is a diagram relates to the printer control & status port section and shows a construction of the IO register (PST/IO) which is seen from the host computer side. The PST/IO is constructed by a PS status register, an EM control register, and an EM condition register.

Figure 61:
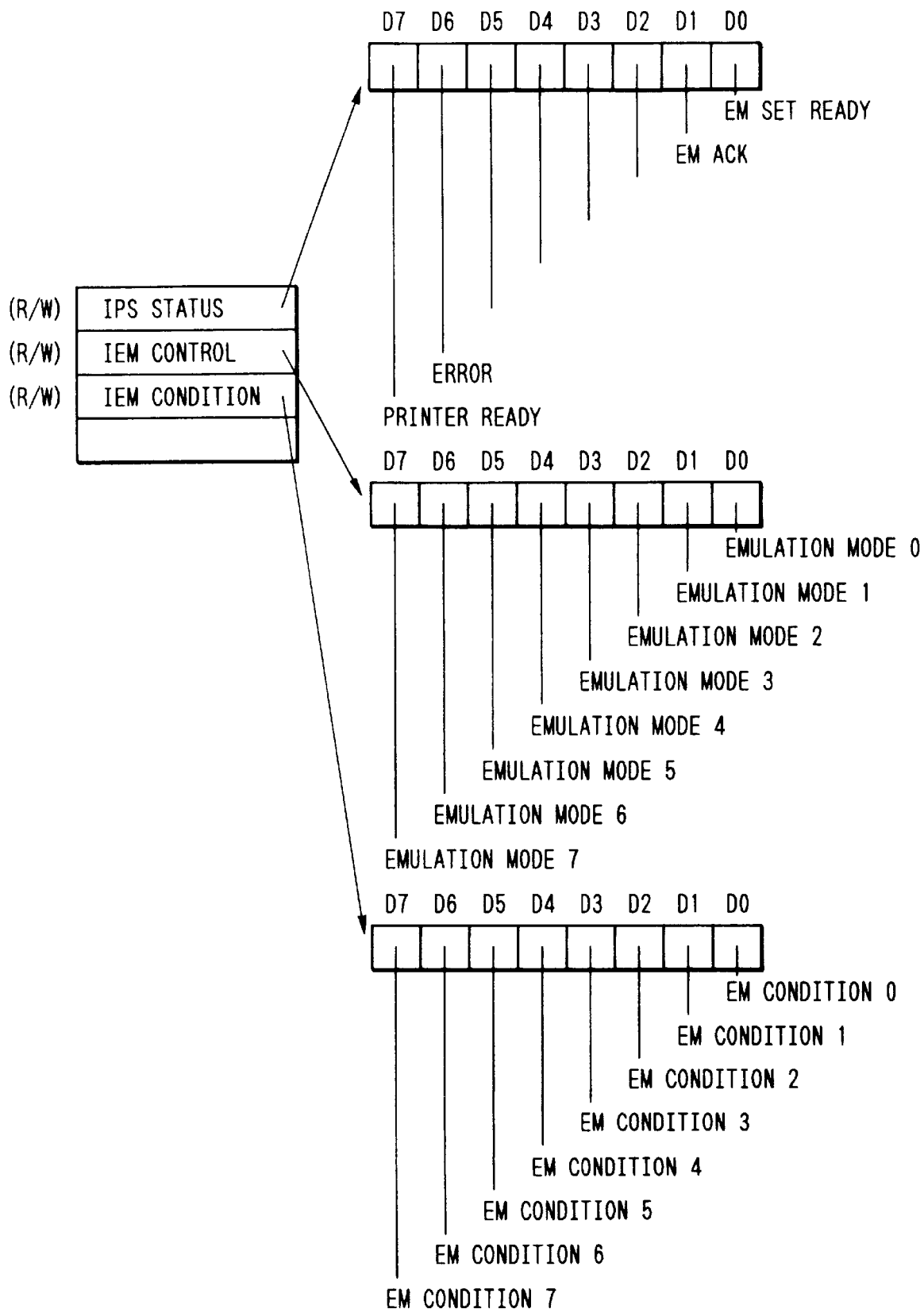
FIG. 61 is a constructional diagram of an HWR/IO register.

FIG. 61 relates to the printer control & status port section and shows a construction of the IO register (HWR/IO) which is seen from the CPU-P side. The HWR/IO is constructed by an IPS status register, an IEM control register, and an IEM condition register. The relation between the PST/IO register and the HWR/IO register mentioned above is processed as follows by the control of the printer control & status port section.

The IPS status register of the HWR/IO indicative of the printer status and the emulation hand shaking status which are written by the CPU-P can be confirmed as it is by the host CPU by the PS status register of the PST/IO. On the other hand, the EM control register and EM condition register of the PST/IO are used for a purpose such that the host CPU changes various kinds of setting conditions regarding the emulation mode setting of the printer apparatus and an individual emulation. That is, when the emulation mode is written from the host CPU into the EM control register, an interruption (reset signal when the CPU-P is stopped) occurs in the CPU-P of the printer. The emulation mode set by the interrupting process is read out from the IEM control register and is switched to the emulation mode in which the analysis of the command which is transferred from the parallel IF of the printer has been set. Various kinds of printer setting information in the newly set emulation mode and the change mode are written into the IEM control register, and IEM condition register. Such information is seen in the EM control register and EM condition register. Therefore, the host CPU can confirm various kinds of printer setting information for the changed emulation mode. Similarly, when the printer setting information is changed, various kinds of printer setting information to be changed are written into the EM condition register by the host CPU, thereby completing the change of the printer setting information. An EM set ready bit and an EM acknowledge bit of the PS status register are prepared for the above handshaking and indicate that the writing into the EM control register and EM condition register is permitted and that the change of the printer setting information has been completed and the changed status information has been specified in the EM control register and EM condition register. Those bits correspond to the writing operations of the IEM set ready bit and IEW acknowledge bit in the IPS status register of the HWR/IO register from the CPU-P, respectively.

Figure 62:
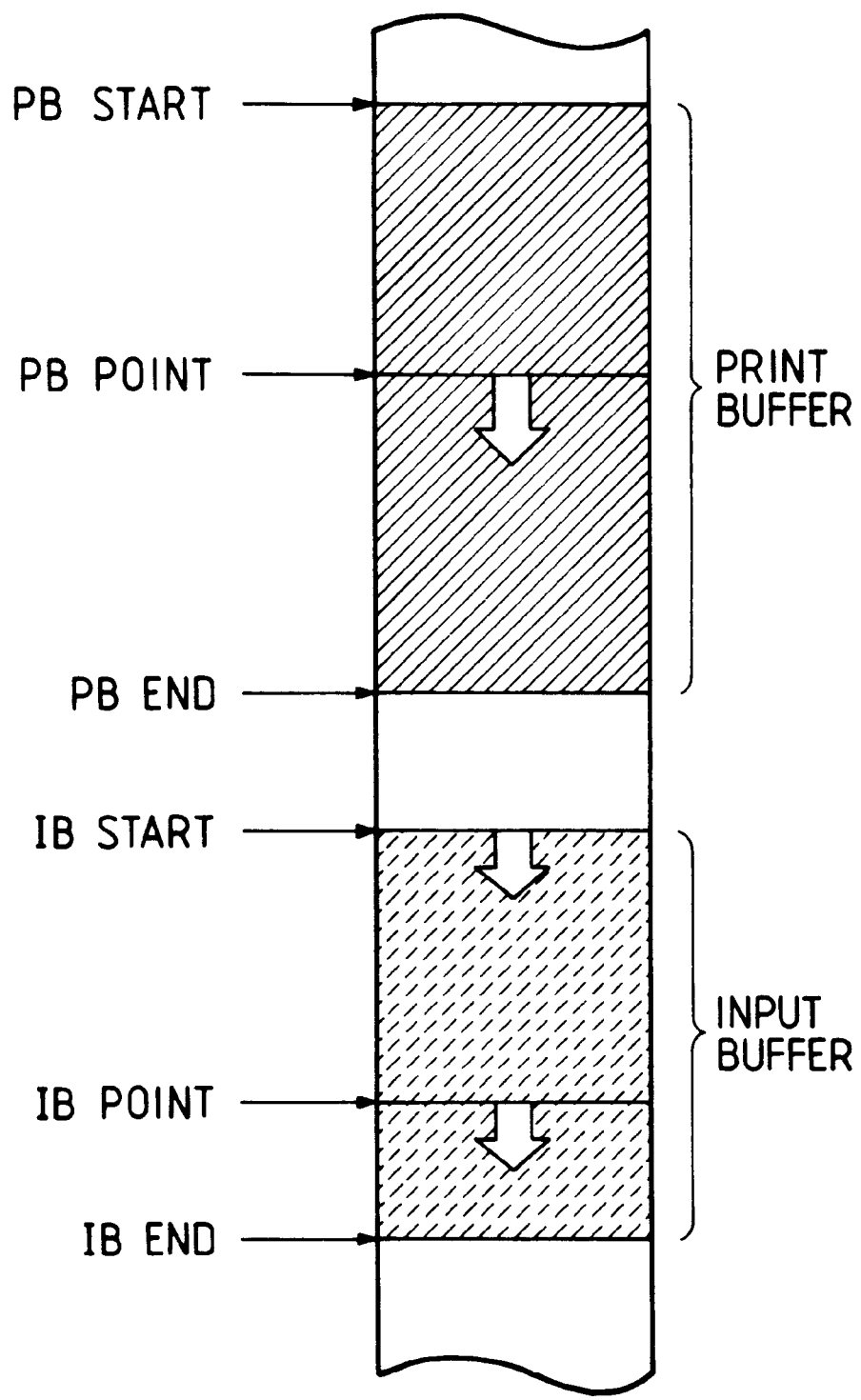
FIG. 62 is a diagram showing PB and IB address areas of an RAM-P in the printer.

FIG. 62 is a diagram showing an area arrangement of addresses in a memory data buffer (PB) which is controlled in the RAM-P by the thermal jet head/CM controller and an input buffer (IB) which is controlled by the IF data input controller.

A print buffer area is used to set a data area necessary for printing. By setting a start address (PB START) and an end address (PB END), the print data is sequentially read out within the range designated by those start and end addresses by a thermal jet head/CM controller from the start address. The print data is read out from the RAM-P until the address reaches the end address. A control signal is sent to the head driver. In this instance, a print data address pointer (PB POINT) indicates a data address at which the data is at present being sent.

An input data buffer area is also used to set a data area necessary for data reception. By setting a start address (IB START) and an end address (IB END), the stored data is sequentially read out within the range designated by the start and end addresses by an IF data input controller from the start address. The stored data is read out from the RAM-P until the address reaches the end address. The control signal is sent to the head driver. In this instance, an input data address pointer (IB POINT) indicates a data address at which the data has already been received at present.

Figure 63:
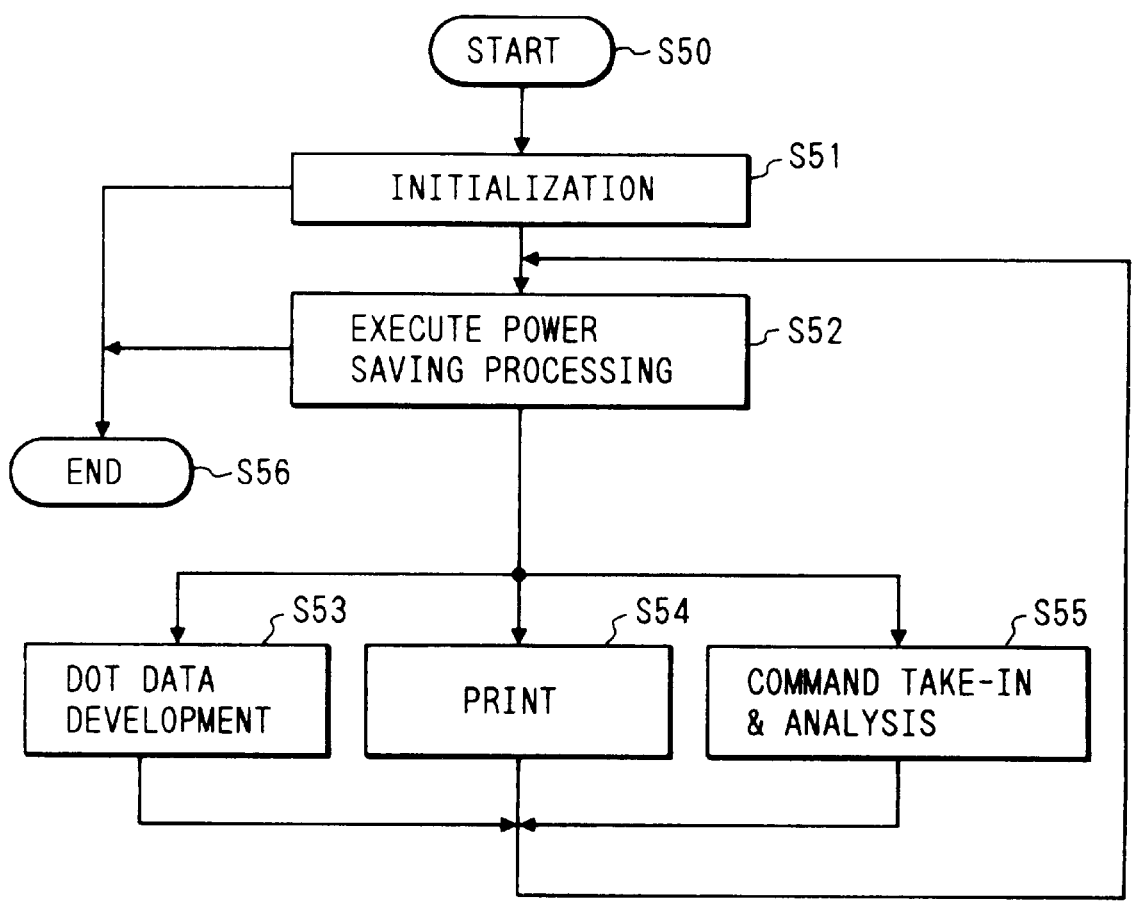
FIG. 63 is a flowchart of a schematic control of a CPU-P in the printer.

FIG. 63 is a schematic diagram showing a software control flow at the start of the reset of the printer side.

In step S51, an initialization is performed. If the Printer-off has been set from the operation panel SW, step S56 follows and the processing routine is finished. When the printer-off is not set, step S52 follows. In a power saving control processing in step S52 as well, if the Printer-off has been set, step S56 follows and the processing routine is finished in a manner similar to that mentioned above. When the Printer-off is not set, three parallel processings in steps S53, S54, and S55 are executed. Step S53 relates to a dot data development processing to develop character code data existing in a line buffer into actual dot data of one line. Step S54 relates to a series of print processings in the case where all of the dot data of the next line are prepared and a print start command of such a line is executed or execution commands are successively executed. Step S55 relates to a command take-in and analysis processing for interpreting the command and data taken in the input buffer, thereby forming a line buffer. When each processing in steps S53, S54, and S55 is finished, the processing routine is returned to a power saving processing in step S52.

Figure 64:
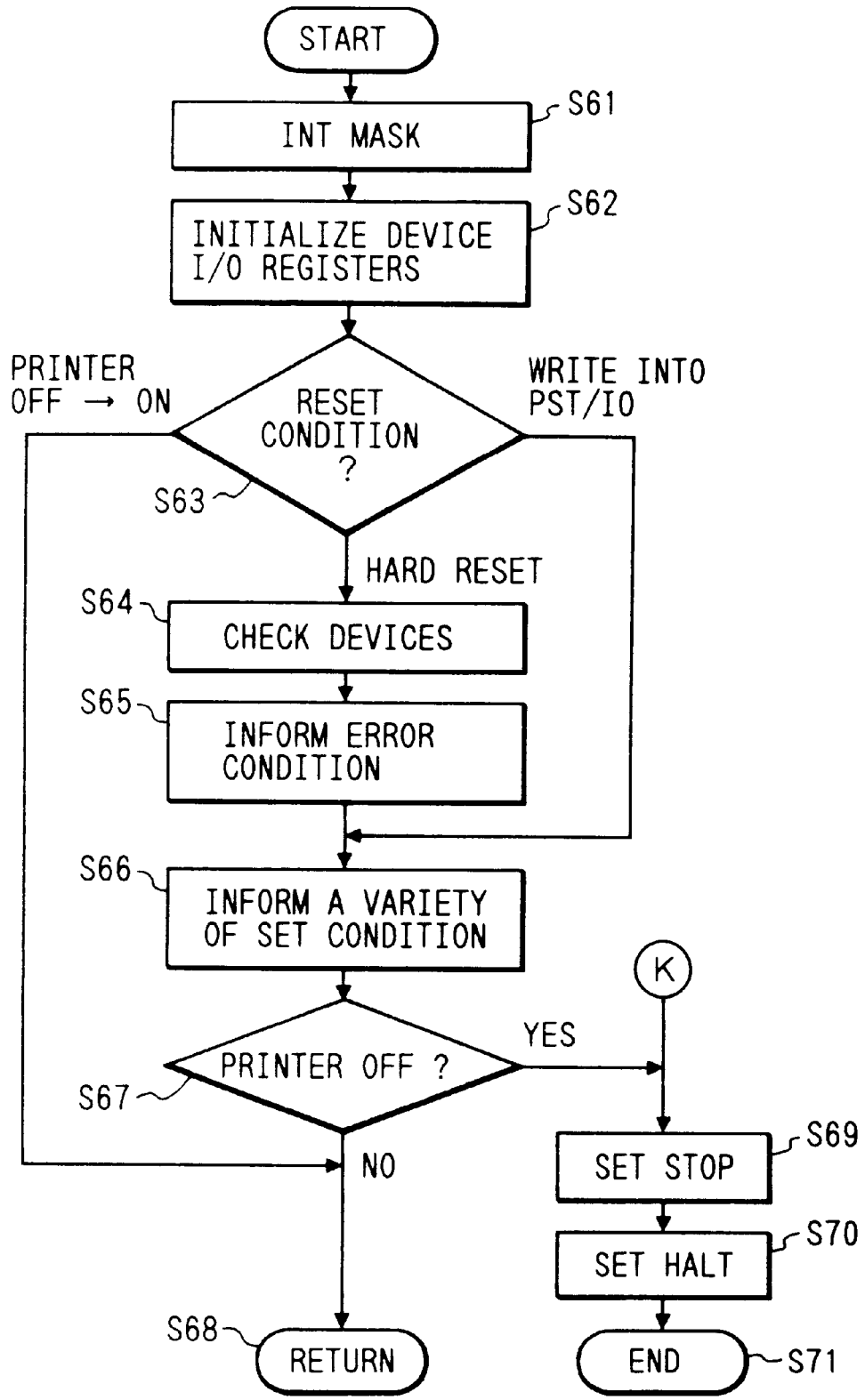
FIG. 64 is a control flowchart for an initialization processing of the CPU-P in the pritner.

FIG. 64 is a flowchart for the initialization processing in FIG. 63 in detail.

In step S61, an interruption mask processing is executed and step S62 follows. In step S62, a device IO register initialization is executed to set the above registers (PIF/IO, PFM/IO, PBJ/IO, PPM/IO) and the like into desired states and step S63 follows. In step S63, the condition in which the reset of the CPU-P was started is checked by reading the PPM status of the register PPM/IO of the printer PM. When the Printer on/off switch of the operation panel SW is turned on from the off state, step S68 follows. When the data is written from the host computer to the register PST/IO (various data regarding the emulation are set), step S66 follows. When the host computer is hard reset, step S64 follows. In the cases other than the above states, the processing routine advances to step S66. In step S64, the devices such as ROM-P and RAM-P are checked. If there is an error, the error status is informed to the host computer through the register HWR/IO (S65). In step S66, a variety of set conditions regarding the emulation mode set and the individual emulation are written into the register HWR/IO and informed to the host computer. In step S67, a check is made to see if the printer switch is OFF or not. If NO, the processing routine is returned to the processing step next to step S51 in FIG. 63. When the printer switch is OFF, a series of processing steps S69, S70, and S71 are executed and these processings relates to a procedure of the CPU-P when shifting to a stop mode, which will be explained hereinlater, and the register PPM/IO is set into the stop mode and the CPU-P is set into a halt state.

Figure 65:
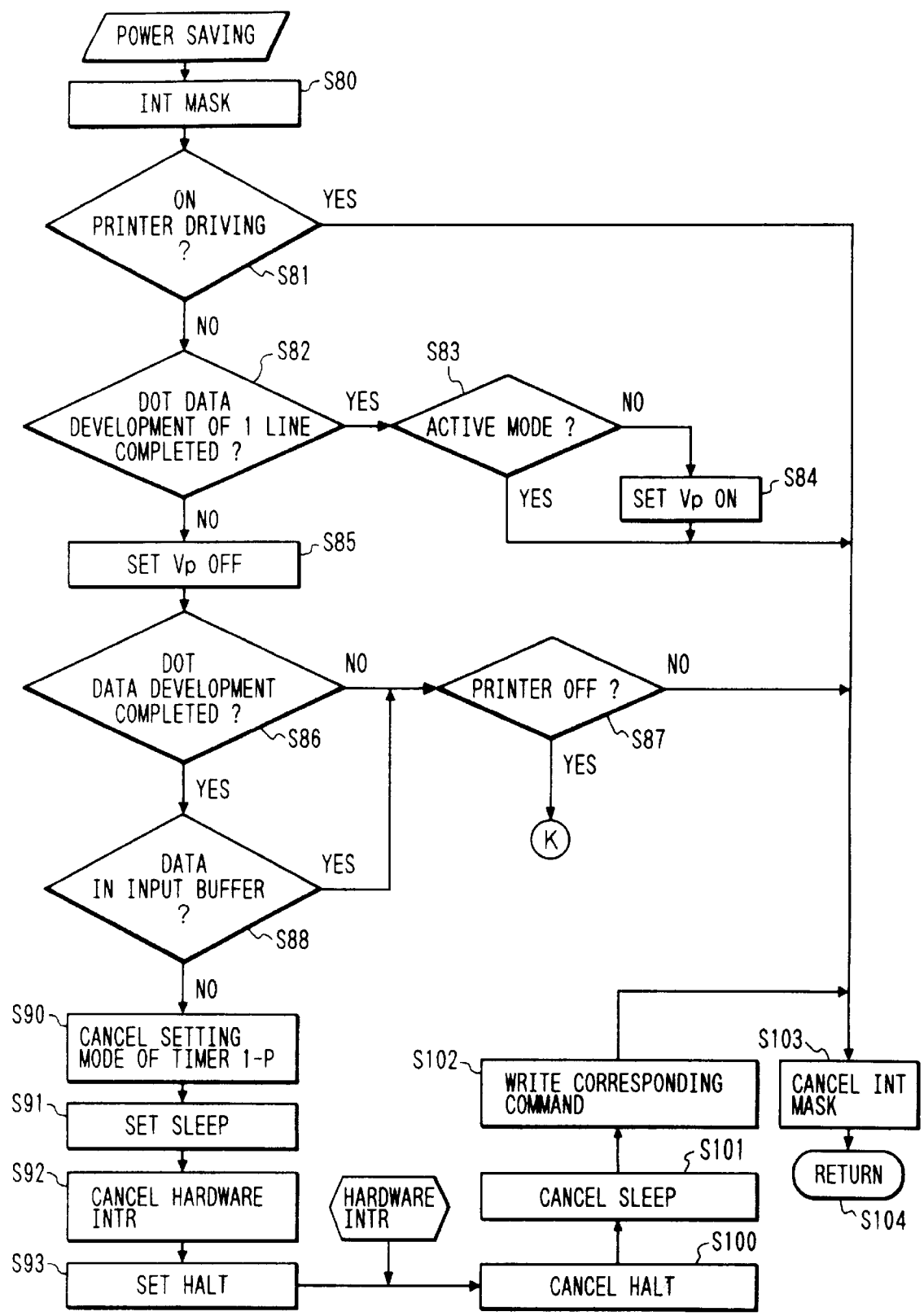
FIG. 65 is a control flowchart for a power saving control processing of the CPU-P in the printer.

FIG. 65 is a diagram showing in detail a flow for the power saving control processing in FIG. 63.

In step S80, an interruption MASK processing is executed and step S81 follows. In step S81, a check is made to see if the printer is being driven and controlled or not. When the printer is on driving, the interruption MASK is cancelled in step S103 and, after that, the processing routine is returned to the main routine. If NO in step S81, step S82 follows. In step S82, a check is made to see if the development processing of the dot data of one line has been completed or not. If YES in step S82, a check is made in step S83 to see if the printer is at present in the active mode or not. If YES in step S83, the processing routine advances to the above processing step S103. If NO in step S83, a power source $V_p$ for driving the printer is turned on in step S84 and step S103 similarly follows. When the development processing of the dot data of one line is not yet completed in step S82, step S85 follows. After the power source $V_p$ was turned off in step S85, step S86 follows and a check is made to see if the dot data development processing has been completed or not. If YES in step S86, step S88 follows. If NO in step S86, step S87 follows and a check is made to see if the printer is OFF or not. When the printer is OFF, the processing routine advances to step S71 in FIG. 64 and the end processings in steps S71 and S72 are performed. If NO in step S87, step S103 similarly follows. In step S88, a check is made to see if data exists in the input buffer or not. When no data exists in the input buffer, step S87 follows. When the data exists in the input buffer, the setting mode of a TIMER1-P is cancelled in step S90. Subsequent processing steps S91, S92, and S93 relate to a procedure which is executed on the assumption that the apparatus is again made operative due to the external interruption by the hardware. After the sleep mode was set, the hardware interruption is cancelled and the halt mode is set. When the hardware interruption occurs in the state of step S93, processing steps S100, S101, and S102 are executed. The halt mode is cancelled and a ready mode restart processing such as command writing and the like corresponding to the sleep cancellation and the hardware interruption is executed. After that, step S103 follows.

Figure 66:
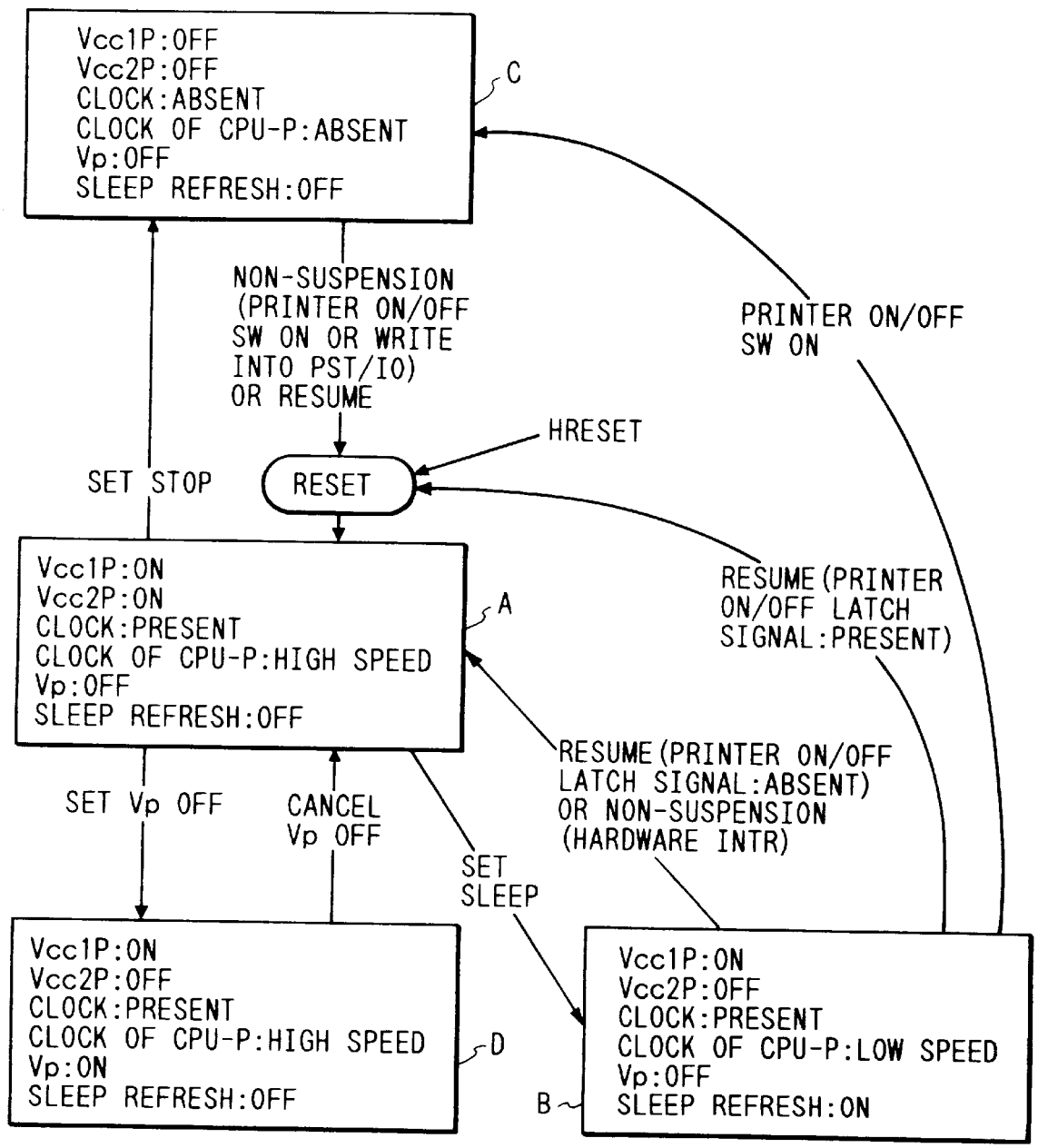
FIG. 66 is a change diagram of a PM controller in the printer.

FIG. 66 is a diagram showing state transitions of the printer PM and the mode controller due to the condition. After resetting, the printer PM is in a status A. However, when the sleep mode of the PMM/IO is set, the printer PM is changed to a state B. When the stop mode of the PMM/IO is set, the printer PM is changed to a status C. As a change in the status A, there are three kinds of changes: a change A→B due to the sleep setting of the CPU-P; a change A→C due to the stop setting of the CPU-P; and a change A→D due to the $V_p$-off setting of the CPU-P. As a change in the status B, there are three kinds of changes: a change to the status A; a change to the status C by the printer-off signal from the panel SW; and a change to the status A via the initialization due to the P-RES. The change to the status A occurs in the case due to the occurrence of the hardware interruption such as paper insertion, operation SW, data input, PST, writing into IO, etc. in the non-suspending state and the case of transition from the suspending state to the non-suspending state, namely, the case where there is no printer off latch signal in RESUME. The change to the status C occurs in the case where the printer-off SW input occurs irrespective of the suspending state. The change to the status A through the initialization due to the P-RES occurs in the case of the transition from the suspending state to the non-suspending state, namely, the case where there is the printer off latch signal in RESUME. The change to the status C occurs in the case where the status changes to the status A via the initialization due to the P-RES; namely, the case where there is a printer on SW input in the non-suspending state or the host computer writes data into the PST/IO and the case of shifting from the suspending state to the non-suspending state, that is, at the time of RESUME. The change to the status D occurs in the case of changing to the status A due to the cancellation of the $V_p$-off setting of the CPU-P. The statuses A to D will now be described in accordance with the status explanation of the printer system.

Figure 67:
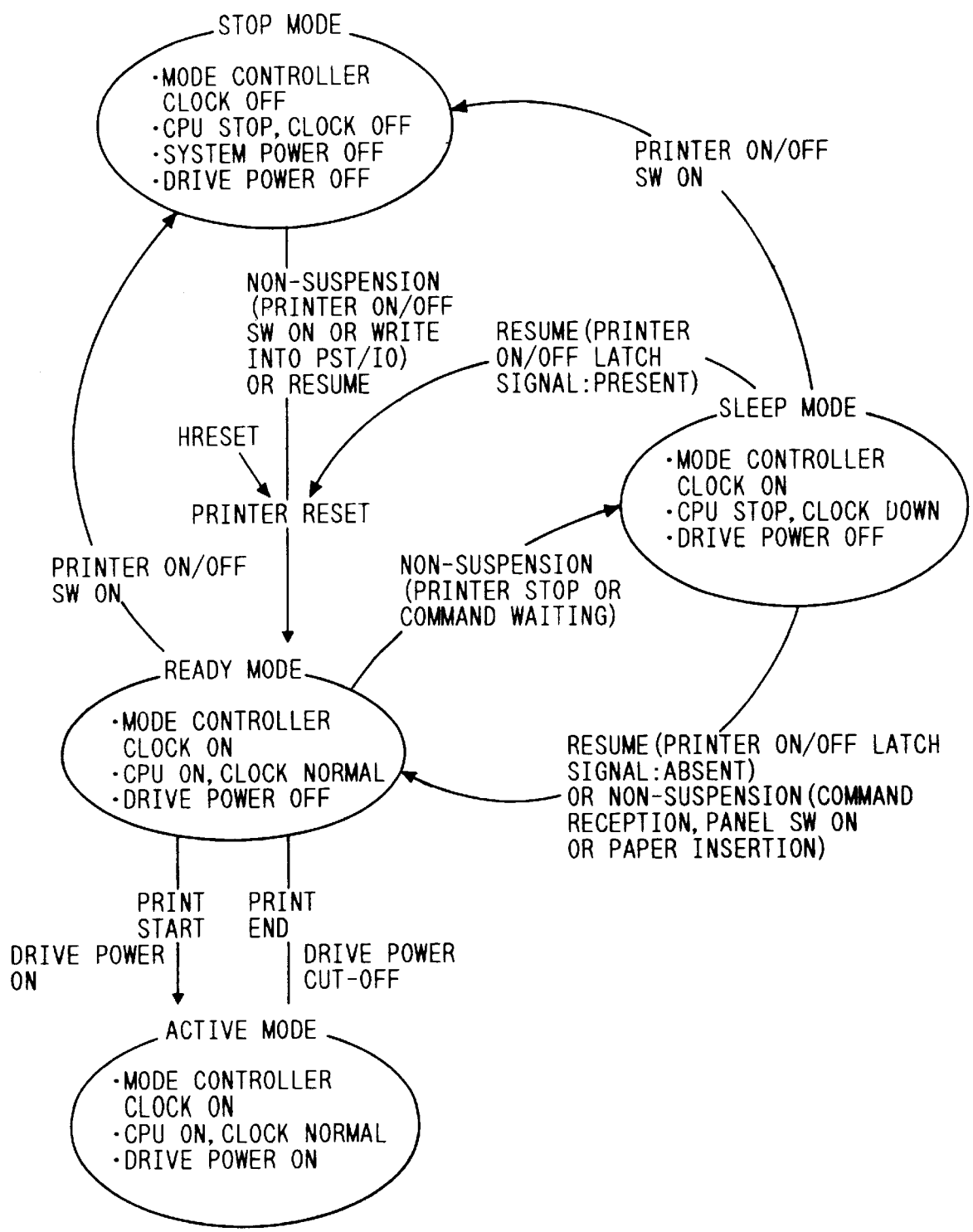
FIG. 67 is a status change diagram as a printer system.

FIG. 67 is a diagram showing the transition of the whole printer system.

The printer system has the following four statuses: a stop mode in which all of the clocks and power supplies don't exist; an active mode in which all of the power sources and clocks are normal and the printing can be performed; a ready mode in which the printer driving power supply is not executed as compared with the active mode; and a sleep mode in which a Vcc power source is supplied to only the CPU-P, PM controller, and RAM-P and the CPU-P and RAM-P are fundamentally stopped and the contents in the memories and registers are merely held.

The correlation among the change system of each mode, the control of the CPU-P, and the change system of the mode controller will now be described hereinbelow.

The ready mode is set upon resetting and such a setting is realized by using the change system of RESET→A in FIG. 66.

With respect to the ready mode, the first change system from the ready mode is ready mode→active mode, $V_p$-off is set by the CPU-P in step S84 in FIG. 65, and the change of A→D in FIG. 66 occurs in the mode controller. The second change system from the ready mode relates to a series of processings of the CPU-P in steps S81 to S93 in FIG. 65. When there is no data which can be processed in the print end state, the sleep mode is set into the mode controller and the halt state is obtained. However, the change A→B in FIG. 66 occurs in the mode controller due to the sleep setting and the status changes from the ready mode to the sleep mode.

With respect to the active mode, the change system from the active mode relates to only one mode. The status change from the active mode to the ready mode is cancelled by the $V_p$-off by the CPU-P in step S85 in FIG. 65. The change of D→A in FIG. 66 occurs in the mode controller.

In the sleep mode, the first change system from the sleep mode relates to the change from the sleep mode to the ready mode. The change of B→A in FIG. 66 occurs when the paper insertion, operation SW, data input, or the like occurs in the non-suspending state and at the time of transition from the suspending state to the non-suspending state, namely, in the case where there is no printer off latch signal at the time of RESUME. The clock 2 is set into the normal state. The hardware interruption is generated for the CPU-P. The CPU-P side is returned in steps S100 to S103 in FIG. 65. The second change system from the sleep mode relates to the change from the sleep mode to the stop mode due to the generating condition of the printer off SW input and is the change of B→C in FIG. 66 in the mode controller. The control of the CPU-P isn't concerned with such a change. The third change system from the sleep mode relates to the status change from the sleep mode to the ready mode through the initialization due to the P-RES in the case where there is no printer off latch signal at the time of RESUME. The third change system is the change of B→RESET→A in FIG. 66 in the mode controller and the controller is initialized in a hardware manner.

In the stop mode, there is one change system and relates to the change to the ready mode via the RESET in the P-RES at the time of RESUME and in the printer on SW input in the non-suspending state or in the occurrence of the writing of the data from the host computer into the PST/IO. Such a change system relates to the change of C→RESET→A in FIG. 66 in the mode controller and the controller is initialized in a hardware manner.

Although the invention has been described with respect to the embodiments of, particularly, the printing system of the ink jet type, the kind of printer or the recording method are not limited.

Although the invention has been described with respect to only the embodiments in which the personal computer and the printer are integratedly constructed, the invention can be also applied to a structure of the separation type in which the personal computer and the printer are driven by the same battery.

Further, in the case where the printer has a sole battery driving source, the change from the ready mode to the stop mode due to the printer off signal which is given from the host computer side doesn't exist. Therefore, the invention can be also realized in a form excluding such a mode.

Further, in the status B in FIG. 66, a clock speed to the CPU-P is set to a low speed. However, such a speed denotes the lowest clock speed at which the internal register in the CPU-P can maintain the information and can be returned. The clock oscillation can be also obviously stopped so long as the CPU-P can perform a static operation. Similarly, as an RAM-P, a cheap RAM such as D-RAM, PS-RAM, or the like of the type which needs the refreshing operation is assumed. However, by using an RAM which doesn't need the refreshing operation or an RAM which has a data holding mode and holds data and can be returned, a further power saving can be accomplished. On the other hand, by switching a voltage which is supplied to each of the CPU-P and the RAM-P in the B status to the lowest voltage at which data can be held, a further power saving can be realized.

Moreover, although the host computer has been described mainly with respect to the personal computer, the invention can be also applied to apparatuses such as Japanese word processor, system pocket notebook, and the like having a structure such that the printing section can be independently controlled so long as the apparatus has communicating means to the outside or the apparatus can communicate through a bus.

[Embodiment 2]

In FIG. 64, after the printer operating mode was generated in step S66 as an initialization processing of the CPU-P, the presence or absence of the printer off signal is discriminated in step S67, and when the printer off signal is present, the CPU-P is stopped. In the case where data is written from the host computer into the register PST/IO of the printer control & status port section, the processing routine advances to step S66 in FIG. 64 irrespective of the information written. However, it is also possible to discriminate the written information and to execute the processings according to the written information. Not only the processing but also the operating state of the CPU-P such that whether the CPU-P is stopped after completion of the processing or not or the like can be also changed in accordance with the information written from the host computer.

As will be obviously understood from the above description, the apparatus comprises the following four modes: the active mode in which at least the printer driving power source is supplied and the printing operation can be performed; the ready mode in which the printer driving power source is not supplied and the operations of the printer other than the printing can be controlled; the sleep mode in which low-speed clocks are supplied to the CPU to control the printer and only the holding of the contents in the memory is performed; and the stop mode in which the clock generation and the power supply to the CPU to control the printer are stopped and the apparatus is in the complete stop state. The power saving can be realized by the status transition among the above modes. The transition from the stop mode to the ready mode is performed by resetting the CPU and the processing according to the resetting condition of the CPU can be performed.

According to the invention as mentioned above, the apparatus comprises: the information processing side to perform the main control; and the control side to execute the control regarding the printing including the power saving control. The information processing side to perform the main control can transfer information to the print control side irrespective of the stop state of the printer controller on the control side.

According to the invention as described above, the apparatus comprises: the information processing side to perform the main control; and the control side to execute the control regarding the printing including the power saving control. When there are a plurality of reset instructing means of the printer controller on the control side, by providing the register to specify the reset instruction, the reset instruction can be easily specified. There is also an advantage such that the reset processing corresponding to each of the reset instructing means can be easily selected.

According to the invention as mentioned in detail above, it is possible to provide an information processing apparatus comprising: the information processing means for executing the main control; the control means for performing the control regarding the printing including the power saving control; and the switch to instruct the control means to stop or restart, particularly, the printer controller to control the printing, wherein, when the printer controller is stopped due to the instruction of the switch, on the basis of the information which is transferred from the information processing means, the control means resets and starts the printer controller, thereby processing the information from the information processing means.

According to the invention as mentioned in detail above, it is possible to provide an information processing apparatus comprising: the information processing means to perform the main control; the control means for performing the control regarding the printing including the power saving control; and a plurality of instructing means to instruct the control means to reset, particularly, the printer controller to control the printing, wherein the control means has the reset means for resetting the printer controller and the specific register to specify the instructing means for activating the resetting means from among the plurality of instructing means, and the processing after completion of the resetting by the reset means is selected on the basis of an output of the specific register.

According to the invention as described in detail above, the apparatus comprises: the information processing side to perform the main control; and the control side to perform the control regarding the printing including the power saving control, wherein the information processing side to perform the main control can transfer information to the print control side irrespective of the stop state of the printer controller on the control side.

According to the invention as described in detail above, the apparatus comprises: the information processing side to perform the main control; and the control side to execute the control regarding the printing including the power saving control, wherein when there are a plurality of reset instructing means of the printer controller on the control side, by providing the register to specify the reset instruction, the reset instruction can be easily specified, and there is also an advantage such that the reset processing corresponding to each of the reset instructing means can be easily selected.

According to the invention as described in detail above, it is possible to provide an information processing apparatus comprising: the information processing means for performing the main control; the control means for performing the control regarding the printing including the power saving control; and the switch to instruct the control means to stop or restart, particularly, the printer controller to control the printing, wherein when the printer controller is stopped by the instruction of the switch, the control means resets and starts the printer controller on the basis of the information which is transferred from the information processing means, thereby processing the information from the information processing means.

According to the invention as described in detail above, it is possible to provide an information processing apparatus comprising: the information processing means for performing the main control; the control means for performing the control regarding the printing including the power saving control; and a plurality of instructing means for instructing the control means to reset, particularly, the printer controller to control the printing, wherein the control means has the reset means for resetting the printer controller and the specific register to specify the instructing means for activating the reset means from among the plurality of instructing means, and the processing after completion of the resetting by the reset means is selected on the basis of an output of the specific register.

The embodiments described in detail above are not limited to the form in which the personal computer and the printer are integratedly constructed as shown in FIG. 1 but can be also applied to a structure in which the host computer and the printer are separately constructed. The invention can be also applied to a laser beam printer, an ink jet printer, and the like as a printer which is used in the invention.

What is claimed is:

1. An information processing apparatus comprising:
designation means for providing an ON instruction for turning a printer unit on or an OFF instruction for turning the printer unit off, the printer unit being adapted to print data received from a host unit; and
control means for shifting the printer unit to a stop mode in response to said designation means providing the OFF instruction when the printer unit is in a sleep mode and the host unit is in a non-suspension state and for shifting the printer to a stop mode upon resumption of the host unit in response to said designation means providing the OFF instruction when the printer is in a sleep mode and the host unit is in a suspension state.

2. An apparatus according to claim 1, wherein said control means resets the printer unit and shifts the printer unit to a ready mode and then to the stop mode upon resumption of the host unit in response to said designation means providing the OFF instruction when the printer is in the sleep mode and the host unit is in the suspension state.

3. An apparatus according to claim 1, wherein said control means resets the printer unit and shifts the printer unit to a ready mode upon resumption of the host unit in response to said designation means providing the OFF instruction and then the ON instruction when the printer is in the sleep mode and the host unit is in the suspension state.

4. An apparatus according to claim 1, wherein said control means shifts the printer unit to a ready mode upon resumption of the host unit if said designation means does not provide the OFF instruction when the printer is in the sleep mode and the host unit is in the suspension state.

5. An apparatus according to claim 1, wherein said designation means comprises a switch.

6. An apparatus according to claim 1, wherein the host unit and the printer unit are provided in an integrated structure.

7. An apparatus according to claim 1, wherein the host unit and the printer unit are powered by a common battery.

8. An apparatus according to claim 1, wherein the printer unit comprises an ink jet printer.

9. An information processing method comprising the steps of:
providing an ON instruction for turning a printer unit on or an OFF instruction for turning the printer unit off, the printer unit being adapted to print data received from a host unit; and
shifting the printer unit to a stop mode in response to said providing step providing the OFF instruction when the printer unit is in a sleep mode and the host unit is in a non-suspension state and shifting the printer to a stop mode upon resumption of the host unit in response to said providing step providing the OFF instruction when the printer is in a sleep mode and the host unit is in a suspension state.

10. A method according to claim 9, wherein said shifting step comprises resetting the printer unit and shifting the printer unit to a ready mode and then to the stop mode upon resumption of the host unit in response to said providing step providing the OFF instruction when the printer is in the sleep mode and the host unit is in the suspension state.

11. A method according to claim 9, wherein said shifting step comprises resetting the printer unit and shifting the printer unit to a ready mode upon resumption of the host unit in response to said providing step providing the OFF instruction and then the ON instruction when the printer is in the sleep mode and the host unit is in the suspension state.

12. A method according to claim 9, wherein said shifting step comprises shifting the printer unit to a ready mode upon resumption of the host unit if said providing step does not provide the OFF instruction when the printer is in the sleep mode and the host unit is in the suspension state.

13. A method according to claim 9, wherein said providing step provides the ON instruction or the OFF instruction using a switch.

14. A method according to claim 9, wherein the host unit and the printer unit are provided in an integrated structure.

15. A method according to claim 9, wherein the host unit and the printer unit are powered by a common battery.

16. A method according to claim 9, wherein the printer unit comprises an ink jet printer.

17. An electronic apparatus comprising:
designation means for providing an OFF instruction for turning a printer off;
retaining means for retaining printer-off information indicating that the OFF instruction is provided by said designation means; and
resumption means for resetting the printer and then controlling said electronic apparatus to shift to a resumption state if the printer-off information is retained by said retaining means, and for controlling said electronic apparatus to shift to a resumption state without resetting the printer if the printer-off information is not retained by said retaining means.

18. An apparatus according to claim 17, wherein said resumption means shifts the printer from a sleep mode through a resetting process to a ready mode if the printer-off information is retained by said retaining means and shifts the printer from the sleep mode to the ready mode without the resetting process if the printer-off information is not retained by said retaining means.

19. An apparatus according to claim 17, wherein said designation means comprises a switch.

20. An apparatus according to claim 17, further comprising a computer, wherein the printer is built in said computer.

21. An apparatus according to claim 17, further comprising a computer, wherein said computer and the printer are separately provided but powered by a common battery.

22. An apparatus according to claim 17, wherein the printer comprises an ink jet printer.

23. A method of controlling an electronic apparatus, said method comprising the steps of:
retaining printer-off information in a retaining means, the printer-off information indicating that an OFF instruction for turning a printer off is provided by designation means; and
resetting the printer and then controlling the electronic apparatus to shift to a resumption state if the printer-off information is retained in the retaining means, and for controlling the electronic apparatus to shift to a resumption state without resetting the printer if the printer-off information is not retained in the retaining means.

24. A method according to claim 23, wherein said resetting step comprises shifting the printer from a sleep mode through a resetting process to a ready mode if the printer-off information is retained in the retaining means, and wherein said resetting step comprises shifting the printer from the sleep mode to the ready mode without the resetting process if the printer-off information is not retained in the retaining means.

25. A method according to claim 23, wherein the designation means provides the OFF instruction using a switch.

26. A method according to claim 23, wherein the electronic apparatus comprises a computer, and the printer is built in the computer.

27. A method according to claim 23, wherein the electronic apparatus comprises a computer and wherein the computer and the printer are separately provided but powered by a common battery.

28. A method according to claim 23, wherein the printer comprises an ink jet printer.

29. A method for controlling an information processing apparatus comprising first control means for controlling the entire information processing apparatus and second control means for controlling a printer, comprising the steps of:
retaining printer-off information indicating that an OFF instruction is provided for turning the printer off in a power-saving state; and
allowing the second control means to initialize the printer and then allowing the first control means to control the entire information processing apparatus to shift to a resumption state in the event that said retaining step retains the printer-off information upon resumption from a power-saving state, and for allowing the first control means to control the entire information processing apparatus to shift to a resumption state without allowing the second control means to initialize the printer in the event that said retaining step does not retain the printer-off information upon resumption from a power-saving state.

30. A method according to claim 29, wherein the printer comprises an ink jet printer.

31. A method according to claim 29, wherein the information processing apparatus further comprises a switch for providing the OFF instruction.

32. A method according to claim 29, wherein the entire information processing apparatus is suspended in the power-saving state, and resumed upon resumption from the power-saving state.

33. An information processing apparatus comprising:
first control means for controlling the entire information processing apparatus;
second control means for controlling a printer;
retaining means for retaining printer-off information indicating that an OFF instruction is provided for turning the printer off, said retaining means being able to retain the printer off information even in a power-saving state; and
resumption means for allowing said second control means to initialize the printer and then allowing said first control means to control the entire information processing apparatus to shift to a resumption state in the event that said retaining means retains the printer-off information upon resumption from a power-saving state, and for allowing said first control means to control the entire information processing apparatus to shift to a resumption state without allowing said second control means to initialize the printer in the event that said retaining means does not retain the printer-off information upon resumption from a power-saving state.

34. An apparatus according to claim 33, further comprising said printer.

35. An apparatus according to claim 33, further comprising a switch for providing the OFF instruction.

36. An apparatus according to claim 33, wherein the entire information processing apparatus is suspended in the power-saving state, and resumed upon resumption from the power-saving state.

* * * * *

UNITED STATES PATENT AND TRADEMARK OFFICE
CERTIFICATE OF CORRECTION

PATENT NO. : 6,081,663
DATED : June 27, 2000
INVENTOR(S) : Tsutomu Takahashi et al.

It is certified that error appears in the above-identified patent and that said Letters Patent is hereby corrected as shown below:

Title page,
"[76] Inventors: Tsutomu Takahashi; Naohisa Suzuki; Koji Fukunaga; Jiro Tateyama; Jun Oida, all c/o Canon Kabushiki Kaisha, 30-2, 3-chome, Shimomaruko, Ohta-ku, Tokyo, Japan" should read
-- [75] Inventors: Tsutomu Takahashi, Kawasaki; Naohisa Suzuki, Yokohama; Koji Fukunaga, Tokyo; Jiro Tateyama, Yokohama; Jun Oida, Kawasaki, all of Japan --.
Item [56] Insert -- Attorney, Agent, or Firm-Fitzpatrick, Cella, Harper & Scinto --.

Sheet 32,
Figure 39, "EMULATIONH" should read -- EMULATION --.

Column 5,
Line 56, "on/inf" should read -- on/off --.

Column 12,
Line 23, "differs" should read -- differs in --;
Line 25, "not" should read -- no --.

Column 14,
Line 47, "change" should read -- changing --.

Column 15,
Line 16, "Indicates" should read -- It indicates --.

UNITED STATES PATENT AND TRADEMARK OFFICE
CERTIFICATE OF CORRECTION

PATENT NO.   : 6,081,663
DATED        : June 27, 2000
INVENTOR(S)  : Tsutomu Takahashi et al.

It is certified that error appears in the above-identified patent and that said Letters Patent is hereby corrected as shown below:

Column 16,
Line 57, "routine." should read -- routine --.

Column 23,
Line 61, "can shuts" should read -- shuts --.

Signed and Sealed this

Fourth Day of September, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,081,663
DATED        : June 27, 2000
INVENTOR(S)  : Tsutomu Takahashi et al.

It is certified that error appears in the above-identified patent and that said Letters Patent is hereby corrected as shown below:

Title page,
"[76] Inventors:   Tsutomu Takahashi; Naohisa Suzuki; Koji Fukunaga; Jiro Tateyama; Jun Oida, all c/o Canon Kabushiki Kaisha, 30-2, 3-chome, Shimomaruko, Ohta-ku, Tokyo, Japan"
should read
-- [75] Inventors:   Tsutomu Takahashi, Kawasaki; Naohisa Suzuki, Yokohama; Koji Fukunaga, Tokyo; Jiro Tateyama, Yokohama; Jun Oida, Kawasaki, all of Japan --.
Insert Item -- [73] Assignee:   Canon Kabushiki Kaisha, Tokyo, Japan --.
Insert Item -- [74] *Attorney, Agent, or Firm*—Fitzpatrick, Cella, Harper & Scinto --.

Drawings,
Figure 39, delete "EMULATIONH" should read -- EMULATION --.

Column 5,
Line 56, "on/inf" should read -- on/off --.

Column 12,
Line 23, "differs" should read -- differs in --;
Line 25, "not" should read -- no --.

Column 14,
Line 47, "change" should read -- changing --.

Column 15,
Line 16, "Indicates" should read -- It indicates --.

Column 16,
Line 57, "routine." should read -- routine --.

UNITED STATES PATENT AND TRADEMARK OFFICE
CERTIFICATE OF CORRECTION

PATENT NO. : 6,081,663
DATED : June 27, 2000
INVENTOR(S) : Tsutomu Takahashi et al.

It is certified that error appears in the above-identified patent and that said Letters Patent is hereby corrected as shown below:

Column 23,
Line 61, "can shuts" should read -- shuts --.

Signed and Sealed this

Fourteenth Day of March, 2006

JON W. DUDAS
*Director of the United States Patent and Trademark Office*